(12) United States Patent
Gill et al.

(10) Patent No.: US 12,551,551 B2
(45) Date of Patent: Feb. 17, 2026

(54) COMPOSITIONS COMPRISING α-FACTOR PREPRO SEQUENCE AND USES THEREOF

(71) Applicant: Helix Nanotechnologies Inc, Boston, MA (US)

(72) Inventors: Taylor Gill, Cambridge, MA (US); Kemo Jammeh, Brighton, MA (US); Nikolai Eroshenko, Boston, MA (US)

(73) Assignee: Helix Nanotechnologies Inc, Boston, MA (US)

( * ) Notice: Subject to any disclaimer, the term of this patent is extended or adjusted under 35 U.S.C. 154(b) by 0 days.

(21) Appl. No.: 18/093,805

(22) Filed: Jan. 5, 2023

(65) Prior Publication Data

US 2023/0285546 A1    Sep. 14, 2023

Related U.S. Application Data

(60) Provisional application No. 63/296,824, filed on Jan. 5, 2022.

(51) Int. Cl.
*A61K 39/215*    (2006.01)
*A61K 39/00*    (2006.01)
*A61P 37/04*    (2006.01)

(52) U.S. Cl.
CPC ............ *A61K 39/215* (2013.01); *A61P 37/04* (2018.01); *A61K 2039/53* (2013.01)

(58) Field of Classification Search
None
See application file for complete search history.

(56) References Cited

U.S. PATENT DOCUMENTS

| | | | | |
|---|---|---|---|---|
| 5,789,184 A | * | 8/1998 | Fowlkes | C07K 14/395 435/254.2 |
| 6,322,962 B1 | * | 11/2001 | Brown | C12N 9/6454 536/23.4 |
| 2002/0103334 A1 | * | 8/2002 | Schroder | C07K 14/8117 435/255.2 |
| 2003/0044908 A1 | * | 3/2003 | Persson | A61K 38/4846 435/325 |
| 2007/0286854 A1 | * | 12/2007 | Golz | A61P 35/00 514/20.3 |
| 2010/0273215 A1 | * | 10/2010 | Van Hautum | C12N 15/815 435/254.2 |
| 2011/0003315 A1 | * | 1/2011 | Seidah | G01N 33/5008 435/219 |
| 2016/0324934 A1 | * | 11/2016 | Angel | A61K 38/44 |
| 2017/0035867 A1 | * | 2/2017 | Bellgrau | A61K 36/064 |
| 2017/0246263 A1 | * | 8/2017 | Concino | A61K 47/64 |
| 2018/0362596 A1 | * | 12/2018 | Sahni | C07K 14/78 |
| 2019/0040400 A1 | * | 2/2019 | Dai | C12P 21/02 |
| 2021/0290756 A1 | * | 9/2021 | Sullivan | C07K 16/2818 |

FOREIGN PATENT DOCUMENTS

| | | |
|---|---|---|
| EP | 0206783 A2 | 12/1986 |
| WO | WO-2021/100012 A1 | 5/2021 |
| WO | WO-2023/133233 A1 | 7/2023 |

OTHER PUBLICATIONS

Lee at al. Intracellular Trafficking and Metabolic Turnover of Yeast Prepro-α-Factor-SIRF Precursors in GH3 Cells. Experimental and Molecular Medicine, 2002. 34(4): 285-293.*
Julius et al., Isolation of the Putative Structural Gene for the Lysine-Arginine-Cleaving Endopeptidase Required For Processing of Yeast Prepro-α-Factor. Cell, 1984. 37:1075-1089.*
Rholam et al. Role of Amino Acid Sequences Flanking Dibasic Cleavage Sites in Precursor Proteolytic Processing. The Importance of the First Residue C-Terminal of the Cleavage Site. European Journal of Biochemistry, 1995. 227: 707-714.*
Bevan et al., Quantitative Assessment of Enzyme Specificity in vivo: P2 Recognition by Kex2 Protease Defined in a Genetic System. PNAS, 1998. 95:10384-10389.*
Thomas et al. Kex2-like Endoproteases PC2 and PC3 Accurately Cleave a Model Prohormone in Mammalian Cells: Evidence for a Common Core of Neuroendocrine Processing Enzymes. PNAS, 1991. 88:5297-5301.*
Kurjan et al. Structure of a Yeast Pheromone Gene (MFα): A Putative α-Factor Precursor Contains Four Tandem Copies of Mature α-Factor. Cell, 1982. 30:933-943.*
Burns et al. Pro-Region Engineering for Improved Yeast Display and Secretion of Brain-Derived Neurotrophic Factor. Biotechnology Journal, 2016. (11):425-436.*
Aza, P. et al., Design of an improved universal signal peptide based on the [alpha]-factor mating secretion signal for enzyme production in yeast, CMLS Cellular and Molecular Life Sciences, 78(7): 3691-3707 (2021).
Camarero, S. et al., Engineering Platforms for Directed Evolution of Laccase from Pycnoporus cinnabarinus, Applied And Environmental Microbiology, 78(5): 1370-1384 (2012).
Chaudhuri, B. et al., The Pro-Region Of The Yeast Prepro-Alpha-Factor Is Essential For Membrane Translocation Of Human Insulin-Like Growth Factor 1 In Vivo, European Journal Of Biochemistry, Published By Springer-Verlag On Behalf Of The Federation Of European Biochemical Societies, 206(3):793-800 (1992).

(Continued)

*Primary Examiner* — Christopher M Babic
*Assistant Examiner* — Kimberly A Aron
(74) *Attorney, Agent, or Firm* — Choate, Hall & Stewart LLP; Stephanie L. Schonewald; Mandeep Kaur

(57) ABSTRACT

Disclosed herein is an engineered polypeptide comprising (i) a payload polypeptide, and (ii) a wild-type or engineered α-factor prepro sequence, where the wild-type or engineered α-factor prepro sequence is operably linked to the payload polypeptide. Also provided herein are polynucleotides encoding an engineered polypeptide of the present disclosure, as well as compositions comprising such polynucleotides or engineered polypeptides of the present disclosure. Methods of making and using the disclosed polypeptides, polynucleotides and compositions are also provided.

21 Claims, 13 Drawing Sheets

Specification includes a Sequence Listing.

(56) References Cited

OTHER PUBLICATIONS

International Search Report for PCT/US23/10253, 5 pages (mailed Mar. 5, 2023).
Written Opinion for PCT/US23/10253, 7 pages (mailed Mar. 5, 2023).
Amant, F. et al., A serological assay to detect SARS-CoV-2 seroconversion in humans, Nature Medicine, 26:1033-1036 (2020).
Buntz. B., 50 of 2020's best-selling pharmaceuticals, Drug Discovery & Development, 13 pages. Website: <https://www.drugdiscoverytrends.com/50-of-2020s-best-selling- pharmaceuticals> (2021).
Castella, M., et al., Development of a Novel Anti-CD19 Chimeric Antigen Receptor: A Paradigm for an Affordable CAR T Cell Production at Academic Institutions, Molecular Therapy Methods & Clinical Development, 12:134-144 (2019).
Chen, Z. et al., Sortilin Controls Intracellular Sorting of Brain-Derived Neurotrophic Factor to the Regulated Secretory Pathway, The Journal of Neuroscience, 25(26):6156-6166 (2005).
Feizi, A., et al., Human protein secretory pathway genes are expressed in a tissue-specific pattern to match processing demands of the secretome, npj Systems Biology and Applications, 3:22 (2017).
Fitzgerald, I., et al., Secretion of a foreign protein from budding yeasts is enhanced by cotranslational translocation and by suppression of vacuolar targeting, Microbial Cell Factories, 13(125) (2014).
Garten, W., Characterization of Proprotein Convertases and Their Involvement in Virus Propagation, Activation of Viruses by Host Proteases, Springer International Publishing, 205-248 (2018).
Haryadi, R., et al., Optimization of Heavy Chain and Light Chain Signal Peptides for High Level Expression of Therapeutic Antibodies in CHO Cells, PLoS One, 10(2):e0116878 (2015).
Naider, F., et al., The alpha-factor mating pheromone of *Saccharomyces cerevisiae*: a model for studying the interaction of peptide hormones and G protein-coupled receptors, Peptides, 5(9):1441-63 (2004).
Nichols, W. et al., Mutations in the ER-Golgi Intermediate Compartment Protein ERGIC-53 Cause Combined Deficiency of Coagulation Factors V and VIII, Cell, 93(1):61-70 (1998).
Oka, C., et al., Human Lysozyme Secretion Increased by Alpha-factor Pro-sequence in Pichia pastoris, Bioscience, Biotechnology, and Biochemistry, 63(11):1977-1983 (1999).
Otte, S., et al., Sorting signals can direct receptor-mediated export of soluble proteins into COPII vesicles, Nature Cell Biology, 6:1189-1194 (2004).
Petersen, C. et al., Propeptide cleavage conditions sortilin/neurotensin receptor-3 for ligand binding, The EMBO Journal, 18:595-604 (1999).
Rafiq, S. et al., Engineering strategies to overcome the current roadblocks in CAR T cell therapy, Nature Reviews Clinical Oncology, 17:147-167 (2020).
Shu, M., et al., A novel anti-HER2 antibody GB235 reverses Trastuzumab resistance in HER2-expressing tumor cells in vitro and in vivo, Scientific Reports, 10:2986 (2020).
Yin, Y., et al., Surf4 (Erv29p) binds amino-terminal tripeptide motifs of soluble cargo proteins with different affinities, enabling prioritization of their exit from the endoplasmic reticulum, PLoS Bio, 16(8): e2005140 (2018).

* cited by examiner

```
SEQUENCE LISTING

Sequence total quantity: 111
SEQ ID NO: 1            moltype = AA  length = 15
FEATURE                 Location/Qualifiers
source                  1..15
                        mol_type = protein
                        organism = Severe acute respiratory syndrome coronavirus 2
SEQUENCE: 1
MFVFLVLLPL VSSAA                                                          15

SEQ ID NO: 2            moltype = AA  length = 91
FEATURE                 Location/Qualifiers
source                  1..91
                        mol_type = protein
                        organism = synthetic construct
SEQUENCE: 2
MRFPSIFTAV LFAASSALAA PVNTTTEDET AQIPAEAVIG YLDLEGDFDV AVLPFSNSTN          60
NGLLFINTTI ASIAAKEEGV SLDKREAEAA A                                        91

SEQ ID NO: 3            moltype = AA  length = 212
FEATURE                 Location/Qualifiers
source                  1..212
                        mol_type = protein
                        organism = Severe acute respiratory syndrome coronavirus 2
SEQUENCE: 3
MFVFLVLLPL VSSAANITNL CPFGEVFNAT RFASVYAWNR KRISNCVADY SVLYNSASFS          60
TFKCYGVSPT KLNDLCFTNV YADSFVIRGD EVRQIAPGQT GKIADYNYKL PDDFTGCVIA         120
WNSNNLDSKV GGNYNYLYRL FRKSNLKPFE RDISTEIYQA GSTPCNGVEG FNCYFPLQSY         180
GFQPTNGVGY QPYRVVVLSF ELLHAPATVC GP                                      212

SEQ ID NO: 4            moltype = AA  length = 288
FEATURE                 Location/Qualifiers
source                  1..288
                        mol_type = protein
                        organism = synthetic construct
SEQUENCE: 4
MRFPSIFTAV LFAASSALAA PVNTTTEDET AQIPAEAVIG YLDLEGDFDV AVLPFSNSTN          60
NGLLFINTTI ASIAAKEEGV SLDKREAEAA ANITNLCPFG EVFNATRFAS VYAWNRKRIS         120
NCVADYSVLY NSASFSTFKC YGVSPTKLND LCFTNVYADS FVIRGDEVRQ IAPGQTGKIA         180
DYNYKLPDDF TGCVIAWNSN NLDSKVGGNY NYLYRLFRKS NLKPFERDIS TEIYQAGSTP         240
CNGVEGFNCY FPLQSYGFQP TNGVGYQPYR VVVLSFELLH APATVCGP                     288

SEQ ID NO: 5            moltype = AA  length = 212
FEATURE                 Location/Qualifiers
source                  1..212
                        mol_type = protein
                        organism = synthetic construct
SEQUENCE: 5
MFVFLVLLPL VSSAANITNL CPFGEVFNAT RFASVYAWNR KRISNCVADY SVLYNSASAA          60
AAACYGVSPT KLNDLCFTNV YADSFVIRGD EVRQIAPGQT GKIADYNYKL PDDFTGCVIA         120
WNSNNLDSKV GGNYNYLYRL FRKSNLKPFE RDISTEIYQA GSTPCNGVEG FNCYFPLQSY         180
GFQPTNGVGY QPYRVVVLSF ELLHAPATVC GP                                      212

SEQ ID NO: 6            moltype = AA  length = 288
FEATURE                 Location/Qualifiers
```

```
source                      1..288
                            mol_type = protein
                            organism = synthetic construct
SEQUENCE: 6
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ANITNLCPFG EVFNATRFAS VYAWNRKRIS   120
NCVADYSVLY NSASAAAAAC YGVSPTKLND LCFTNVYADS FVIRGDEVRQ IAPGQTGKIA   180
DYNYKLPDDF TGCVIAWNSN NLDSKVGGNY NYLYRLFRKS NLKPFERDIS TEIYQAGSTP   240
CNGVEGFNCY FPLQSYGFQP TNGVGYQPYR VVVLSFELLH APATVCGP               288

SEQ ID NO: 7                moltype = AA  length = 212
FEATURE                     Location/Qualifiers
source                      1..212
                            mol_type = protein
                            organism = synthetic construct
SEQUENCE: 7
MFVFLVLLPL VSSAANITNL CPFGEVFNAT RFASVYAWNR KRISNCVADY SVLYNSASFS    60
TFKCYGVSPT KLNDLCFTNV YADSFVIRGD EVRQIAPGQT GKIADYNYKL PDDFTGCVIA   120
WNSNNLDSKV GGNYNYLYRL FRKSNLKPFE RDISTEIYQA GSTPCNGVEG FNCYFPLQSY   180
GFQPTNGVGY QPYRVVVLSF ELLHAAAAAC GP                                212

SEQ ID NO: 8                moltype = AA  length = 288
FEATURE                     Location/Qualifiers
source                      1..288
                            mol_type = protein
                            organism = synthetic construct
SEQUENCE: 8
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ANITNLCPFG EVFNATRFAS VYAWNRKRIS   120
NCVADYSVLY NSASFSTFKC YGVSPTKLND LCFTNVYADS FVIRGDEVRQ IAPGQTGKIA   180
DYNYKLPDDF TGCVIAWNSN NLDSKVGGNY NYLYRLFRKS NLKPFERDIS TEIYQAGSTP   240
CNGVEGFNCY FPLQSYGFQP TNGVGYQPYR VVVLSFELLH AAAACGP                288

SEQ ID NO: 9                moltype = AA  length = 528
FEATURE                     Location/Qualifiers
source                      1..528
                            mol_type = protein
                            organism = synthetic construct
SEQUENCE: 9
MKANLLVLLC ALAAADADTI CIGYHANNST DTVDTVLEKN VTVTHSVNLL EDSHNGKLCR    60
LKGIAPLQLG KCNIAGWLLG NPECDPLLPV RSWSYIVETP NSENGICYPG DFIDYEELRE   120
QLSSVSSFER FEIFPKESSW PNHNTNGVTA ACSHEGKSSF YRNLLWLTEK EGSYPKLKNS   180
YVNKKGKEVL VLWGIHHPPN SKEQQNLYQN ENAYVSVVTS NYNRRFTPEI AERPKVRDQA   240
GRMNYYWTLL KPGDTIIFEA NGNLIAPMYA FALSRGFGSG IITSNASMHE CNTKCQTPLG   300
AINSSLPYQN IHPVTIGECP KYVRSAKLRM VTGLRNIPSI QSRGLFGAIA GFIEGGWTGM   360
IDGWYGYHHQ NEQGSGYAAD QKSTQNAING ITNKVNTVIE KMNIQFTAVG KEFNKLEKRM   420
ENLNKKVDDG FLDIWTYNAE LLVLLENERT LDFHDSNVKN LYEKVKSQLK NNAKEIGNGC   480
FEFYHKCDNE CMESVRNGTY DYPKYSEESK LNREKVDGVK LESMGIYQ               528

SEQ ID NO: 10               moltype = AA  length = 602
FEATURE                     Location/Qualifiers
source                      1..602
                            mol_type = protein
                            organism = synthetic construct
SEQUENCE: 10
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ADTICIGYHA NNSTDTVDTV LEKNVTVTHS   120
VNLLEDSHNG KLCRLKGIAP LQLGKCNIAG WLLGNPECDP LLPVRSWSYI VETPNSENGI   180
CYPGDFIDYE ELREQLSSVS SFERFEIFPK ESSWPNHNTN GVTAACSHEG KSSFYRNLLW   240
LTEKEGSYPK LKNSYVNKKG KEVLVLWGIH HPPNSKEQQN LYQNENAYVS VVTSNYNRRF   300
TPEIAERPKV RDQAGRMNYY WTLLKPGDTI IFEANGNLIA PMYAFALSRG FGSGIITSNA   360
SMHECNTKCQ TPLGAINSSL PYQNIHPVTI GECPKYVRSA KLRMVTGLRN IPSIQSRGLF   420
GAIAGFIEGG WTGMIDGWYG YHHQNEQGSG YAADQKSTQN AINGITNKVN TVIEKMNIQF   480
TAVGKEFNKL EKRMENLNKK VDDGFLDIWT YNAELLVLLE NERTLDFHDS NVKNLYEKVK   540
SQLKNNAKEI GNGCFEFYHK CDNECMESVR NGTYDYPKYS EESKLNREKV DGVKLESMGI   600
YQ                                                                 602

SEQ ID NO: 11               moltype = AA  length = 506
FEATURE                     Location/Qualifiers
source                      1..506
                            mol_type = protein
                            organism = Homo sapiens
SEQUENCE: 11
MLGPCMLLLL LLLGLRLQLS LGIIPVEEEN PDFWNREAAE ALGAAKKLQP AQTAAKNLII    60
FLGDGMGVST VTAARILKGQ KKDKLGPEIP LAMDRFPYVA LSKTYNVDKH VPDSGATATA   120
YLCGVKGNFQ TIGLSAAARF NQCNTTRGNE VISVMNRAKK AGKSVGVVTT TRVQHASPAG   180
TYAHTVNRNW YSDADVPASA RQEGCQDIAT QLISNMDIDV ILGGGRKYMF RMGTPDPEYP   240
DDYSQGGTRL DGKNLVQEWL AKRQGARYVW NRTELMQASL DPSVTHLMGL FEPGDMKYEI   300
HRDSTLDPSL MEMTEAALRL LSRNPRGFFL FVEGGRIDHG HHESRAYRAL TETIMFDDAI   360
```

```
ERAGQLTSEE DTLSLVTADH SHVFSFGGYP LRGSSIFGLA PGKARDRKAY TVLLYGNGPG    420
YVLKDGARPD VTESESGSPE YRQQSAVPLD EETHAGEDVA VFARGPQAHL VHGVQEQTFI    480
AHVMAFAACL EPYTACDLAP PAGTTD                                        506

SEQ ID NO: 12           moltype = AA   length = 575
FEATURE                 Location/Qualifiers
source                  1..575
                        mol_type = protein
                        organism = synthetic construct
SEQUENCE: 12
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AIIPVEEENP DFWNREAAEA LGAAKKLQPA   120
QTAAKNLIIF LGDGMGVSTV TAARILKGQK KDKLGPEIPL AMDRFPYVAL SKTYNVDKHV   180
PDSGATATAY LCGVKGNFQT IGLSAAARFN QCNTTRGNEV ISVMNRAKKA GKSVGVVTTT   240
RVQHASPAGT YAHTVNRNWY SDADVPASAR QEGCQDIATQ LISNMDIDVI LGGGRKYMFR   300
MGTPDPEYPD DYSQGGTRLD GKNLVQEWLA KRQGARYVWN RTELMQASLD PSVTHLMGLF   360
EPGDMKYEIH RDSTLDPSLM EMTEAALRLL SRNPRGFFLF VEGGRIDHGH HESRAYRALT   420
ETIMFDDAIE RAGQLTSEED TLSLVTADHS HVFSFGGYPL RGSSIFGLAP GKARDRKAYT   480
VLLYGNGPGY VLKDGARPDV TESESGSPEY RQQSAVPLDE ETHAGEDVAV FARGPQAHLV   540
HGVQEQTFIA HVMAFAACLE PYTACDLAPP AGTTD                             575

SEQ ID NO: 13           moltype = AA   length = 258
FEATURE                 Location/Qualifiers
source                  1..258
                        mol_type = protein
                        organism = synthetic construct
SEQUENCE: 13
MFVFLVLLPL VSSAAEVQLV ESGGGLVQPG GSLRLSCAAS GFNIKDTYIH WVRQAPGKGL    60
EWVARIYPTN GYTRYADSVK GRFTISADTS KNTAYLQMNS LRAEDTAVYY CSRWGGDGFY   120
AMDYWGQGTL VTVSSGGGGS GGGGSGGGGS DIQMTQSPSS LSASVGDRVT ITCRASQDVN   180
TAVAWYQQKP GKAPKLLIYS ASFLYSGVPS RFSGSRSGTD FTLTISSLQP EDFATYYCQQ   240
HYTTPPTFGQ GTKVEIKR                                                 258

SEQ ID NO: 14           moltype = AA   length = 334
FEATURE                 Location/Qualifiers
source                  1..334
                        mol_type = protein
                        organism = synthetic construct
SEQUENCE: 14
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVQLVESGG GLVQPGGSLR LSCAASGFNI   120
KDTYIHWVRQ APGKGLEWVA RIYPTNGYTR YADSVKGRFT ISADTSKNTA YLQMNSLRAE   180
DTAVYYCSRW GGDGFYAMDY WGQGTLVTVS SGGGGSGGGG SGGGGSDIQM TQSPSSLSAS   240
VGDRVTITCR ASQDVNTAVA WYQQKPGKAP KLLIYSASFL YSGVPSRFSG SRSGTDFTLT   300
ISSLQPEDFA TYYCQQHYTT PPTFGQGTKV EIKR                              334

SEQ ID NO: 15           moltype = AA   length = 257
FEATURE                 Location/Qualifiers
source                  1..257
                        mol_type = protein
                        organism = synthetic construct
SEQUENCE: 15
MFVFLVLLPL VSSAAEVQLV ESGGGLVQPG GSLRLSCAAS GFTFTDYTMD WVRQAPGKGL    60
EWVADVNPNS GGSIYNQRFK GRFTLSVDRS KNTLYLQMNS LRAEDTAVYY CARNLGPSFY   120
FDYWGQGTLV TVSSGGGGSG GGSGGGGSD IQMTQSPSSL SASVGDRVTI TCKASQDVSI    180
GVAWYQQKPG KAPKLLIYSA SYRYTGVPSR FSGSGSGTDF TLTISSLQPE DFATYYCQQY   240
YIYPYTFGQG TKVEIKR                                                  257

SEQ ID NO: 16           moltype = AA   length = 333
FEATURE                 Location/Qualifiers
source                  1..333
                        mol_type = protein
                        organism = synthetic construct
SEQUENCE: 16
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVQLVESGG GLVQPGGSLR LSCAASGFTF   120
TDYTMDWVRQ APGKGLEWVA DVNPNSGGSI YNQRFKGRFT LSVDRSKNTL YLQMNSLRAE   180
DTAVYYCARN LGPSFYFDYW GQGTLVTVSS GGGGSGGGGS GGGGSDIQMT QSPSSLSASV   240
GDRVTITCKA SQDVSIGVAW YQQKPGKAPK LLIYSASYRY TGVPSRFSGS GSGTDFTLTI   300
SSLQPEDFAT YYCQQYYIYP YTFGQGTKVE IKR                               333

SEQ ID NO: 17           moltype = AA   length = 256
FEATURE                 Location/Qualifiers
source                  1..256
                        mol_type = protein
                        organism = synthetic construct
SEQUENCE: 17
MFVFLVLLPL VSSAAEVQLV QSGAEVKKPG APVKVSCKAS GYTFTSYDIN WVRQATGQGL    60
EWMGWMNPNS GNTGYAQKFQ GRVTMTRNTS ISTAYMELSS LRSEDTAVYY CARGYYLSRG   120
```

```
DFWGQGTLVT VSSGGGGSGG GGSGGGGSDI QMTQSPSSVS ASVGDRVTIT CRASQGISSW    180
LAWYQQKPGK APKLLIYAAS SLQSGVPSRF SGSGSGTDFT LTISSLQPED FATYYCQQAN    240
SFPLTFGGGT KVEIKR                                                    256

SEQ ID NO: 18           moltype = AA  length = 332
FEATURE                 Location/Qualifiers
source                  1..332
                        mol_type = protein
                        organism = synthetic construct
SEQUENCE: 18
MRFPSIFTAV LFAASSALAA PVNTTTEDET AQIPAEAVIG YLDLEGDFDV AVLPFSNSTN     60
NGLLFINTTI ASIAAKEEGV SLDKREAEAA AEVQLVQSGA EVKKPGAPVK VSCKASGYTF    120
TSYDINWVRQ ATGQGLEWMG WMNPNSGNTG YAQKFQGRVT MTRNTSISTA YMELSSLRSE    180
DTAVYYCARG YYLSRGDFWG QGTLVTVSSG GGGSGGGGSG GGGSDIQMTQ SPSSVSASVG    240
DRVTITCRAS QGISSWLAWY QQKPGKAPKL LIYAASSLQS GVPSRFSGSG SGTDFTLTIS    300
SLQPEDFATY YCQQANSFPL TFGGGTKVEI KR                                  332

SEQ ID NO: 19           moltype = AA  length = 263
FEATURE                 Location/Qualifiers
source                  1..263
                        mol_type = protein
                        organism = synthetic construct
SEQUENCE: 19
MEFGLSWVFL VALFRGVQCE VQLVESGGGL VQPGRSLRLS CAASGFTFDD YAMHWVRQAP     60
GKGLEWVSAI TWNSGHIDYA DSVEGRFTIS RDNAKNSLYL QMNSLRAEDT AVYYCAKVSY    120
LSTASSLDYW GQGTLVTVSS GGGGSGGGGS GGGGSDIQMT QSPSSLSASV GDRVTITCRA    180
SQGIRNYLAW YQQKPGKAPK LLIYAASTLQ SGVPSRFSGS GSGTDFTLTI SSLQPEDVAT    240
YYCQRYNRAP YTFGQGTKVE IKR                                            263

SEQ ID NO: 20           moltype = AA  length = 335
FEATURE                 Location/Qualifiers
source                  1..335
                        mol_type = protein
                        organism = synthetic construct
SEQUENCE: 20
MRFPSIFTAV LFAASSALAA PVNTTTEDET AQIPAEAVIG YLDLEGDFDV AVLPFSNSTN     60
NGLLFINTTI ASIAAKEEGV SLDKREAEAA AEVQLVESGG GLVQPGRSLR LSCAASGFTF    120
DDYAMHWVRQ APGKGLEWVS AITWNSGHID YADSVEGRFT ISRDNAKNSL YLQMNSLRAE    180
DTAVYYCAKV SYLSTASSLD YWGQGTLVTV SSGGGGSGGG GSGGGGSDIQ MTQSPSSLSA    240
SVGDRVTITC RASQGIRNYL AWYQQKPGKA PKLLIYAAST LQSGVPSRFS GSGSGTDFTL    300
TISSLQPEDV ATYYCQRYNR APYTFGQGTK VEIKR                               335

SEQ ID NO: 21           moltype = AA  length = 266
FEATURE                 Location/Qualifiers
source                  1..266
                        mol_type = protein
                        organism = synthetic construct
SEQUENCE: 21
MDWTWRFLFV VAAATGVQSQ VQLVQSGVEV KKPGASVKVS CKASGYTFTN YYMYWVRQAP     60
GQGLEWMGGI NPSNGGTNFN EKFKNRVTLT TDSSTTTAYM ELKSLQFDDT AVYYCARRDY    120
RFDMGFDYWG QGTTVTVSSG GGSGGGGSG GGGSEIVLTQ SPATLSLSPG ERATLSCRAS     180
KGVSTSGYSY LHWYQQKPGQ APRLLIYLAS YLESGVPARF SGSGSGTDFT LTISSLEPED    240
FAVYYCQHSR DLPLTFGGGT KVEIKR                                         266

SEQ ID NO: 22           moltype = AA  length = 338
FEATURE                 Location/Qualifiers
source                  1..338
                        mol_type = protein
                        organism = synthetic construct
SEQUENCE: 22
MRFPSIFTAV LFAASSALAA PVNTTTEDET AQIPAEAVIG YLDLEGDFDV AVLPFSNSTN     60
NGLLFINTTI ASIAAKEEGV SLDKREAEAA AQVQLVQSGV EVKKPGASVK VSCKASGYTF    120
TNYYMWVRQ APGQGLEWMG GINPSNGGTN FNEKFKNRVT LTTDSSTTTA YMELKSLQFD     180
DTAVYYCARR DYRFDMGFDY WGQGTTVTVS SGGGGSGGGG SGGGGSEIVL TQSPATLSLS    240
PGERATLSCR ASKGVSTSGY SYLHWYQQKP GQAPRLLIYL ASYLESGVPA RFSGSGSGTD    300
FTLTISSLEP EDFAVYYCQH SRDLPLTFGG GTKVEIKR                            338

SEQ ID NO: 23           moltype = AA  length = 231
FEATURE                 Location/Qualifiers
source                  1..231
                        mol_type = protein
                        organism = synthetic construct
SEQUENCE: 23
MVSYWDTGVL LCALLSCLLL TGSSSGSDTG RPFVEMYSEI PEIIHMTEGR ELVIPCRVTS     60
PNITVTLKKF PLDTLIPDGK RIIWDSRKGF IISNATYKEI GLLTCEATVN GHLYKTNYLT    120
HRQTNTIIDV VLSPSHGIEL SVGEKLVLNC TARTELNVGI DFNWEYPSSK HQHKKLVNRD    180
LKTQSGSEMK KFLSTLTIDG VTRSDQGLYT CAASSGLMTK KNSTFVRVHE K             231

SEQ ID NO: 24           moltype = AA  length = 296
```

```
FEATURE                 Location/Qualifiers
source                  1..296
                        mol_type = protein
                        organism = synthetic construct
SEQUENCE: 24
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ASDTGRPFVE MYSEIPEIIH MTEGRELVIP   120
CRVTSPNITV TLKKFPLDTL IPDGKRIIWD SRKGFIISNA TYKEIGLLTC EATVNGHLYK   180
TNYLTHRQTN TIIDVVLSPS HGIELSVGEK LVLNCTARTE LNVGIDFNWE YPSSKHQHKK   240
LVNRDLKTQS GSEMKKFLST LTIDGVTRSD QGLYTCAASS GLMTKKNSTF VRVHEK       296

SEQ ID NO: 25           moltype = AA  length = 344
FEATURE                 Location/Qualifiers
source                  1..344
                        mol_type = protein
                        organism = synthetic construct
SEQUENCE: 25
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVQLVESGG GLEQPGGSLR LSCAGSGFTF   120
RDYAMTWVRQ APGKGLEWVS SISGSGGNTY YADSVKGRFT ISRDNSKNTL YLQMNSLRAE   180
DTAVYYCAKD RLSITIRPRY YGLDVWGQGT TVTVSSGGGG SGGGGSGGGG SDIVMTQSPL   240
SLPVTPGEPA SISCRSSQSL LYSIGYNYLD WYLQKSGQSP QLLIYLGSNR ASGVPDRFSG   300
SGSGTDFTLK ISRVEAEDVG FYYCMQALQT PYTFGQGTKL EIKR                    344

SEQ ID NO: 26           moltype = AA  length = 338
FEATURE                 Location/Qualifiers
source                  1..338
                        mol_type = protein
                        organism = synthetic construct
SEQUENCE: 26
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AQVQLVQSGV EVKKPGASVK VSCKASGYTF   120
TNYYMYWVRQ APGQGLEWMG GINPSNGGTN FNEKFKNRVT LTTDSSTTTA YMELKSLQFD   180
DTAVYYCARR DYRFDMGFDY WGQGTTVTVS SGGGGSGGGG SGGGGSEIVL TQSPATLSLS   240
PGERATLSCR ASKGVSTSGY SYLHWYQQKP GQAPRLLIYL ASYLESGVPA RFSGSGSGTD   300
FTLTISSLEP EDFAVYYCQH SRDLPLTFGG GTKVEIKR                            338

SEQ ID NO: 27           moltype = AA  length = 261
FEATURE                 Location/Qualifiers
source                  1..261
                        mol_type = protein
                        organism = synthetic construct
SEQUENCE: 27
MELGLSWIFL LAILKGVQCE VQLVQSGAEV KKPGESLKIS CKGSGYSFTT YWLGWVRQMP    60
GKGLDWIGIM SPVDSDIRYS PSFQGQVTMS VDKSITTAYL QWNSLKASDT AMYYCARRRP   120
GQGYFDFWGQ GTLVTVSSGG GGSGGGGSGG GGSDIQMTQS PSSLSASVGD RVTITCRASQ   180
GISSWLAWYQ QKPEKAPKSL IYAASSLQSG VPSRFSGSGS GTDFTLTISS LQPEDFATYY   240
CQQYNIYPYT FGQGTKLEIK R                                              261

SEQ ID NO: 28           moltype = AA  length = 333
FEATURE                 Location/Qualifiers
source                  1..333
                        mol_type = protein
                        organism = synthetic construct
SEQUENCE: 28
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVQLVQSGA EVKKPGESLK ISCKGSGYSF   120
TTYWLGWVRQ MPGKGLDWIG IMSPVDSDIR YSPSFQGQVT MSVDKSITTA YLQWNSLKAS   180
DTAMYYCARR RPGQGYFDFW GQGTLVTVSS GGGGSGGGGS GGGGSDIQMT QSPSSLSASV   240
GDRVTITCRA SQGISSWLAW YQQKPEKAPK SLIYAASSLQ SGVPSRFSGS GSGTDFTLTI   300
SSLQPEDFAT YYCQQYNIYP YTFGQGTKLE IKR                                 333

SEQ ID NO: 29           moltype = AA  length = 255
FEATURE                 Location/Qualifiers
source                  1..255
                        mol_type = protein
                        organism = synthetic construct
SEQUENCE: 29
MKHLWFFLLL VAAPRWVLSQ VQLVESGGGV VQPGRSLRLD CKASGITFSN SGMHWVRQAP    60
GKGLEWVAVI WYDGSKRYYA DSVKGRFTIS RDNSKNTLFL QMNSLRAEDT AVYYCATNDD   120
YWGQGTLVTV SSGGGGSGGG GSGGGGSEIV LTQSPATLSL SPGERATLSC RASQSVSSYL   180
AWYQQKPGQA PRLLIYDASN RATGIPARFS GSGSGTDFTL TISSLEPEDF AVYYCQQSSN   240
WPRTFGQGTK VEIKR                                                     255

SEQ ID NO: 30           moltype = AA  length = 327
FEATURE                 Location/Qualifiers
source                  1..327
                        mol_type = protein
                        organism = synthetic construct
```

```
SEQUENCE: 30
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AQVQLVESGG GVVQPGRSLR LDCKASGITF   120
SNSGMHWVRQ APGKGLEWVA VIWYDGSKRY YADSVKGRFT ISRDNSKNTL FLQMNSLRAE   180
DTAVYYCATN DDYWGQGTLV TVSSGGGGSG GGGSGGGGSE IVLTQSPATL SLSPGERATL   240
SCRASQSVSS YLAWYQQKPG QAPRLLIYDA SNRATGIPAR FSGSGSGTDF TLTISSLEPE   300
DFAVYYCQQS SNWPRTFGQG TKVEIKR                                      327

SEQ ID NO: 31           moltype = AA   length = 265
FEATURE                 Location/Qualifiers
source                  1..265
                        mol_type = protein
                        organism = synthetic construct
SEQUENCE: 31
MEFGLSWLFL VAILKGVQCE VQLVESGGGL VQPGGSLRLS CAASGYTFTN YGMNWVRQAP    60
GKGLEWVGWI NTYTGEPTYA ADFKRRFTFS LDTSKSTAYL QMNSLRAEDT AVYYCAKYPH   120
YYGSSHWYFD VWGQGTLVTV SSGGGGSGGG GSGGGGSDIQ MTQSPSSLSA SVGDRVTITC   180
SASQDISNYL NWYQQKPGKA PKVLIYFTSS LHSGVPSRFS GSGSGTDFTL TISSLQPEDF   240
ATYYCQQYST VPWTFGQGTK VEIKR                                        265

SEQ ID NO: 32           moltype = AA   length = 337
FEATURE                 Location/Qualifiers
source                  1..337
                        mol_type = protein
                        organism = synthetic construct
SEQUENCE: 32
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVQLVESGG GLVQPGGSLR LSCAASGYTF   120
TNYGMNWVRQ APGKGLEWVG WINTYTGEPT YAADFKRRFT FSLDTSKSTA YLQMNSLRAE   180
DTAVYYCAKY PHYYGSSHWY FDVWGQGTLV TVSSGGGGSG GGGSGGGGSD IQMTQSPSSL   240
SASVGDRVTI TCSASQDISN YLNWYQQKPG KAPKVLIYFT SSLHSGVPSR FSGSGSGTDF   300
TLTISSLQPE DFATYYCQQY STVPWTFGQG TKVEIKR                            337

SEQ ID NO: 33           moltype = AA   length = 257
FEATURE                 Location/Qualifiers
source                  1..257
                        mol_type = protein
                        organism = synthetic construct
SEQUENCE: 33
MAPVAVWAAL AVGLELWAAA HALPAQVAFT PYAPEPGSTC RLREYYDQTA QMCCSKCSPG    60
QHAKVFCTKT SDTVCDSCED STYTQLWNWV PECLSCGSRC SSDQVETQAC TREQNRICTC   120
RPGWYCALSK QEGCRLCAPL RKCRPGFGVA RPGTETSDVV CKPCAPGTFS NTTSSTDICR   180
PHQICNVVAI PGNASMDAVC TSTSPTRSMA PGAVHLPQPV STRSQHTQPT PEPSTAPSTS   240
FLLPMGPSPP AEGSTGD                                                 257

SEQ ID NO: 34           moltype = AA   length = 326
FEATURE                 Location/Qualifiers
source                  1..326
                        mol_type = protein
                        organism = synthetic construct
SEQUENCE: 34
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ALPAQVAFTP YAPEPGSTCR LREYYDQTAQ   120
MCCSKCSPGQ HAKVFCTKTS DTVCDSCEDS TYTQLWNWVP ECLSCGSRCS SDQVETQACT   180
REQNRICTCR PGWYCALSKQ EGCRLCAPLR KCRPGFGVAR PGTETSDVVC KPCAPGTFSN   240
TTSSTDICRP HQICNVVAIP GNASMDAVCT STSPTRSMAP GAVHLPQPVS TRSQHTQPTP   300
EPSTAPSTSF LLPMGPSPPA EGSTGD                                       326

SEQ ID NO: 35           moltype = AA   length = 332
FEATURE                 Location/Qualifiers
source                  1..332
                        mol_type = protein
                        organism = synthetic construct
SEQUENCE: 35
MALPVTALLL PLALLLHAAR PEVKLQESGP GLVAPSQSLS VTCTVSGVSL PDYGVSWIRQ    60
PPRKGLEWLG VIWGSETTYY NSALKSRLTI IKDNSKSQVF LKMNSLQTDD TAIYYCAKHY   120
YYGGSYAMDY WGQGTSVTVS SGGGGSGGGG SGGGGSDIQM TQTTSSLSAS LGDRVTISCR   180
ASQDISKYLN WYQQKPDGTV KLLIYHTSRL HSGVPSRFSG SGSGTDYSLT ISNLEQEDIA   240
TYFCQQGNTL PYTFGGGTKL EITTTTPAPR PPTPAPTIAS QPLSLRPEAC RPAAGGAVHT   300
RGLDFACDIY IWAPLAGTCG VLLLSLVITL YC                                332

SEQ ID NO: 36           moltype = AA   length = 402
FEATURE                 Location/Qualifiers
source                  1..402
                        mol_type = protein
                        organism = synthetic construct
SEQUENCE: 36
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEVKLQESGP GLVAPSQSLS VTCTVSGVSL   120
```

```
PDYGVSWIRQ PPRKGLEWLG VIWGSETTYY NSALKSRLTI IKDNSKSQVF LKMNSLQTDD    180
TAIYYCAKHY YYGGSYAMDY WGQGTSVTVS SGGGGSGGGG SGGGGSDIQM TQTTSSLSAS    240
LGDRVTISCR ASQDISKYLN WYQQKPDGTV KLLIYHTSRL HSGVPSRFSG SGSGTDYSLT    300
ISNLEQEDIA TYFCQQGNTL PYTFGGGTKL EITTTTPAPR PPTPAPTIAS QPLSLRPEAC    360
RPAAGGAVHT RGLDFACDIY IWAPLAGTCG VLLLSLVITL YC                      402

SEQ ID NO: 37           moltype = AA   length = 305
FEATURE                 Location/Qualifiers
source                  1..305
                        mol_type = protein
                        organism = synthetic construct
SEQUENCE: 37
MYRMQLLSCI ALSLALVTNS DIQMTQTTSS LSASLGDRVT ISCRASQDIS KYLNWYQQKP     60
DGTVKLLIYH TSRLHSGVPS RFSGSGSGTD YSLTISNLEQ EDIATYFCQQ GNTLPYTFGG    120
GTKLEITGGG GSGGGGSGGG GSEVKLQESG PGLVAPSQSL SVTCTVSGVS LPDYGVSWIR    180
QPPRKGLEWL GVIWGSETTY YNSALKSRLT IIKDNSKSQV FLKMNSLQTD TAIYYCAKH    240
YYYGGSYAMD YWGQGTSVTV SSGKHLCPSP LFPGPSKPFW VLVVVGGVLA CYSLLVTVAF    300
IIFWV                                                                305

SEQ ID NO: 38           moltype = AA   length = 376
FEATURE                 Location/Qualifiers
source                  1..376
                        mol_type = protein
                        organism = synthetic construct
SEQUENCE: 38
MRFPSIFTAV LFAASSALAA PVNTTTEDET AQIPAEAVIG YLDLEGDFDV AVLPFSNSTN     60
NGLLFINTTI ASIAAKEEGV SLDKREAEAA ADIQMTQTTS SLSASLGDRV TISCRASQDI    120
SKYLNWYQQK PDGTVKLLIY HTSRLHSGVP SRFSGSGSGT DYSLTISNLE QEDIATYFCQ    180
QGNTLPYTFG GGTKLEITGG GGSGGGGSGG GGSEVKLQES GPGLVAPSQS LSVTCTVSGV    240
SLPDYGVSWI RQPPRKGLEW LGVIWGSETT YYNSALKSRL TIIKDNSKSQ VFLKMNSLQT    300
DDTAIYYCAK HYYYGGSYAM DYWGQGTSVT VSSGKHLCPS PLFPGPSKPF WVLVVVGGVL    360
ACYSLLVTVA FIIFWV                                                    376

SEQ ID NO: 39           moltype = AA   length = 303
FEATURE                 Location/Qualifiers
source                  1..303
                        mol_type = protein
                        organism = synthetic construct
SEQUENCE: 39
MDMRVPAQLL GLLLLWLRGA RCDIQMTQTT SSLSASLGDR VTISCRASQD ISKYLNWYQQ     60
KPDGTVKLLI YHTSRLHSGV PSRFSGSGSG TDYSLTISNL EQEDIATYFC QQGNTLPYTF    120
GGGTKLEITG GGGSGGGGSG GGGSEVKLQE SGPGLVAPSQ SLSVTCTVSG VSLPDYGVSW    180
IRQPPRKGLE WLGVIWGSET TYYNSALKSR LTIIKDNSKS QVFLKMNSLQ TDDTAIYYCA    240
KHYYYGGSYA MDYWGQGTSV TVSSESKYGP PCPSCPFWVL VVVGGVLACY SLLVTVAFII    300
FWV                                                                  303

SEQ ID NO: 40           moltype = AA   length = 372
FEATURE                 Location/Qualifiers
source                  1..372
                        mol_type = protein
                        organism = synthetic construct
SEQUENCE: 40
MRFPSIFTAV LFAASSALAA PVNTTTEDET AQIPAEAVIG YLDLEGDFDV AVLPFSNSTN     60
NGLLFINTTI ASIAAKEEGV SLDKREAEAA ADIQMTQTTS SLSASLGDRV TISCRASQDI    120
SKYLNWYQQK PDGTVKLLIY HTSRLHSGVP SRFSGSGSGT DYSLTISNLE QEDIATYFCQ    180
QGNTLPYTFG GGTKLEITGG GGSGGGGSGG GGSEVKLQES GPGLVAPSQS LSVTCTVSGV    240
SLPDYGVSWI RQPPRKGLEW LGVIWGSETT YYNSALKSRL TIIKDNSKSQ VFLKMNSLQT    300
DDTAIYYCAK HYYYGGSYAM DYWGQGTSVT VSSESKYGPP CPSCPFWVLV VVGGVLACYS    360
LLVTVAFIIF WV                                                        372

SEQ ID NO: 41           moltype = AA   length = 398
FEATURE                 Location/Qualifiers
source                  1..398
                        mol_type = protein
                        organism = synthetic construct
SEQUENCE: 41
MYKLTVFLMF IAFVIIAEAA ANITNLCPFG EVFNATRFAS VYAWNRKRIS NCVADYSVLY     60
NSASAAAAAC YGVSPTKLND LCFTNVYADS FVIRGDEVRQ IAPGQTGKIA DYNYKLPDDF    120
TGCVIAWNSN NLDSKVGGNY NYLYRLFRKS NLKPFERDIS TEIYQAGSTP CNGVEGFNCY    180
FPLQSYGFQP TNGVGYQPYR VVVLSFELLH APATVCGPSG GGSGGGSGVF TLEDFVGDWR    240
QTAGYNLDQV LEQGGVSSLF QNLGVSVTPI QRIVLSGENG LKIDIHVIIP YEGLSGDQMG    300
QIEKIFKVVY PVDDHHFKVI LHYGTLVIDG VTPNMIDYFG RPYEGIAVFD GKKITVTGTL    360
WNGNKIIDER LINPDGSLLF RVTINGVTGW RLCERILA                            398

SEQ ID NO: 42           moltype = AA   length = 449
FEATURE                 Location/Qualifiers
source                  1..449
                        mol_type = protein
                        organism = synthetic construct
```

```
SEQUENCE: 42
MSCSLRSGLV IVFCFILLLL SSNVGCASAA RRLRSHKHHH HKVASLDVFN GGERRRALGG    60
VETGEEVVVM AANITNLCPF GEVFNATRFA SVYAWNRKRI SNCVADYSVL YNSASAAAAA   120
CYGVSPTKLN DLCFTNVYAD SFVIRGDEVR QIAPGQTGKI ADYNYKLPDD FTGCVIAWNS   180
NNLDSKVGGN YNYLYRLFRK SNLKPFERDI STEIYQAGST PCNGVEGFNC YPPLQSYGFQ   240
PTNGVGYQPY RVVVLSFELL HAPATVCGPS GGGSGGSGSV FTLEDFVGDW RQTAGYNLDQ   300
VLEQGGVSSL FQNLGVSVTP IQRIVLSGEN GLKIDIHVII PYEGLSGDQM GQIEKIFKVV   360
YPVDDHHFKV ILHYGTLVID GVTPNMIDYF GRPYEGIAVF DGKKITVTGT LWNGNKIIDE   420
RLINPDGSLL FRVTINGVTG WRLCERILA                                    449

SEQ ID NO: 43         moltype = AA  length = 468
FEATURE               Location/Qualifiers
source                1..468
                      mol_type = protein
                      organism = synthetic construct
SEQUENCE: 43
MRFPSIFTAV LFAASSALAA PVNTTTEDET AQIPAEAVIG YLDLEGDFDV AVLPFSNSTN    60
NGLLFINTTI ASIAAKEEGV SLDKREAEAA ANITNLCPFG EVFNATRFAS VYAWNRKRIS   120
NCVADYSVLY NSASAAAAAC YGVSPTKLND LCFTNVYADS FVIRGDEVRQ IAPGQTGKIA   180
DYNYKLPDDF TGCVIAWNSN NLDSKVGGNY NYLYRLFRKS NLKPFERDIS TEIYQAGSTP   240
CNGVEGFNCY FPLQSYGFQP TNGVGYQPYR VVVLSFELLH APATVCGPSG GGSGGSGSVF   300
TLEDFVGDWR QTAGYNLDQV LEQGGVSSLF QNLGVSVTPI QRIVLSGENG LKIDIHVIIP   360
YEGLSGDQMG QIEKIFKVVY PVDDHHFKVI LHYGTLVIDG VTPNMIDYFG RPYEGIAVFD   420
GKKITVTGTL WNGNKIIDER LINPDGSLLF RVTINGVTGW RLCERILA                468

SEQ ID NO: 44         moltype = AA  length = 97
FEATURE               Location/Qualifiers
source                1..97
                      mol_type = protein
                      organism = synthetic construct
SEQUENCE: 44
MRFPSIFTAV LFAASSALAA PVNTTTEDET AQIPAEAVIG YLDLEGDFDV AVLPFSNSTN    60
NGLLFINTTI ASIAAKEEGV SLDRKRKRKR REAEAAA                             97

SEQ ID NO: 45         moltype = AA  length = 93
FEATURE               Location/Qualifiers
source                1..93
                      mol_type = protein
                      organism = synthetic construct
SEQUENCE: 45
MRFPSIFTAV LFAASSALAA PVNTTTEDET AQIPAEAVIG YLDLEGDFDV AVLPFSNSTN    60
NGLLFINTTI ASIAAKEEGV SLDRKRKRKR RAA                                 93

SEQ ID NO: 46         moltype = AA  length = 93
FEATURE               Location/Qualifiers
source                1..93
                      mol_type = protein
                      organism = synthetic construct
SEQUENCE: 46
MRFPSIFTAV LFAASSALAA PVNTTTEDET AQIPAEAVIG YLDLEGDFDV AVLPFSNSTN    60
NGLLFINTTI ASIAAKEEGV SLDKRKREAE AAA                                 93

SEQ ID NO: 47         moltype = AA  length = 89
FEATURE               Location/Qualifiers
source                1..89
                      mol_type = protein
                      organism = synthetic construct
SEQUENCE: 47
MRFPSIFTAV LFAASSALAA PVNTTTEDET AQIPAEAVIG YLDLEGDFDV AVLPFSNSTN    60
NGLLFINTTI ASIAAKEEGV SLDKRKRAA                                      89

SEQ ID NO: 48         moltype = AA  length = 87
FEATURE               Location/Qualifiers
source                1..87
                      mol_type = protein
                      organism = synthetic construct
SEQUENCE: 48
MRFPSIFTAV LFAASSALAA PVNTTTEDET AQIPAEAVIG YLDLEGDFDV AVLPFSNSTN    60
NGLLFINTTI ASIAAKEEGV SRRLLAA                                        87

SEQ ID NO: 49         moltype = AA  length = 92
FEATURE               Location/Qualifiers
source                1..92
                      mol_type = protein
                      organism = synthetic construct
SEQUENCE: 49
MRFPSIFTAV LFAASSALAA PVNTTTEDET AQIPAEAVIG YLDLEGDFDV AVLPFSNSTN    60
NGLLFINTTI ASIAAKEEGV SLDVFAQSIP AA                                  92
```

```
SEQ ID NO: 50            moltype = AA   length = 87
FEATURE                  Location/Qualifiers
source                   1..87
                         mol_type = protein
                         organism = synthetic construct
SEQUENCE: 50
MRFPSIFTAV LFAASSALAA PVNTTTEDET AQIPAEAVIG YLDLEGDFDV AVLPFSNSTN    60
NGLLFINTTI ASIAAKEEGV SLDKRAA                                       87

SEQ ID NO: 51            moltype = AA   length = 91
FEATURE                  Location/Qualifiers
source                   1..91
                         mol_type = protein
                         organism = synthetic construct
SEQUENCE: 51
MRFPSIFTAV LFAASSALAM PLNTTTEDET AQIPAEAVIG YLDLEGDFDV AVLPFSNSTN    60
NGLLFINTTI ASIAAKEEGV SLDKREAEAA A                                  91

SEQ ID NO: 52            moltype = AA   length = 8
FEATURE                  Location/Qualifiers
source                   1..8
                         mol_type = protein
                         organism = synthetic construct
SEQUENCE: 52
RKRKRKRR                                                            8

SEQ ID NO: 53            moltype = AA   length = 4
FEATURE                  Location/Qualifiers
source                   1..4
                         mol_type = protein
                         organism = synthetic construct
SEQUENCE: 53
KRKR                                                                4

SEQ ID NO: 54            moltype = AA   length = 7
FEATURE                  Location/Qualifiers
source                   1..7
                         mol_type = protein
                         organism = synthetic construct
SEQUENCE: 54
VFAQSIP                                                             7

SEQ ID NO: 55            moltype = AA   length = 4
FEATURE                  Location/Qualifiers
source                   1..4
                         mol_type = protein
                         organism = synthetic construct
SEQUENCE: 55
RRLL                                                                4

SEQ ID NO: 56            moltype = AA   length = 4
FEATURE                  Location/Qualifiers
source                   1..4
                         mol_type = protein
                         organism = synthetic construct
SEQUENCE: 56
EAEA                                                                4

SEQ ID NO: 57            moltype =      length =
SEQUENCE: 57
000

SEQ ID NO: 58            moltype =      length =
SEQUENCE: 58
000

SEQ ID NO: 59            moltype = DNA  length = 33
FEATURE                  Location/Qualifiers
source                   1..33
                         mol_type = other DNA
                         organism = synthetic construct
SEQUENCE: 59
cgagacagag aagactcttg cgtttctgat agg                                33

SEQ ID NO: 60            moltype = DNA  length = 38
FEATURE                  Location/Qualifiers
source                   1..38
                         mol_type = other DNA
                         organism = synthetic construct
```

| | | |
|---|---|---|
| SEQUENCE: 60 | | |
| cacaattgct gattcgtttt cgattccacg catatacg | | 38 |
| SEQ ID NO: 61<br>FEATURE<br>source | moltype = DNA length = 22<br>Location/Qualifiers<br>1..22<br>mol_type = other DNA<br>organism = synthetic construct | |
| SEQUENCE: 61 | | |
| ggtcttactg acatccactt tg | | 22 |
| SEQ ID NO: 62<br>FEATURE<br>source | moltype = DNA length = 40<br>Location/Qualifiers<br>1..40<br>mol_type = other DNA<br>organism = synthetic construct | |
| SEQUENCE: 62 | | |
| taatacgact cactataggg gccgccacca tgagatttcc | | 40 |
| SEQ ID NO: 63<br>FEATURE<br>source | moltype = DNA length = 37<br>Location/Qualifiers<br>1..37<br>mol_type = other DNA<br>organism = synthetic construct | |
| SEQUENCE: 63 | | |
| gatatccgcg gtaggaattc aggaccacaa actgtcg | | 37 |
| SEQ ID NO: 64<br>FEATURE<br>source | moltype = DNA length = 33<br>Location/Qualifiers<br>1..33<br>mol_type = other DNA<br>organism = synthetic construct | |
| SEQUENCE: 64 | | |
| cgagacagag aagactcttg cgtttctgat agg | | 33 |
| SEQ ID NO: 65<br>FEATURE<br>source | moltype = DNA length = 23<br>Location/Qualifiers<br>1..23<br>mol_type = other DNA<br>organism = synthetic construct | |
| SEQUENCE: 65 | | |
| gagagctcgc ctgcaggaat tgg | | 23 |
| SEQ ID NO: 66<br>FEATURE<br>source | moltype = AA length = 10<br>Location/Qualifiers<br>1..10<br>mol_type = protein<br>organism = synthetic construct | |
| SEQUENCE: 66 | | |
| SGGGSGGSGS | | 10 |
| SEQ ID NO: 67<br>SEQUENCE: 67<br>000 | moltype = length = | |
| SEQ ID NO: 68<br>FEATURE<br>source | moltype = AA length = 19<br>Location/Qualifiers<br>1..19<br>mol_type = protein<br>organism = synthetic construct | |
| SEQUENCE: 68 | | |
| MRFPSIFTAV LFAASSALA | | 19 |
| SEQ ID NO: 69<br>FEATURE<br>source | moltype = AA length = 72<br>Location/Qualifiers<br>1..72<br>mol_type = protein<br>organism = synthetic construct | |
| SEQUENCE: 69 | | |
| APVNTTTEDE TAQIPAEAVI GYLDLEGDFD VAVLPFSNST NNGLLFINTT IASIAAKEEG | | 60 |
| VSLDKREAEA AA | | 72 |
| SEQ ID NO: 70<br>FEATURE<br>source | moltype = AA length = 108<br>Location/Qualifiers<br>1..108<br>mol_type = protein<br>organism = synthetic construct | |
| SEQUENCE: 70 | | |
| MRFPSIFTAV LFAASSALAM PLSGGGSGGS GSMPLNTTTE DETAQIPAEA VIGYLDLEGD | | 60 |

```
FDVAVLPFSN STNNGLLFIN TTIASIAAKE EGVSRRLLRR LLRRLLAA              108

SEQ ID NO: 71             moltype = AA  length = 89
FEATURE                   Location/Qualifiers
source                    1..89
                          mol_type = protein
                          organism = synthetic construct
SEQUENCE: 71
MPLSGGGSGG SGSMPLNTTT EDETAQIPAE AVIGYLDLEG DFDVAVLPFS NSTNNGLLFI  60
NTTIASIAAK EEGVSRRLLR RLLRRLLAA                                   89

SEQ ID NO: 72             moltype = AA  length = 509
FEATURE                   Location/Qualifiers
source                    1..509
                          mol_type = protein
                          organism = synthetic construct
SEQUENCE: 72
MALPVTALLL PLALLLHAAR PEQKLISEED LDIQMTQTTS SLSASLGDRV TISCRASQDI  60
SKYLNWYQQK PDGTVKLLIY HTSRLHSGVP SRFSGSGSGT DYSLTISNLE QEDIATYFCQ  120
QGNTLPYTFG GGTKLEITGG GGSGGGGSGG GGSEVKLQES GPGLVAPSQS LSVTCTVSGV  180
SLPDYGVSWI RQPPRKGLEW LGVIWGSETT YYNSALKSRL TIIKDNSKSQ VFLKMNSLQT  240
DDTAIYYCAK HYYYGGSYAM DYWGQGTSVT VSSAAAFVPV FLPAKPTTTP APRPPTPAPT  300
IASQPLSLRP EACRPAAGGA VHTRGLDFAC DIYIWAPLAG TCGVLLLSLV ITLYCKRGRK  360
KLLYIFKQPF MRPVQTTQEE DGCSCRFPEE EEGGCELRVK FSRSADAPAY QQGQNQLYNE  420
LNLGRREEYD VLDKRRGRDP EMGGKPRRKN PQEGLYNELQ KDKMAEAYSE IGMKGERRRG  480
KGHDGLYQGL STATKDTYDA LHMQALPPR                                   509

SEQ ID NO: 73             moltype = AA  length = 579
FEATURE                   Location/Qualifiers
source                    1..579
                          mol_type = protein
                          organism = synthetic construct
SEQUENCE: 73
MRFPSIFTAV LFAASSALAA PVNTTTEDET AQIPAEAVIG YLDLEGDFDV AVLPFSNSTN  60
NGLLFINTTI ASIAAKEEGV SLDKREAEAA AEQKLISEED LDIQMTQTTS SLSASLGDRV  120
TISCRASQDI SKYLNWYQQK PDGTVKLLIY HTSRLHSGVP SRFSGSGSGT DYSLTISNLE  180
QEDIATYFCQ QGNTLPYTFG GGTKLEITGG GGSGGGGSGG GGSEVKLQES GPGLVAPSQS  240
LSVTCTVSGV SLPDYGVSWI RQPPRKGLEW LGVIWGSETT YYNSALKSRL TIIKDNSKSQ  300
VFLKMNSLQT DDTAIYYCAK HYYYGGSYAM DYWGQGTSVT VSSAAAFVPV FLPAKPTTTP  360
APRPPTPAPT IASQPLSLRP EACRPAAGGA VHTRGLDFAC DIYIWAPLAG TCGVLLLSLV  420
ITLYCKRGRK KLLYIFKQPF MRPVQTTQEE DGCSCRFPEE EEGGCELRVK FSRSADAPAY  480
QQGQNQLYNE LNLGRREEYD VLDKRRGRDP EMGGKPRRKN PQEGLYNELQ KDKMAEAYSE  540
IGMKGERRRG KGHDGLYQGL STATKDTYDA LHMQALPPR                        579

SEQ ID NO: 74             moltype = AA  length = 596
FEATURE                   Location/Qualifiers
source                    1..596
                          mol_type = protein
                          organism = synthetic construct
SEQUENCE: 74
MRFPSIFTAV LFAASSALAM PLSGGGSGGS GSMPLNTTTE DETAQIPAEA VIGYLDLEGD  60
FDVAVLPFSN STNNGLLFIN TTIASIAAKE EGVSRRLLRR LLRRLLAAEQ KLISEEDLDI  120
QMTQTTSSLS ASLGDRVTIS CRASQDISKY LNWYQQKPDG TVKLLIYHTS RLHSGVPSRF  180
SGSGSGTDYS LTISNLEQED IATYFCQQGN TLPYTFGGGT KLEITGGGGS GGGGSGGGGS  240
EVKLQESGPG LVAPSQSLSV TCTVSGVSLP DYGVSWIRQP PRKGLEWLGV IWGSETTYYN  300
SALKSRLTII KDNSKSQVFL KMNSLQTDDT AIYYCAKHYY YGGSYAMDYW GQGTSVTVSS  360
AAAFVPVFLP AKPTTTPAPR PPTPAPTIAS QPLSLRPEAC RPAAGGAVHT RGLDFACDIY  420
IWAPLAGTCG VLLLSLVITL YCKRGRKKLL YIFKQPFMRP VQTTQEEDGC SCRFPEEEEG  480
GCELRVKFSR SADAPAYQQG QNQLYNELNL GRREEYDVLD KRRGRDPEMG GKPRRKNPQE  540
GLYNELQKDK MAEAYSEIGM KGERRRGKGH DGLYQGLSTA TKDTYDALHM QALPPR      596

SEQ ID NO: 75             moltype = AA  length = 599
FEATURE                   Location/Qualifiers
source                    1..599
                          mol_type = protein
                          organism = synthetic construct
SEQUENCE: 75
MDMRVPAQLL GLLLLWLSGA RCMPLSGGGS GGSGSMPLNT TTEDETAQIP AEAVIGYLDL  60
EGDFDVAVLP FSNSTNNGLL FINTTIASIA AKEEGVSRRL LRRLLRRLLA AEQKLISEED  120
LDIQMTQTTS SLSASLGDRV TISCRASQDI SKYLNWYQQK PDGTVKLLIY HTSRLHSGVP  180
SRFSGSGSGT DYSLTISNLE QEDIATYFCQ QGNTLPYTFG GGTKLEITGG GGSGGGGSGG  240
GGSEVKLQES GPGLVAPSQS LSVTCTVSGV SLPDYGVSWI RQPPRKGLEW LGVIWGSETT  300
YYNSALKSRL TIIKDNSKSQ VFLKMNSLQT DDTAIYYCAK HYYYGGSYAM DYWGQGTSVT  360
VSSAAAFVPV FLPAKPTTTP APRPPTPAPT IASQPLSLRP EACRPAAGGA VHTRGLDFAC  420
DIYIWAPLAG TCGVLLLSLV ITLYCKRGRK KLLYIFKQPF MRPVQTTQEE DGCSCRFPEE  480
EEGGCELRVK FSRSADAPAY QQGQNQLYNE LNLGRREEYD VLDKRRGRDP EMGGKPRRKN  540
PQEGLYNELQ KDKMAEAYSE IGMKGERRRG KGHDGLYQGL STATKDTYDA LHMQALPPR   599

SEQ ID NO: 76             moltype = AA  length = 598
```

```
FEATURE              Location/Qualifiers
source               1..598
                     mol_type = protein
                     organism = synthetic construct
SEQUENCE: 76
MALPVTALLL PLALLLHAAR PMPLSGGGSG GSGSMPLNTT TEDETAQIPA EAVIGYLDLE    60
GDFDVAVLPF SNSTNNGLLF INTTIASIAA KEEGVSRRLL RRLLRRLLAA EQKLISEEDL   120
DIQMTQTTSS LSASLGDRVT ISCRASQDIS KYLNWYQQKP DGTVKLLIYH TSRLHSGVPS   180
RFSGSGSGTD YSLTISNLEQ EDIATYFCQQ GNTLPYTFGG GTKLEITGGG GSGGGGSGGG   240
GSEVKLQESG PGLVAPSQSL SVTCTVSGVS LPDYGVSWIR QPPRKGLEWL GVIWGSETTY   300
YNSALKSRLT IIKDNSKSQV FLKMNSLQTD DTAIYYCAKH YYYGGSYAMD YWGQGTSVTV   360
SSAAAFVPVF LPAKPTTTPA PRPPTPAPTI ASQPLSLRPE ACRPAAGGAV HTRGLDFACD   420
IYIWAPLAGT CGVLLLSLVI TLYCKRGRKK LLYIFKQPFM RPVQTTQEED GCSCRFPEEE   480
EGGCELRVKF SRSADAPAYQ QGQNQLYNEL NLGRREEYDV LDKRRGRDPE MGGKPRRKNP   540
QEGLYNELQK DKMAEAYSEI GMKGERRRGK GHDGLYQGLS TATKDTYDAL HMQALPPR    598

SEQ ID NO: 77        moltype = AA  length = 597
FEATURE              Location/Qualifiers
source               1..597
                     mol_type = protein
                     organism = synthetic construct
SEQUENCE: 77
MYRMQLLSCI ALSLALVTNS MPLSGGGSGG SGSMPLNTTT EDETAQIPAE AVIGYLDLEG    60
DFDVAVLPFS NSTNNGLLFI NTTIASIAAK EEGVSRRLLR RLLRRLLAAE QKLISEEDLD   120
IQMTQTTSSL SASLGDRVTI SCRASQDISK YLNWYQQKPD GTVKLLIYHT SRLHSGVPSR   180
FSGSGSGTDY SLTISNLEQE DIATYFCQQG NTLPYTFGG TKLEITGGGG SGGGGSGGGG   240
SEVKLQESGP GLVAPSQSLS VTCTVSGVSL PDYGVSWIRQ PPRKGLEWLG VIWGSETTYY   300
NSALKSRLTI IKDNSKSQVF LKMNSLQTDD TAIYYCAKHY YYGGSYAMDY WGQGTSVTVS   360
SAAAFVPVFL PAKPTTTPAP RPPTPAPTIA SQPLSLRPEA CRPAAGGAVH TRGLDFACDI   420
YIWAPLAGTC GVLLLSLVIT LYCKRGRKKL LYIFKQPFMR PVQTTQEEDG CSCRFPEEEE   480
GGCELRVKFS RSADAPAYQQ GQNQLYNELN LGRREEYDVL DKRRGRDPEM GGKPRRKNPQ   540
EGLYNELQKD KMAEAYSEIG MKGERRRGKG HDGLYQGLST ATKDTYDALH MQALPPR     597

SEQ ID NO: 78        moltype = AA  length = 590
FEATURE              Location/Qualifiers
source               1..590
                     mol_type = protein
                     organism = synthetic construct
SEQUENCE: 78
MFVFLVLLPL VSSMPLSGGG SGGSGSMPLN TTTEDETAQI PAEAVIGYLD LEGDFDVAVL    60
PFSNSTNNGL LFINTTIASI AAKEEGVSRR LLRRLLRRLL AAEQKLISEE DLDIQMTQTT   120
SSLSASLGDR VTISCRASQD ISKYLNWYQQ KPDGTVKLLI YHTSRLHSGV PSRFSGSGSG   180
TDYSLTISNL EQEDIATYFC QQGNTLPYTF GGGTKLEITG GGGSGGGGSG GGGSEVKLQE   240
SGPGLVAPSQ SLSVTCTVSG VSLPDYGVSW IRQPPRKGLE WLGVIWGSET TYYNSALKSR   300
LTIIKDNSKS QVFLKMNSLQ TDDTAIYYCA KHYYYGGSYA MDYWGQGTSV TVSSAAAFVP   360
VFLPAKPTTT PAPRPPTPAP TIASQPLSLR PEACRPAAGG AVHTRGLDFA CDIYIWAPLA   420
GTCGVLLLSL VITLYCKRGR KKLLYIFKQP FMRPVQTTQE EDGCSCRFPE EEEGGCELRV   480
KFSRSADAPA YQQGQNQLYN ELNLGRREEY DVLDKRRGRD PEMGGKPRRK NPQEGLYNEL   540
QKDKMAEAYS EIGMKGERRR GKGHDGLYQG LSTATKDTYD ALHMQALPPR             590

SEQ ID NO: 79        moltype = AA  length = 519
FEATURE              Location/Qualifiers
source               1..519
                     mol_type = protein
                     organism = synthetic construct
SEQUENCE: 79
MALPVTALLL PLALLLHAAR PEQKLISEED LTGNIVLTQS PASLAVSLGQ RATISCRASE    60
SVDNFGNSFM HWYQQKSGQP PRLLIYIASN LESGVPARFS GSGSRTDFTL TIDPVEADDA   120
ATYYCHQNNE DPLTFGAGTK LELKGGGGSG GGGSGGGGSH SQIQLQQSGA ELVRPGSSVK   180
ISCKASGFAF SSYWMNWVKQ RPGQGLEWIG QIYPGDGDTK YNVKFRGKAT LTADESSSTA   240
YIQLTSLTSE DSGVYFCARK RITAVITTVF DVWGAGTTVT VSSAAAFVPV FLPAKPTTTP   300
APRPPTPAPT IASQPLSLRP EACRPAAGGA VHTRGLDFAC DIYIWAPLAG TCGVLLLSLV   360
ITLYCKRGRK KLLYIFKQPF MRPVQTTQEE DGCSCRFPEE EGGCELRVK FSRSADAPAY   420
QQGQNQLYNE LNLGRREEYD VLDKRRGRDP EMGGKPRRKN PQEGLYNELQ KDKMAEAYSE   480
IGMKGERRRG KGHDGLYQGL STATKDTYDA LHMQALPPR                         519

SEQ ID NO: 80        moltype = AA  length = 589
FEATURE              Location/Qualifiers
source               1..589
                     mol_type = protein
                     organism = synthetic construct
SEQUENCE: 80
MRFPSIFTAV LFAASSALAA PVNTTTEDET AQIPAEAVIG YLDLEGDFDV AVLPFSNSTN    60
NGLLFINTTI ASIAAKEEGV SLDKREAEAA AEQKLISEED LTGNIVLTQS PASLAVSLGQ   120
RATISCRASE SVDNFGNSFM HWYQQKSGQP PRLLIYIASN LESGVPARFS GSGSRTDFTL   180
TIDPVEADDA ATYYCHQNNE DPLTFGAGTK LELKGGGGSG GGGSGGGGSH SQIQLQQSGA   240
ELVRPGSSVK ISCKASGFAF SSYWMNWVKQ RPGQGLEWIG QIYPGDGDTK YNVKFRGKAT   300
LTADESSSTA YIQLTSLTSE DSGVYFCARK RITAVITTVF DVWGAGTTVT VSSAAAFVPV   360
FLPAKPTTTP APRPPTPAPT IASQPLSLRP EACRPAAGGA VHTRGLDFAC DIYIWAPLAG   420
```

```
TCGVLLLSLV ITLYCKRGRK KLLYIFKQPF MRPVQTTQEE DGCSCRFPEE EEGGCELRVK    480
FSRSADAPAY QQGQNQLYNE LNLGRREEYD VLDKRRGRDP EMGGKPRRKN PQEGLYNELQ    540
KDKMAEAYSE IGMKGERRRG KGHDGLYQGL STATKDTYDA LHMQALPPR                589

SEQ ID NO: 81             moltype = AA  length = 606
FEATURE                   Location/Qualifiers
source                    1..606
                          mol_type = protein
                          organism = synthetic construct
SEQUENCE: 81
MRFPSIFTAV LFAASSALAM PLSGGGSGGS GSMPLNTTTE DETAQIPAEA VIGYLDLEGD     60
FDVAVLPFSN STNNGLLFIN TTIASIAAKE EGVSRRLLRR LLRRLLAAEQ KLISEEDLTG    120
NIVLTQSPAS LAVSLGQRAT ISCRASESVD NFGNSFMHWY QQKSGQPPRL LIYIASNLES    180
GVPARFSGSG SRTDFTLTID PVEADDAATY YCHQNNEDPL TFGAGTKLEL KGGGGSGGGG    240
SGGGGSHSQI QLQQSGAELV RPGSSVKISC KASGFAFSSY WMNWVKQRPG QGLEWIGQIY    300
PGDGDTKYNV KFRGKATLTA DESSSTAYIQ LTSLTSEDSG VYFCARKRIT AVITTVFDVW    360
GAGTTVTVSS AAAFVPVFLP AKPTTTPAPR PPTPAPTIAS QPLSLRPEAC RPAAGGAVHT    420
RGLDFACDIY IWAPLAGTCG VLLLSLVITL YCKRGRKKLL YIFKQPFMRP VQTTQEEDGC    480
SCRFPEEEEG GCELRVKFSR SADAPAYQQG QNQLYNELNL GRREEYDVLD KRRGRDPEMG    540
GKPRRKNPQE GLYNELQKDK MAEAYSEIGM KGERRRGKGH DGLYQGLSTA TKDTYDALHM    600
QALPPR                                                               606

SEQ ID NO: 82             moltype = AA  length = 65
FEATURE                   Location/Qualifiers
source                    1..65
                          mol_type = protein
                          organism = synthetic construct
SEQUENCE: 82
MAIRVSHKSF LVALLLILFI SSPTQARSLR EVVRNRTLLV VEKSQESRKI RHEGGGSDVD     60
GLMDM                                                                 65

SEQ ID NO: 83             moltype = AA  length = 141
FEATURE                   Location/Qualifiers
source                    1..141
                          mol_type = protein
                          organism = synthetic construct
SEQUENCE: 83
MMRFTIIVIA FLLIIQSLEE EHILVYAHEG GEAGHKSLDY QGDQDSSTLH PKELFDAPRK     60
VRFGRTTRAE KEQVTAMNND SWSFKISGEH KQTNILADHD TTKNTFCKKM MIIVNDLTSL    120
PTLEPSTSTN DMEKLARLLR D                                              141

SEQ ID NO: 84             moltype = AA  length = 89
FEATURE                   Location/Qualifiers
source                    1..89
                          mol_type = protein
                          organism = synthetic construct
SEQUENCE: 84
MEMKKWSYAN LITLALLFLF FIILLLAFQG GSRDDDHQHV HVAIRTKDIS MGRKLKSLKP     60
INPTKKNGFE YPDQGSHDVQ EREVYVELR                                       89

SEQ ID NO: 85             moltype = AA  length = 96
FEATURE                   Location/Qualifiers
source                    1..96
                          mol_type = protein
                          organism = synthetic construct
SEQUENCE: 85
MTNITSSFLC LLILLLFCLS FGYSLHGDKD EVLSVDVGSN AKVMKHLDGD DAMKKAQVRG     60
RSGQEFSKET TKMMMKKTTK KETNVEEEDD LVAYTA                               96

SEQ ID NO: 86             moltype = AA  length = 103
FEATURE                   Location/Qualifiers
source                    1..103
                          mol_type = protein
                          organism = synthetic construct
SEQUENCE: 86
MKLIRVTLFL CALAILLLVT PTSSLQLKHP YSSPSQGLSK KIVTKMATRK LMIISSEYVM     60
TSTSHEGSSE QLRVTSSGKS KDEEKKLSEE EEEKKALAKY LSM                      103

SEQ ID NO: 87             moltype = AA  length = 97
FEATURE                   Location/Qualifiers
source                    1..97
                          mol_type = protein
                          organism = synthetic construct
SEQUENCE: 87
MTTLSKILCV LIILLLFCFSF RYSLHEDGNQ QSSRDFVSTA KAIKYGDVMK KMIRGRKLMM     60
ASGEKEEAET KMKRGNRETE RNSSKSVEED GLVAYTA                              97

SEQ ID NO: 88             moltype = AA  length = 96
FEATURE                   Location/Qualifiers
```

```
source                      1..96
                            mol_type = protein
                            organism = synthetic construct
SEQUENCE: 88
MKKWSYAKLM TSALLLVFLS IILLAFHGGS RGDNHLYDHV AIGTKDILMG RKLKDLKPKT    60
ESLKMINPKK KNGFEYSDQV SSDLSRQEVF VDMMAR                             96

SEQ ID NO: 89               moltype = AA   length = 73
FEATURE                     Location/Qualifiers
source                      1..73
                            mol_type = protein
                            organism = synthetic construct
SEQUENCE: 89
MKKTSLKLMT LVLGFCFVIY LLQGPRGGSR NGDLLIARKL ISLEPIETKN AARSLKDSIS    60
TDLEEEVDRL MEH                                                      73

SEQ ID NO: 90               moltype = AA   length = 75
FEATURE                     Location/Qualifiers
source                      1..75
                            mol_type = protein
                            organism = synthetic construct
SEQUENCE: 90
MSSIHVASMI LLLFLFLHHS DSRHLDNVHI TASRFSLVKD QNVVSSSTSK EPVKVSRFVP    60
GPLKHHHRRP PLLFA                                                    75

SEQ ID NO: 91               moltype = AA   length = 103
FEATURE                     Location/Qualifiers
source                      1..103
                            mol_type = protein
                            organism = synthetic construct
SEQUENCE: 91
MVSIRVICYL LVFSVLQVHA KVSNANFNSQ APQMKNSEGL GASNGTQIAK KHAEDVIENR    60
KTLKHVNVKV EANEKNGLEI ESKEMVKKRK NKKRLTKTES LTA                    103

SEQ ID NO: 92               moltype = AA   length = 139
FEATURE                     Location/Qualifiers
source                      1..139
                            mol_type = protein
                            organism = synthetic construct
SEQUENCE: 92
MRFPSIFTAV LFAASSALAM PLSGGGSGGS GSMPLTPANC TYLDLLGTWV FQVGSSGSQR    60
DVNCSVMGNT TTEDETAQIP AEAVIGYLDL EGDFDVAVLP FSNSTNNGLL FINTTIASIA   120
AKEEGVSRRL LRRLLRRLL                                               139

SEQ ID NO: 93               moltype = AA   length = 139
FEATURE                     Location/Qualifiers
source                      1..139
                            mol_type = protein
                            organism = synthetic construct
SEQUENCE: 93
MRFPSIFTAV LFAASSALAM PLSGGGSGGS GSMPLNTTTE DETAQIPAEA VIGYLDLEGD    60
FDVATPANCT YLDLLGTWVF QVGSSGSQRD VNCSVMGVLP FSNSTNNGLL FINTTIASIA   120
AKEEGVSRRL LRRLLRRLL                                               139

SEQ ID NO: 94               moltype = AA   length = 139
FEATURE                     Location/Qualifiers
source                      1..139
                            mol_type = protein
                            organism = synthetic construct
SEQUENCE: 94
MRFPSIFTAV LFAASSALAM PLSGGGSGGS GSMPLNTTTE DETAQIPAEA VIGYLDLEGD    60
FDVAVLPFSN STNNGLLFIN TTIASIAAKE EGVSTPANCT YLDLLGTWVF QVGSSGSQRD   120
VNCSVMGRRL LRRLLRRLL                                               139

SEQ ID NO: 95               moltype = AA   length = 33
FEATURE                     Location/Qualifiers
source                      1..33
                            mol_type = protein
                            organism = synthetic construct
SEQUENCE: 95
TPANCTYLDL LGTWVFQVGS SGSQRDVNCS VMG                                33

SEQ ID NO: 96               moltype = AA   length = 13
FEATURE                     Location/Qualifiers
source                      1..13
                            mol_type = protein
                            organism = synthetic construct
SEQUENCE: 96
ILEKRNASKP QGR                                                      13
```

```
SEQ ID NO: 97              moltype = AA  length = 12
FEATURE                    Location/Qualifiers
source                     1..12
                           mol_type = protein
                           organism = synthetic construct
SEQUENCE: 97
WSGPIGVSWG LR                                                           12

SEQ ID NO: 98              moltype = AA  length = 59
FEATURE                    Location/Qualifiers
source                     1..59
                           mol_type = protein
                           organism = synthetic construct
SEQUENCE: 98
ESVNGPKAGS RGLTSLADTF EHVIEELLDE DQKVRPNEEN NKDADLYTSR VMLSSQVPL        59

SEQ ID NO: 99              moltype = AA  length = 70
FEATURE                    Location/Qualifiers
source                     1..70
                           mol_type = protein
                           organism = synthetic construct
SEQUENCE: 99
MSCSLRSGLV IVFCFILLLL SSNVGCASAA RRLRSHKHHH HKVASLDVFN GGERRRALGG       60
VETGEEVVVM                                                              70

SEQ ID NO: 100             moltype = AA  length = 305
FEATURE                    Location/Qualifiers
source                     1..305
                           mol_type = protein
                           organism = synthetic construct
SEQUENCE: 100
MRFPSIFTAV LFAASSALAM PLSGGGSGGS GSMPLNTTTE DETAQIPAEA VIGYLDLEGD       60
FDVAVLPFSN STNNGLLFIN TTIASIAAKE EGVSRRLLRR LLRRLLAANI TNLCPFGEVF      120
NATRFASVYA WNRKRISNCV ADYSVLYNSA SFSTFKCYGV SPTKLNDLCF TNVYADSFVI      180
RGDEVRQIAP GQTGKIADYN YKLPDDFTGC VIAWNSNNLD SKVGGNYNYL YRLFRKSNLK      240
PFERDISTEI YQAGSTPCNG VEGFNCYFPL QSYGFQPTNG VGYQPYRVVV LSFELLHAPA      300
TVCGP                                                                 305

SEQ ID NO: 101             moltype = AA  length = 327
FEATURE                    Location/Qualifiers
source                     1..327
                           mol_type = protein
                           organism = synthetic construct
SEQUENCE: 101
MFVFLVLLPL VSSAANITNL CPFGEVFNAT RFASVYAWNR KRISNCVADY SVLYNSASFS       60
TFKCYGVSPT KLNDLCFTNV YADSFVIRGD EVRQIAPGQT GKIADYNYKL PDDFTGCVIA      120
WNSNNLDSKV GGNYNYLYRL FRKSNLKPFE RDISTEIYQA GSTPCNGVEG FNCYFPLQSY      180
GFQPTNGVGY QPYRVVVLSF ELLHAPATVC GPGGGGSGGG GSGGGGSIEN ADKAIKDFQD      240
NKAPHDKSAA YEANSKLPKD LRDKNNRFVE KVSIEKAIVR HDERVKSAND AISKLNEKDS      300
IENRRLAQRE VNKAPMDVKE HLQKQLD                                         327

SEQ ID NO: 102             moltype = AA  length = 401
FEATURE                    Location/Qualifiers
source                     1..401
                           mol_type = protein
                           organism = synthetic construct
SEQUENCE: 102
MRFPSIFTAV LFAASSALAA PVNTTTEDET AQIPAEAVIG YLDLEGDFDV AVLPFSNSTN       60
NGLLFINTTI ASIAAKEEGV SLDKREAEAN ITNLCPFGEV FNATRFASVY AWNRKRISNC      120
VADYSVLYNS ASFSTFKCYG VSPTKLNDLC FTNVYADSFV IRGDEVRQIA PGQTGKIADY      180
NYKLPDDFTG CVIAWNSNNL DSKVGGNYNY LYRLFRKSNL KPFERDISTE IYQAGSTPCN      240
GVEGFNCYFP LQSYGFQPTN GVGYQPYRVV VLSFELLHAP ATVCGPGGGG SGGGGSGGGG      300
SIENADKAIK DFQDNKAPHD KSAAYEANSK LPKDLRDKNN RFVEKVSIEK AIVRHDERVK      360
SANDAISKLN EKDSIENRRL AQREVNKAPM DVKEHLQKQL D                         401

SEQ ID NO: 103             moltype = AA  length = 420
FEATURE                    Location/Qualifiers
source                     1..420
                           mol_type = protein
                           organism = synthetic construct
SEQUENCE: 103
MRFPSIFTAV LFAASSALAM PLSGGGSGGS GSMPLNTTTE DETAQIPAEA VIGYLDLEGD       60
FDVAVLPFSN STNNGLLFIN TTIASIAAKE EGVSRRLLRR LLRRLLAANI TNLCPFGEVF      120
NATRFASVYA WNRKRISNCV ADYSVLYNSA SFSTFKCYGV SPTKLNDLCF TNVYADSFVI      180
RGDEVRQIAP GQTGKIADYN YKLPDDFTGC VIAWNSNNLD SKVGGNYNYL YRLFRKSNLK      240
PFERDISTEI YQAGSTPCNG VEGFNCYFPL QSYGFQPTNG VGYQPYRVVV LSFELLHAPA      300
TVCGPGGGGS GGGGSGGGGS IENADKAIKD FQDNKAPHDK SAAYEANSKL PKDLRDKNNR      360
FVEKVSIEKA IVRHDERVKS ANDAISKLNE KDSIENRRLA QREVNKAPMD VKEHLQKQLD      420
```

```
SEQ ID NO: 104           moltype = AA  length = 327
FEATURE                  Location/Qualifiers
source                   1..327
                         mol_type = protein
                         organism = synthetic construct
SEQUENCE: 104
MFVFLVLLPL VSSAANITNL CPFDEVFNAT RFASVYAWNR KRISNCVADY SVLYNLAPFF    60
TFKCYGVSPT KLNDLCFTNV YADSFVIRGD EVRQIAPGQT GNIADYNYKL PDDFTGCVIA   120
WNSNKLDSKV SGNYNYLYRL FRKSNLKPFE RDISTEIYQA GNKPCNGVAG FNCYFPLRSY   180
SFRPTYGVGH QPYRVVVLSF ELLHAPATVC GPGGGGSGGG GSGGGGSIEN ADKAIKDFQD   240
NKAPHDKSAA YEANSKLPKD LRDKNNRFVE KVSIEKAIVR HDERVKSAND AISKLNEKDS   300
IENRRLAQRE VNKAPMDVKE HLQKQLD                                      327

SEQ ID NO: 105           moltype = AA  length = 401
FEATURE                  Location/Qualifiers
source                   1..401
                         mol_type = protein
                         organism = synthetic construct
SEQUENCE: 105
MRFPSIFTAV LFAASSALAA PVNTTTEDET AQIPAEAVIG YLDLEGDFDV AVLPFSNSTN    60
NGLLFINTTI ASIAAKEEGV SLDKREAEAN ITNLCPFDEV FNATRFASVY AWNRKRISNC   120
VADYSVLYNL APFFTFKCYG VSPTKLNDLC FTNVYADSFV IRGDEVRQIA PGQTGNIADY   180
NYKLPDDFTG CVIAWNSNKL DSKVSGNYNY LYRLFRKSNL KPFERDISTE IYQAGNKPCN   240
GVAGFNCYFP LRSYSFRPTY GVGHQPYRVV VLSFELLHAP ATVCGPGGGG SGGGGSGGGG   300
SIENADKAIK DFQDNKAPHD KSAAYEANSK LPKDLRDKNN RFVEKVSIEK AIVRHDERVK   360
SANDAISKLN EKDSIENRRL AQREVNKAPM DVKEHLQKQL D                      401

SEQ ID NO: 106           moltype = AA  length = 144
FEATURE                  Location/Qualifiers
source                   1..144
                         mol_type = protein
                         organism = synthetic construct
SEQUENCE: 106
MRFPSIFTAV LFAASSALAM PLSGGGSGGS GSMPLEQKLI SEEDLGGGEQ KLISEEDLGG    60
GEQKLISEED LNTTTEDETA QIPAEAVIGY LDLEGDFDVA VLPFSNSTNN GLLFINTTIA   120
SIAAKEEGVS RRLLRRLLRR LLAA                                         144

SEQ ID NO: 107           moltype = AA  length = 132
FEATURE                  Location/Qualifiers
source                   1..132
                         mol_type = protein
                         organism = synthetic construct
SEQUENCE: 107
MRFPSIFTAV LFAASSALAM PLSGGGSGGS GSMPLEQKLI SEEDLGGGEQ KLISEEDLGG    60
GEQKLISEED LNTTTEDETA QIPAEAVIGY LDLEGDFDVA VLPFSNSTNN GLLFINTTIA   120
SIAAKEEGVS AA                                                      132

SEQ ID NO: 108           moltype = AA  length = 96
FEATURE                  Location/Qualifiers
source                   1..96
                         mol_type = protein
                         organism = synthetic construct
SEQUENCE: 108
MRFPSIFTAV LFAASSALAM PLSGGGSGGS GSMPLNTTTE DETAQIPAEA VIGYLDLEGD    60
FDVAVLPFSN STNNGLLFIN TTIASIAAKE EGVSAA                             96

SEQ ID NO: 109           moltype = AA  length = 85
FEATURE                  Location/Qualifiers
source                   1..85
                         mol_type = protein
                         organism = synthetic construct
SEQUENCE: 109
MRFPSIFTAV LFAASSALAA PVNTTTEDET AQIPAEAVIG YLDLEGDFDV AVLPFSNSTN    60
NGLLFINTTI ASIAAKEEGV SLDAA                                         85

SEQ ID NO: 110           moltype = DNA  length = 45
FEATURE                  Location/Qualifiers
source                   1..45
                         mol_type = other DNA
                         organism = synthetic construct
SEQUENCE: 110
gaatttaata cgactcacta taaggcttgt tcttttttgca gaagc                  45

SEQ ID NO: 111           moltype = DNA  length = 149
FEATURE                  Location/Qualifiers
source                   1..149
                         mol_type = other DNA
                         organism = synthetic construct
```

```
SEQUENCE: 111
tttttttttt tttttttttt tttttttttt tttttttttt tttttttttt tttttttttt    60
tttttttttt tttttttttt tttttttttt tttttttttt tttttttttt tttttttttt   120
agaatgtgaa gaaactttct ttttattag                                     149
```

COMPOSITIONS COMPRISING α-FACTOR PREPRO SEQUENCE AND USES THEREOF

CROSS-REFERENCE TO RELATED APPLICATIONS

This application claims priority to U.S. Provisional Patent Application 63/296,824 filed on Jan. 5, 2022, the entire contents of which is hereby incorporated by reference.

SEQUENCE LISTING

The instant application contains a Sequence Listing which has been submitted electronically in XML format and is hereby incorporated by reference in its entirety. Said XML copy, created on May 31, 2023, is named 2012611-0053_SL.xml and is 119,518 bytes in size.

BACKGROUND

Protein secretion from living cells is a step in many medical and scientific processes. For example, biomanufacturing often relies on the secretion of high amounts of biological therapeutics from live cells for their production. Additionally, mRNA vaccines rely on protein secretion from the cells of vaccinated individuals. Moreover, many scientific disciplines utilize live cell protein secretion for key experiments, including studying protein function and structure. Thus, enhancements in protein secretion could enable greater production of biologics for less cost, smaller vaccine doses, and simpler experimental procedures for protein studies.

SUMMARY

The present disclosure provides technologies for increasing secretion of polypeptides from mammalian cells, where the polypeptides are encoded by an exogenous nucleic acid, e.g., a DNA or RNA therapeutic. The present disclosure further identifies that increased levels polypeptide secretion from mammalian cells can be beneficial to a number processes, including the manufacture of polypeptides (e.g., therapeutic polypeptides) and expression of polypeptides in mammalian cells, tissues or subjects following delivery of polynucleotides encoding such polypeptides.

One significant approach to delivering therapeutics has been to deliver polynucleotides to a subject and then use the subject's cellular machinery to express a therapeutic polypeptide from the delivered polynucleotides. A recent example of this approach is the introduction of mRNA-based vaccines against SARS-CoV-2, which deliver mRNA encoding antigen polypeptides for expression in a subject. While these approaches have had success, a challenge with such approaches is that certain polypeptides delivered this way need to be secreted from cells following expression.

The present disclosure provides the insight that α-factor prepro sequences can be used to increase polypeptides secretion from cells, particularly mammalian cells. Use of α-factor prepro sequences can, therefore, improve secretion levels of payload polypeptides (e.g., therapeutic polypeptides). Improved secretion levels of payload polypeptides expressed from administered polynucleotides can, in turn, reduce the amount of polynucleotide that needs to be delivered, (e.g., reducing associated costs and/or increasing patient comfort during administration).

Among the technologies described herein for increasing expression of payload polypeptides are engineered polypeptides including a payload polypeptide and a wild-type or engineered α-factor prepro sequence, where the wild-type or engineered α-factor prepro sequence is operably linked to the payload polypeptide. Polynucleotides encoding such polypeptides are also provided. In addition, cells and methods incorporating the described technologies are also provided.

The present disclosure also provides the insight that *Arabidopsis* Root Growth Factor (GLV) secretion peptide sequences disclosed herein alone or in combination with an α-factor prepro sequence disclosed herein can be used to increase polypeptides secretion from, e.g., plant cells, e.g., *Arabidopsis* cells.

"3x_furin_delSTE13" refers to an RBD Variant_1 polypeptide associated with an engineered α-factor prepro sequence, in which (i) the Kex2 cleavage site of a wild-type prepro sequence has been replaced with three (3) furin cleavage sites, and (ii) the Ste13 cleavage site of the wild-type prepro sequence has been deleted.

Figure 6:
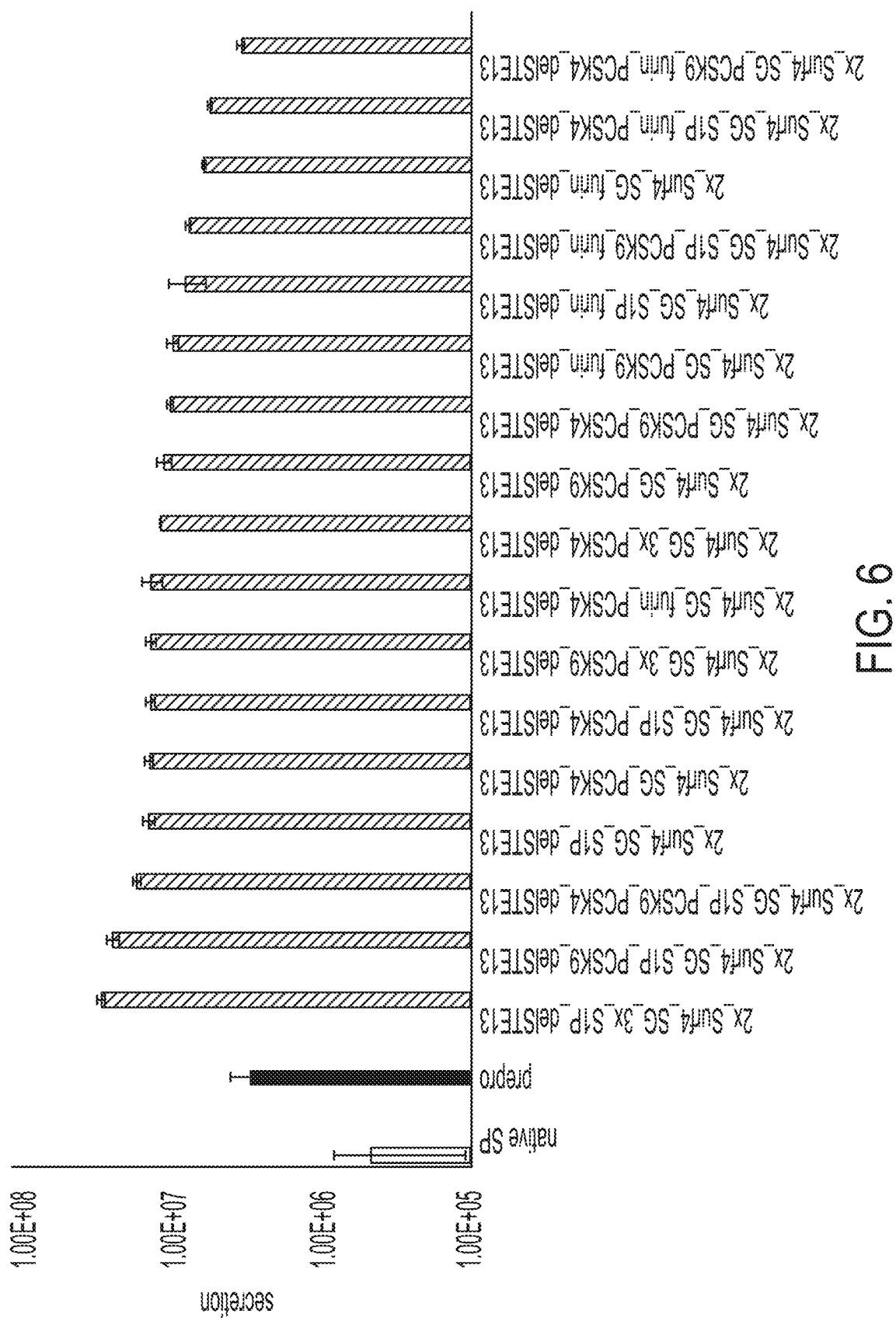

FIG. 6 is a bar graph showing measured secretion levels of showing measured secretion levels of an RBD Variant_1 polypeptide associated with certain signal peptides. "Native SP" refers to an RBD polypeptide associated with a wild-type RBD signal peptide. "Prepro" refers to an RBD polypeptide associated with a wild-type α-factor prepro sequence. "2x_Surf4_SG_3x_S1P_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with three (3) S1P cleavage sites, and (iii) the Ste13 cleavage site of the wild-type prepro sequence has been deleted. "2x_Surf4_SG_3x_S1P_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with three (3) S1P cleavage sites, and (iii) the Ste13 cleavage site of the wild-type prepro sequence has been deleted. "2x_Surf4_SG_S1P_PCSK9_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site and a PCSK9 cleavage site, and (iii) the Ste13 cleavage site of the wild-type prepro sequence has been deleted. "2x_Surf4_SG_S1P_PCSK9_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site, a PCSK9 cleavage site, and a PCSK4 cleavage site, and (iii) the Ste13 cleavage site of the wild-type prepro sequence has been deleted. "2x_Surf4_SG_S1P_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site, and (iii) the Ste13 cleavage site of the wild-type prepro sequence has been deleted. "2x_Surf4_SG_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a PCSK4 cleavage site, and (iii) the Ste13 cleavage site of the wild-type prepro sequence has been deleted. "2x_Surf4_SG_S1P_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site and a PCSK4 cleavage site, and (iii) the Ste13 cleavage site of the wild-type prepro sequence has been deleted. "2x_Surf4_SG_3x_PCSK9_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with three (3) PCSK9 cleavage sites, and (iii) the Ste13 cleavage site of the wild-type prepro sequence has been deleted. "2x_Surf4_SG_furin_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a furin cleavage site and a PCSK4 cleavage site, and (iii) the Ste13 cleavage site of the wild-type prepro sequence has been deleted. "2x_Surf4_SG_3x_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with three (3) PCSK4 cleavage sites, and (iii) the Ste13 cleavage site of the wild-type prepro sequence has been deleted. "2x_Surf4_SG_PCSK9_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a PCSK9 cleavage site, and (iii) the Ste13 cleavage site of the wild-type prepro sequence has been deleted. "2x_Surf4_SG_PCSK9_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a PCSK9 cleavage site and a PCSK4 cleavage site, and (iii) the Ste13 cleavage site of the wild-type prepro sequence has been deleted. "2x_Surf4_SG_PCSK9_furin_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a PCSK9 cleavage site and a furin cleavage site, and (iii) the Ste13 cleavage site of the wild-type prepro sequence has been deleted. "2x_Surf4_SG_S1P_furin_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site and a furin cleavage site, and (iii) the Ste13 cleavage site of the wild-type prepro sequence has been deleted.

"2x_Surf4_SG_S1P_PCSK9_furin_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site, a PCSK9 cleavage site, and a furin cleavage site, and (iii) the Ste13 cleavage site of the wild-type prepro sequence has been deleted. "2x_Surf4_SG_furin_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a furin cleavage site, and (iii) the Ste13 cleavage site of the wild-type prepro sequence has been deleted. "2x_Surf4_SG_S1P_furin_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a S1P cleavage site, a furin cleavage site, and a PCSK4 cleavage site, and (iii) the Ste13 cleavage site of the wild-type prepro sequence has been deleted. "2x_Surf4_SG_PCSK9_furin_PCSK4_delSte13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with a a PCSK9 cleavage site, a furin cleavage site, and a PCSK4 cleavage site, and (iii) the Ste13 cleavage site of the wild-type prepro sequence has been deleted.

Figure 7:
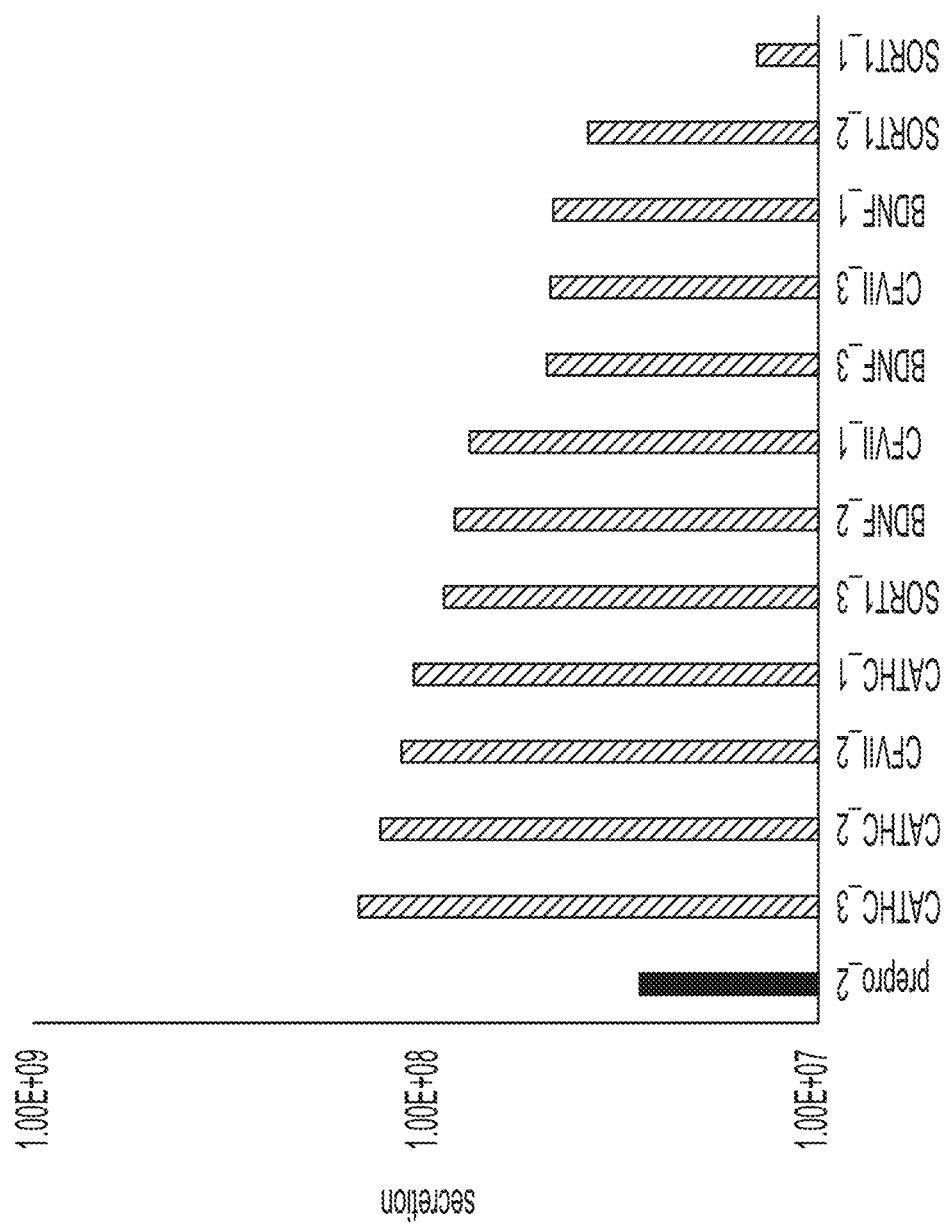

FIG. 7 is a bar graph depicting measured secretion levels of an RBD Variant_1 polypeptide associated with certain signal peptides. "prepro_2" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, (ii) the Kex2 cleavage site of a wild-type prepro sequence has been replaced with three (3) S1P cleavage sites, and (iii) the Ste13 cleavage site of the wild-type prepro sequence has been deleted. "CATHC_3" refers to an RBD Variant_1 polypeptide associated with an engineered α-factor prepro sequence, in which a cathepsin C peptide has been inserted at the C-terminus of prepro_2. "CATHC_2" refers to an RBD Variant_1 polypeptide associated with an engineered α-factor prepro sequence, in which a cathepsin C peptide has been inserted in the middle of prepro_2. "CFVII_2" refers to an RBD Variant_1 polypeptide associated with an engineered α-factor prepro sequence, in which a coagulation factor VII peptide has been inserted in the middle of prepro_2. "CATHC_1" refers to an RBD Variant_1 polypeptide associated with an engineered α-factor prepro sequence, in which a cathepsin C peptide has been inserted at the N-terminus of prepro_2. "SORT1_3" refers to an RBD Variant_1 polypeptide associated with an engineered α-factor prepro sequence, in which a sortilin 1 peptide has been inserted at the C-terminus of prepro_2. "BDNF_2" refers to an RBD Variant_1 polypeptide associated with an engineered α-factor prepro sequence, in which a brain-derived neurotrophic factor peptide has been inserted in the middle of prepro_2. "CFVII_1" refers to an RBD Variant_1 polypeptide associated with an engineered α-factor prepro sequence, in which a coagulation factor VII peptide has been inserted at the N-terminus of prepro_2. "BDNF_3" refers to an RBD Variant_1 polypeptide associated with an engineered α-factor prepro sequence, in which a brain-derived neurotrophic factor peptide has been inserted at the C-terminus of prepro_2. "CFVII_3" refers to an RBD Variant_1 polypeptide associated with an engineered α-factor prepro sequence, in which a coagulation factor VII peptide has been inserted at the C-terminus of prepro_2. "BDNF_1" refers to an RBD Variant_1 polypeptide associated with an engineered α-factor prepro sequence, in which a brain-derived neurotrophic factor peptide has been inserted at the N-terminus of prepro_2. "SORT1_2" refers to an RBD Variant_1 polypeptide associated with an engineered α-factor prepro sequence, in which a sortilin 1 peptide has been inserted in the middle of prepro_2. "SORT1_1" refers to an RBD Variant_1 polypeptide associated with an engineered α-factor prepro sequence, in which a sortilin 1 peptide has been inserted at the N-terminus of prepro_2.

Figure 8B:
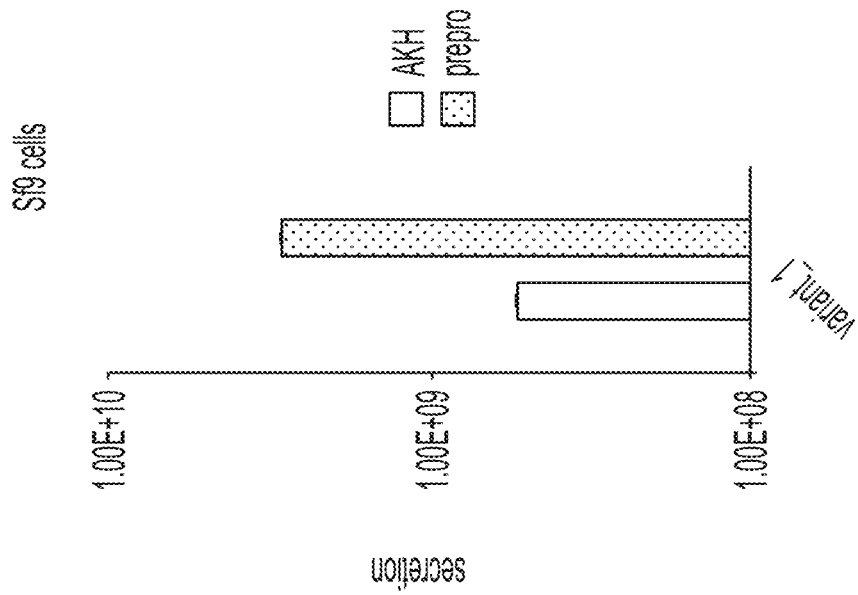
Figure 8A:
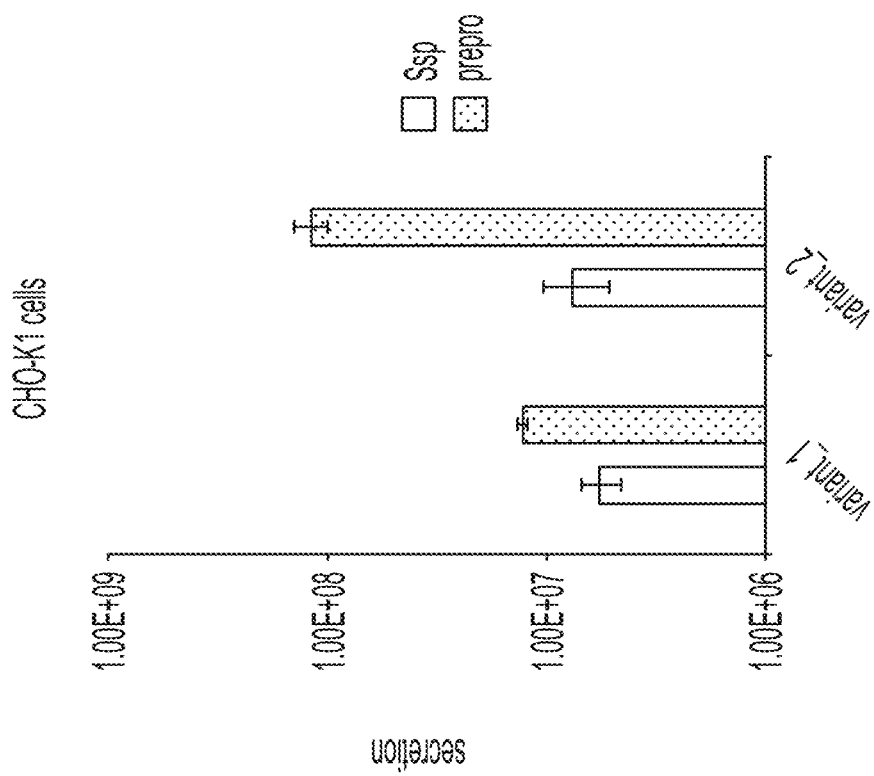

FIGS. 8A-8B are bar graphs depicting secretion levels of SARS-CoV-2 Spike receptor binding domain (RBD) variant polypeptides with certain signal peptides. FIG. 8A depicts secretion of Variant_1 and Variant_2 in CHO-K1 Chinese Hamster Ovary cells with native Spike signal peptide (white bars) and with a wild-type prepro secretion sequence (gray bars). Cells were treated with 50 ng plasmid DNA. FIG. 8B depicts secretion of 100 ng Variant_1 in Sf9 *Spodoptera frugiperda* cells with adipokinetic hormone signal peptide (white bar) and with a wild-type prepro secretion sequence (gray bar). Cells were treated with 100 ng plasmid DNA.

Figure 9:
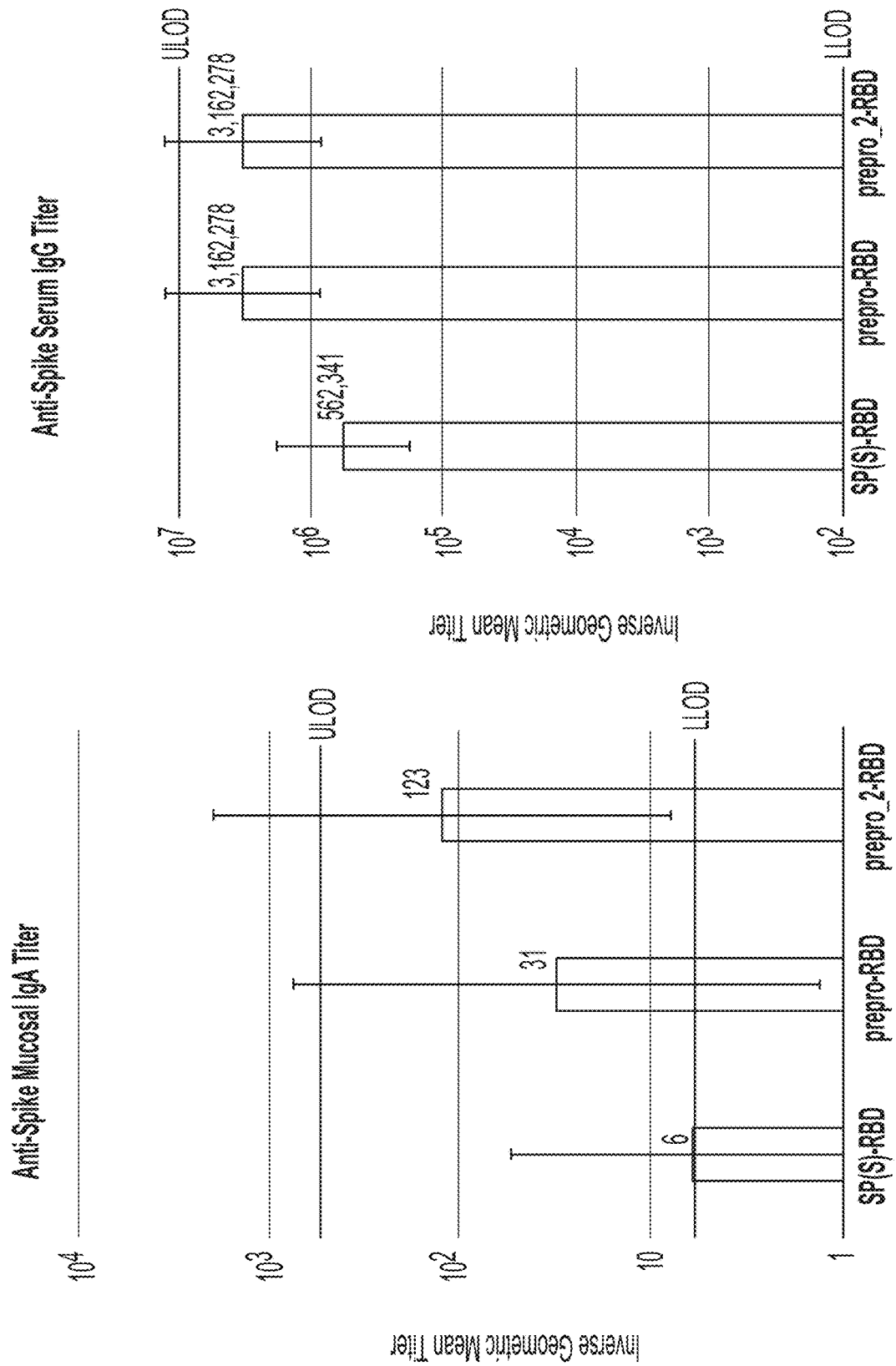

FIG. 9 is a bar graph depicting mucosal IgA and serum IgG antibody titers against SARS-CoV-2 Spike from vaccinated mice. "SP(S)-RBD" refers to wild-type SARS-CoV-2 Spike receptor binding domain (RBD) associated with native signal peptide. "prepro-RBD" refers to wild-type SARS-CoV-2 Spike receptor binding domain (RBD) associated with wild-type α-factor prepro sequence. "prepro_2-RBD" refers to wild-type SARS-CoV-2 Spike receptor binding domain (RBD) associated with the engineered α-factor prepro sequence prepro_2.

Figure 10:
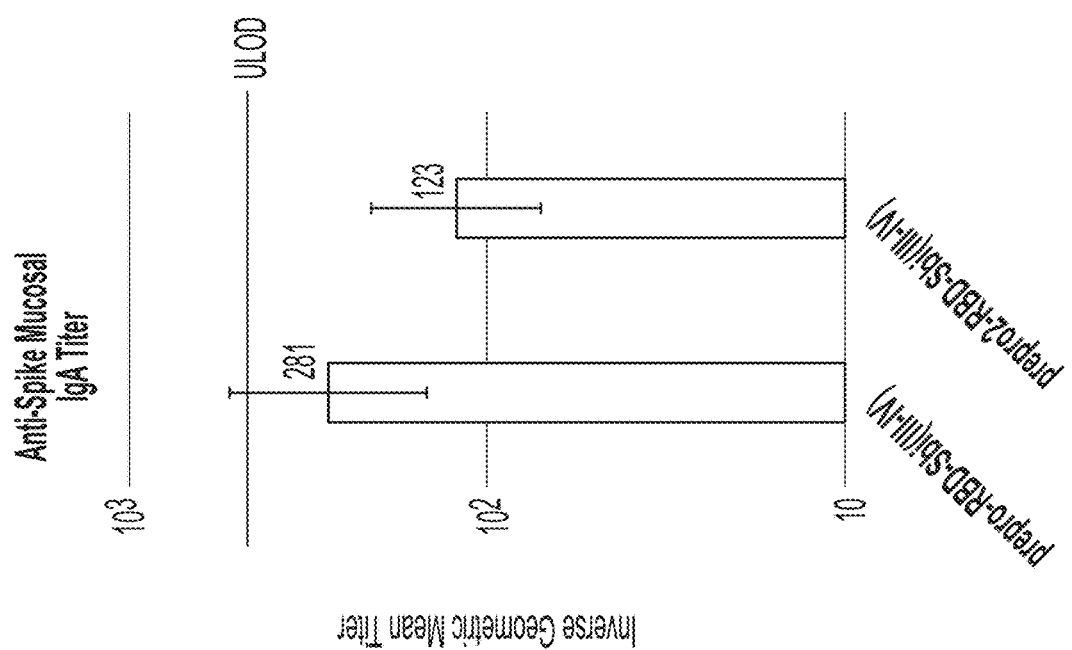

FIG. 10 is a bar graph depicting mucosal IgA antibody titers against SARS-CoV-2 Spike from vaccinated mice. "prepro-RBD-Sbi(III-IV)" refers to wild-type SARS-CoV-2 Spike receptor binding domain (RBD) fused to the *Staphylococcus aureus* binder of IgG protein subunits III and IV associated with wild-type α-factor prepro sequence. "prepro_2-RBD-Sbi(III-IV)" refers to wild-type SARS-CoV-2 Spike receptor binding domain (RBD) fused to the *Staphylococcus aureus* binder of IgG protein subunits III and IV associated with the engineered α-factor prepro sequence prepro_2.

Figure 11:
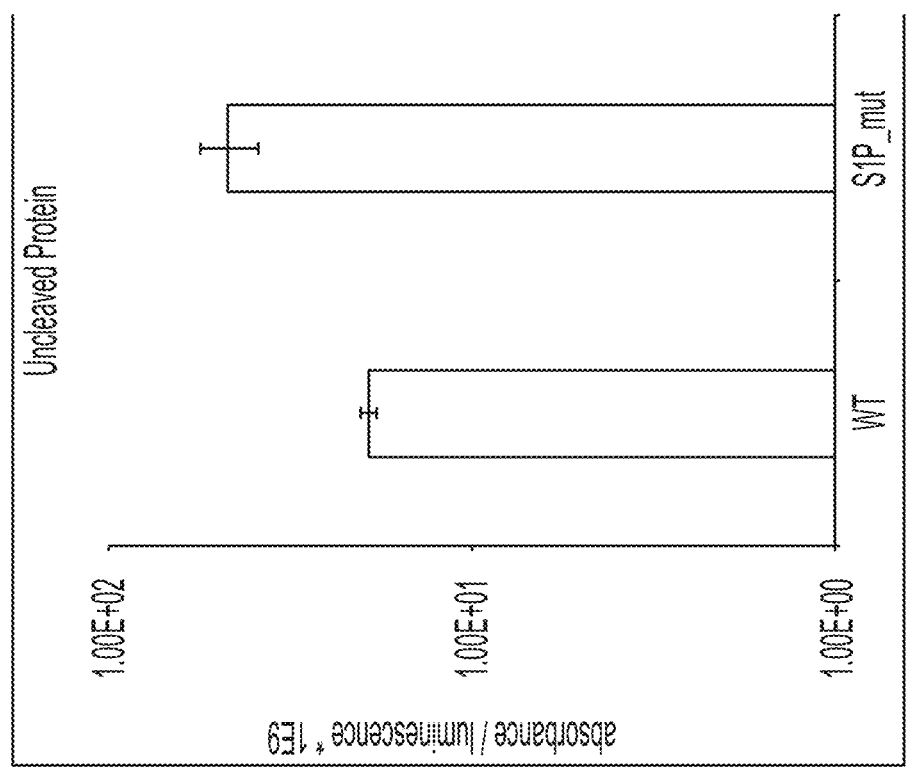

FIG. 11 is a bar graph depicting the relative amounts of RBD Variant_1 polypeptide secreted with uncleaved propeptide intact from cells. "WT" refers to an RBD Variant_1 polypeptide associated with the prepro_2 engineered α-factor prepro sequence. "S1P_mut" refers to an RBD Variant_1 polypeptide associated with the prepro_2 engineered α-factor prepro sequence with the S1P protease cleavage sites removed.

Figure 12:
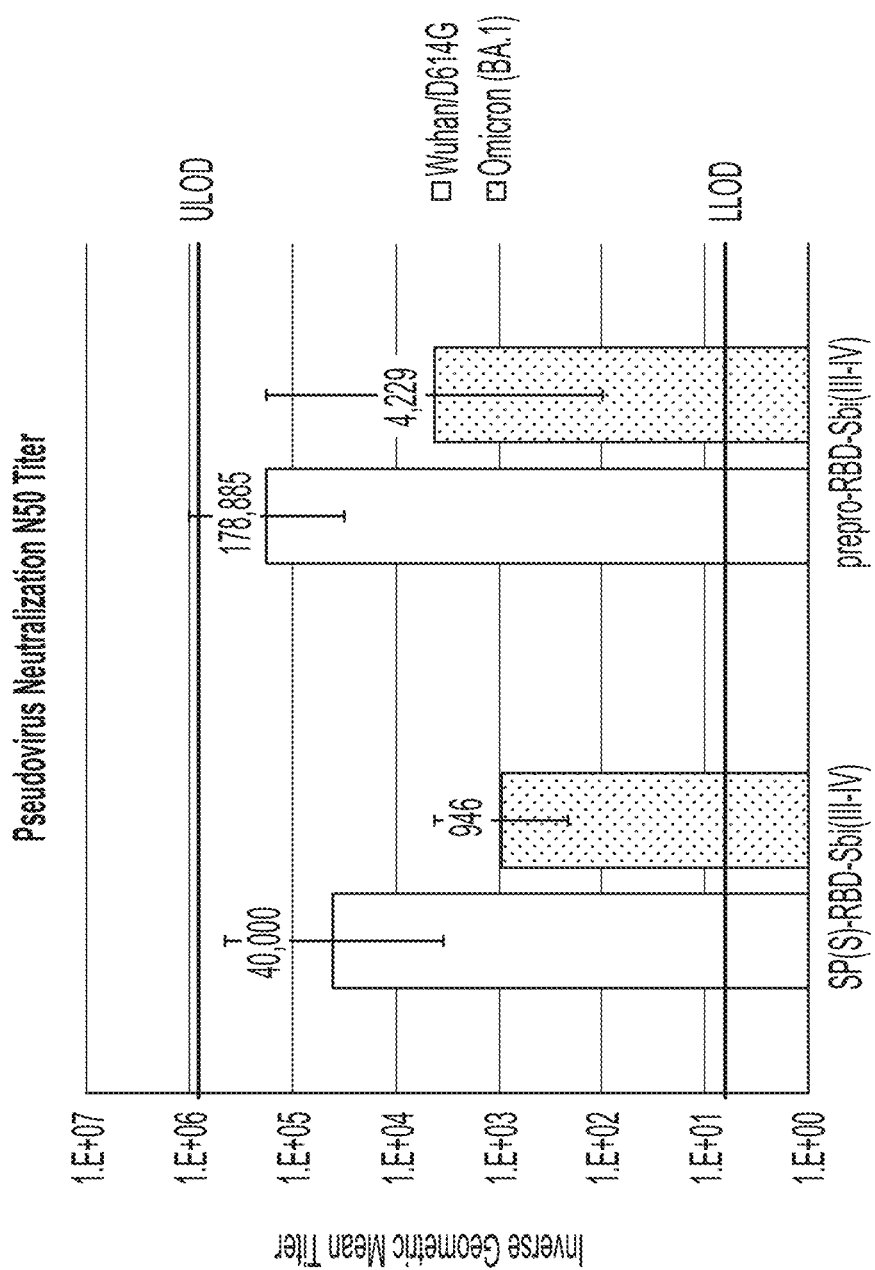

FIG. 12 is a bar graph depicting SARS-CoV-2 pseudotyped virus neutralization N50 titers of sera from mice vaccinated with SARS-CoV-2 strain RBDs associated with various signal peptides. "SP(S)-RBD-Sbi(III-IV)" refers to SARS-CoV-2 Spike receptor binding domain (RBD) fused to the *Staphylococcus aureus* binder of IgG protein subunits III and IV associated with native Spike signal peptide. "prepro-RBD-Sbi(III-IV)" refers to SARS-CoV-2 Spike receptor binding domain (RBD) fused to the *Staphylococcus aureus* binder of IgG protein subunits III and IV associated with wild-type α-factor prepro sequence. "Wuhan/D614G" refers to SARS-CoV-2 wild type RBD (white bars). "Omjcron (BA.1)" refers to SARS-CoV-2 Omicron BA.1 strain RBD (gray bars).

Figure 13:
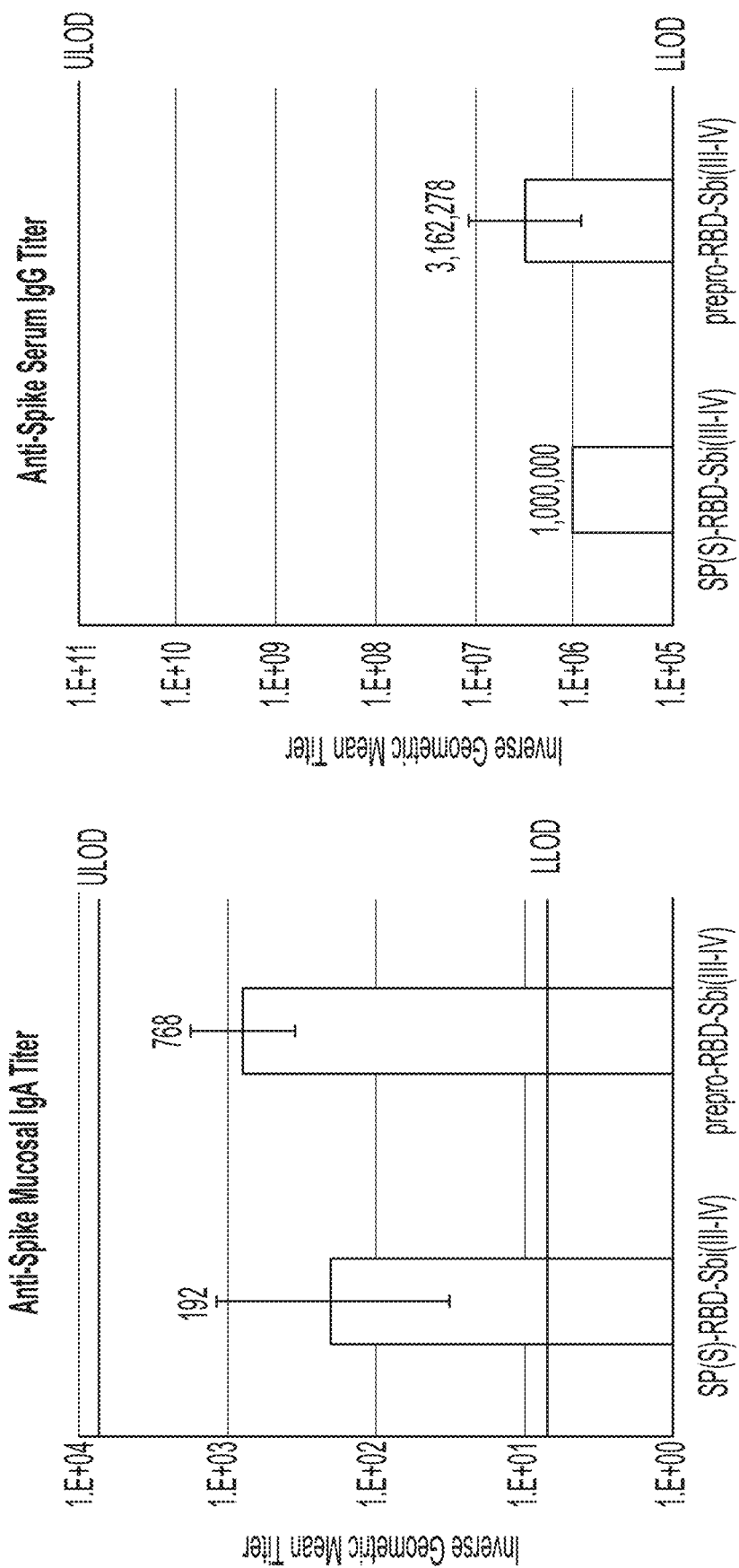

FIG. 13 consists of bar graphs depicting mucosal IgA and serum IgG titers against SARS-CoV-2 wild type Spike from the sera of vaccinated mice. "SP(S)-RBD-Sbi(III-IV)" refers to wild-type SARS-CoV-2 Spike receptor binding domain (RBD) fused to the *Staphylococcus aureus* binder of IgG protein subunits III and IV associated with native Spike signal peptide. "prepro-RBD-Sbi(III-IV)" refers to wild-type SARS-CoV-2 Spike receptor binding domain (RBD) fused to the *Staphylococcus aureus* binder of IgG protein subunits III and IV associated with wild-type α-factor prepro sequence

CERTAIN DEFINITIONS

About or approximately: As used herein, the terms "about" and "approximately," when used herein in reference to a value, refers to a value that is similar, in context to the referenced value. In general, those skilled in the art, familiar with the context, will appreciate the relevant degree of variance encompassed by "about" or "approximately" in that context. For example, in some embodiments, the term "about" or "approximately" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

Administering: As used herein, the term "administering" or "administration" typically refers to administration of a composition to a subject to achieve delivery of an agent that is, or is included in, the composition. Those of ordinary skill in the art will be aware of a variety of routes that may, in appropriate circumstances, be utilized for administration to a subject, for example a human. For example, in some embodiments, administration may be ocular, oral, parenteral, topical, etc. In some particular embodiments, administration may be bronchial (e.g., by bronchial instillation), buccal, dermal (which may be or comprise, for example, one or more of topical to the dermis, intradermal, interdermal, transdermal, etc.), enteral, intra-arterial, intradermal, intragastric, intramedullary, intramuscular, intranasal, intraperitoneal, intrathecal, intravenous, intraventricular, within a specific organ (e.g., intrahepatic), mucosal, nasal, oral, rectal, subcutaneous, sublingual, topical, tracheal (e.g., by intratracheal instillation), vaginal, vitreal, etc. In some embodiments, administration may involve only a single dose. In some embodiments, administration may involve application of a fixed number of doses. In some embodiments, administration may involve dosing that is intermittent (e.g., a plurality of doses separated in time) and/or periodic (e.g., individual doses separated by a common period of time) dosing. In some embodiments, administration may involve continuous dosing (e.g., perfusion) for at least a selected period of time.

α-factor prepro sequence: As used herein, the phrase "alpha-factor prepro sequence" or "α-factor prepro sequence" refers to a signal peptide or a portion thereof that is part of the yeast mating pheromone α-factor precursor protein, also known as "prepro-α-factor." An α-factor prepro sequence promotes translocation of a polypeptide comprising an α-factor prepro sequence or a portion thereof to a secretory pathway enabling secretion of the polypeptide. For example, in some embodiments, a polypeptide can comprises an α-factor prepro sequence and a payload polypeptide, where the α-factor prepro sequence promotes translocation of the polypeptide to a secretory pathway enabling secretion of the payload polypeptide. An α-factor prepro sequence includes a N terminal portion of about 19 amino acids that is also referred to as an α-factor pre sequence, and a C terminal portion of about 72 amino acids that is also referred to as an α-factor pro sequence. In some embodiments, an α-factor prepro sequence comprises the sequence of SEQ ID NO: 2 or a fragment or a variant thereof. In some embodiments, a variant of SEQ ID NO: 2 comprises SEQ ID NO: 70. In some embodiments, an α-factor prepro sequence comprises an α-factor pre sequence or a fragment or a variant thereof. In some embodiments, an α-factor pre sequence is provided as SEQ ID NO: 68. In some embodiments, an α-factor prepro sequence comprises an α-factor pro sequence or a fragment or a variant thereof. In some embodiments, an α-factor pro sequence is provided as SEQ ID NO: 69.

Amino acid: in its broadest sense, as used herein, refers to any compound and/or substance that can be incorporated into a polypeptide chain, e.g., through formation of one or more peptide bonds. In some embodiments, an amino acid has the general structure H2N—C(H)R)—COOH. In some embodiments, an amino acid is a naturally-occurring amino acid. In some embodiments, an amino acid is a non-natural amino acid; in some embodiments, an amino acid is a D-amino acid; in some embodiments, an amino acid is an L-amino acid. "Standard amino acid" refers to any of the twenty standard L-amino acids commonly found in naturally occurring peptides. "Nonstandard amino acid" refers to any amino acid, other than the standard amino acids, regardless of whether it is prepared synthetically or obtained from a natural source. In some embodiments, an amino acid, including a carboxy- and/or amino-terminal amino acid in a polypeptide, can contain a structural modification as compared with the general structure above. For example, in some embodiments, an amino acid may be modified by methylation, amidation, acetylation, pegylation, glycosylation, phosphorylation, and/or substitution (e.g., of the amino group, the carboxylic acid group, one or more protons, and/or the hydroxyl group) as compared with the general structure. In some embodiments, such modification may, for example, alter the circulating half-life of a polypeptide containing the modified amino acid as compared with one containing an otherwise identical unmodified amino acid. In some embodiments, such modification does not significantly alter a relevant activity of a polypeptide containing the modified amino acid, as compared with one containing an otherwise identical unmodified amino acid. As will be clear from context, in some embodiments, the term "amino acid" may be used to refer to a free amino acid; in some embodiments it may be used to refer to an amino acid residue of a polypeptide.

Antigen: The term "antigen," as used herein, refers to an agent that elicits an immune response; and/or (ii) an agent that binds to a T cell receptor (e.g., when presented by an MHC molecule) or to an antibody. In some embodiments, an antigen elicits a humoral response (e.g., including production of antigen-specific antibodies); in some embodiments, an antigen elicits a cellular response (e.g., involving T-cells whose receptors specifically interact with the antigen). In some embodiments, an antigen comprises at least one epitope of a target protein. In some embodiments, an epitope may be a linear epitope. In some embodiments, an epitope may be a conformational epitope. In some embodiments, an antigen binds to an antibody and may or may not induce a particular physiological response in an organism. In general, an antigen may be or include any chemical entity such as, for example, a small molecule, a nucleic acid, a polypeptide, a carbohydrate, a lipid, a polymer (in some embodiments other than a biologic polymer [e.g., other than a nucleic acid or amino acid polymer) etc. In some embodiments, an antigen is or comprises a polypeptide. In some embodiments, an antigen is or comprises a glycan. Those of ordinary skill in the art will appreciate that, in general, an antigen may be provided in isolated or pure form, or alternatively may be provided in crude form (e.g., together with other materials, for example in an extract such as a cellular extract or other relatively crude preparation of an antigen-containing source). In some embodiments, antigens utilized in accordance with the present invention are provided in a crude form. In some embodiments, an antigen is a recombinant antigen.

Biological Sample: As used herein, the term "biological sample" typically refers to a sample obtained or derived from a biological source (e.g., a tissue or organism or cell culture) of interest, as described herein. In some embodiments, a source of interest comprises an organism, such as an animal or human. In some embodiments, a biological sample is or comprises biological tissue or fluid. In some embodiments, a biological sample may be or comprise bone marrow; blood; blood cells; ascites; tissue or fine needle biopsy samples; cell-containing body fluids; free floating nucleic acids; sputum; saliva; urine; cerebrospinal fluid; peritoneal fluid; pleural fluid; feces; lymph; gynecological fluids; skin swabs; vaginal swabs; oral swabs; nasal swabs; washings or lavages such as a ductal lavages or broncheoalveolar lavages; aspirates; scrapings; bone marrow specimens; tissue biopsy specimens; surgical specimens; feces, other body fluids, secretions, and/or excretions; and/or cells therefrom, etc. In some embodiments, a biological sample is or comprises cells obtained from an individual. In some embodiments, obtained cells are or include cells from an individual from whom the sample is obtained. In some embodiments, a sample is a "primary sample" obtained directly from a source of interest by any appropriate means. For example, in some embodiments, a primary biological sample is obtained by methods selected from the group consisting of biopsy (e.g., fine needle aspiration or tissue biopsy), surgery, collection of body fluid (e.g., blood, lymph, feces etc.), etc. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to techniques such as amplification or reverse transcription of mRNA, isolation and/or purification of certain components, etc.

Characteristic portion: As used herein, the term "characteristic portion", in the broadest sense, refers to a portion of a substance whose presence (or absence) correlates with presence (or absence) of a particular feature, attribute, or activity of the substance. In some embodiments, a characteristic portion of a substance is a portion that is found in the substance and in related substances that share the particular feature, attribute or activity, but not in those that do not share the particular feature, attribute or activity. In certain embodiments, a characteristic portion shares at least one functional characteristic with the intact substance. For example, in some embodiments, a "characteristic portion" of a protein or polypeptide is one that contains a continuous stretch of amino acids, or a collection of continuous stretches of amino acids, that together are characteristic of a protein or polypeptide. In some embodiments, each such continuous stretch generally contains at least 2, 5, 10, 15, 20, 50, or more amino acids. In general, a characteristic portion of a substance (e.g., of a protein, antibody, etc.) is one that, in addition to the sequence and/or structural identity specified above, shares at least one functional characteristic with the relevant intact substance. In some embodiments, a characteristic portion may be biologically active.

Comparable: As used herein, the term "comparable" refers to two or more agents, entities, situations, sets of conditions, etc., that may not be identical to one another but that are sufficiently similar to permit comparison therebetween so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Determine: Many methodologies described herein include a step of "determining." Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

Delivery/contacting: As used interchangeably herein, the term "delivery," "delivering," or "contacting" refers to introduction of a fusion polynucleotide (e.g., as described herein) or a fusion polypeptide (e.g., as described herein) into a target cell. A target cell can be cultured in vitro or ex vivo or be present in a subject (in vivo). Methods of introducing a fusion polynucleotide (e.g., as described herein) or a fusion polypeptide (e.g., as described herein) into a target cell can vary with in vitro, ex vivo, or in vivo applications. In some embodiments, a fusion polynucleotide (e.g., as described herein) or a fusion polypeptide (e.g., as described herein) can be introduced into a target cell in a cell culture by in vitro transfection. In some embodiments, a fusion polynucleotide (e.g., as described herein) or a fusion polypeptide (e.g., as described herein) can be introduced into a target cell via delivery vehicles (e.g., nanoparticles, liposomes, and/or complexation with a cell-penetrating agent). In some embodiments, a fusion polynucleotide (e.g., as described herein) or a fusion polypeptide (e.g., as described herein) can be introduced into a target cell in a subject by administering a fusion polynucleotide (e.g., as described herein) or a fusion polypeptide (e.g., as described herein) to a subject.

Functional: As used herein, the term "functional" is used to refer to a form or fragment of an entity that exhibits a particular property and/or activity.

Fragment: A "fragment" of a material or entity as described herein has a structure that includes a discrete portion of the whole, but lacks one or more moieties found in the whole. In some embodiments, a fragment consists of such a discrete portion. In some embodiments, a fragment consists of or comprises a characteristic structural element or moiety found in the whole. In some embodiments, a fragment comprises a polynucleotide fragment. In some embodiments, a fragment comprises a polypeptide fragment. In some embodiments, a polynucleotide fragment or a polypeptide fragment comprises or consists of at least 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 275, 300, 325, 350, 375, 400, 425, 450, 475, 500 or more monomeric units (e.g., residues) as found in the whole polynucleotide or whole polypeptide. In some embodiments, a polynucleotide fragment or a polypeptide fragment comprises or consists of at least about 5%, 10%, 15%, 20%, 25%, 30%, 25%, 40%, 45%, 50%, 55%, 60%, 65%, 70%, 75%, 80%, 85%, 90%, 95%, 96%, 97%, 98%, 99% or more of the monomeric units (e.g., residues) found in the whole polynucleotide or whole polypeptide. The whole polypeptide or whole polynucleotide may in some embodiments be referred to as the "parent" of the polynucleotide fragment or polypeptide fragment.

Engineered: In general, the term "engineered" refers to the aspect of having been manipulated by the hand of man. For example, in some embodiments, a small molecule may be considered to be engineered if its structure and/or production is designed and/or implemented by the hand of man. Analogously, in some embodiments, a polynucleotide may be considered to be "engineered" when two or more sequences, that are not linked together in that order in nature, are manipulated by the hand of man to be directly linked to one another in the engineered polynucleotide. For example, in some embodiments of the present invention, an engineered polynucleotide comprises a regulatory sequence that is found in nature in operative association with a first coding sequence but not in operative association with a second coding sequence, is linked by the hand of man so that it is operatively associated with the second coding sequence. Comparably, a cell or organism is considered to be "engineered" if it has been manipulated so that its genetic information is altered (e.g., new genetic material not previously present has been introduced, for example by transformation, mating, somatic hybridization, transfection, transduction, or other mechanism, or previously present genetic material is altered or removed, for example by substitution or deletion mutation, or by mating protocols). As is common practice and is understood by those in the art, expression products of an engineered polynucleotide, and/or progeny of an engineered polynucleotide or cell are typically still referred to as "engineered" even though the actual manipulation was performed on a prior entity.

Epitope: as used herein, includes any moiety that is specifically recognized by an immunoglobulin (e.g., antibody or receptor) binding component. In some embodiments, an epitope is comprised of a plurality of chemical atoms or groups on an antigen. In some embodiments, such chemical atoms or groups are surface-exposed when the antigen adopts a relevant three-dimensional conformation. In some embodiments, such chemical atoms or groups are physically near to each other in space when the antigen adopts such a conformation. In some embodiments, at least some such chemical atoms are groups are physically separated from one another when the antigen adopts an alternative conformation (e.g., is linearized).

Functional: As used herein, a "functional" biological molecule is a biological molecule in a form in which it exhibits a property and/or activity by which it is characterized. A biological molecule may have two functions (i.e., bifunctional) or many functions (i.e., multifunctional).

Identity: As used herein, the term "identity" refers to the overall relatedness between polymeric molecules, e.g., between nucleic acid molecules (e.g., DNA molecules and/or RNA molecules) and/or between polypeptide molecules. In some embodiments, polymeric molecules are considered to be "substantially identical" to one another if their sequences are at least 25%, 30%, 35%, 40%, 45%, 50%, 55%, 60%, 65%, 70%, 75%, 80%, 85%, 90%, 95%, or 99% identical. Calculation of the percent identity of two nucleic acid or polypeptide sequences, for example, can be performed by aligning the two sequences for optimal comparison purposes (e.g., gaps can be introduced in one or both of a first and a second sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or substantially 100% of the length of a reference sequence. The nucleotides at corresponding positions are then compared. When a position in the first sequence is occupied by the same residue (e.g., nucleotide or amino acid) as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using the algorithm of Meyers and Miller (CABIOS, 1989, 4: 11-17), which has been incorporated into the ALIGN program (version 2.0). In some exemplary embodiments, nucleic acid sequence comparisons made with the ALIGN program use a PAM120 weight residue table, a gap length penalty of 12 and a gap penalty of 4. The percent identity between two nucleotide sequences can, alternatively, be determined using the GAP program in the GCG software package using an NWSgapdna.CMP matrix.

Improve, increase, inhibit, or reduce: As used herein, the terms "improve," "increase," "inhibit," "reduce," or grammatical equivalents thereof, indicate values that are relative to a baseline or other reference measurement. In some embodiments, an appropriate reference measurement may be or comprise a measurement in a particular system (e.g., in a single individual) under otherwise comparable conditions absent presence of (e.g., prior to and/or after) a particular agent or treatment, or in presence of an appropriate comparable reference agent. In some embodiments, an appropriate reference measurement may be or comprise a measurement in comparable system known or expected to respond in a particular way, in presence of the relevant agent or treatment.

Nucleic acid, Oligonucleotide, Polynucleotide: As used herein, the terms "nucleic acid" and "polynucleotide" and "oligonucleotide" are used interchangeably, and refer to a polymer of 3 nucleotides or more. In some embodiments, a nucleic acid comprises DNA. In some embodiments, a nucleic acid comprises RNA. In some embodiments, a nucleic acid comprises messenger RNA (mRNA). In some embodiments, a nucleic acid is single stranded. In some embodiments, a nucleic acid is double stranded. In some embodiments, a nucleic acid comprises both single and double stranded portions. In some embodiments, a nucleic acid comprises a backbone that comprises one or more phosphodiester linkages. In some embodiments, a nucleic acid comprises a backbone that comprises both phosphodiester and non-phosphodiester linkages. For example, in some embodiments, a nucleic acid may comprise a backbone that comprises one or more phosphorothioate or 5'-N-phosphoramidite linkages and/or one or more peptide bonds, e.g., as in a "peptide nucleic acid". In some embodiments, a nucleic acid comprises one or more, or all, natural residues (e.g., adenine, cytosine, deoxyadenosine, deoxycytidine, deoxyguanosine, deoxythymidine, guanine, thymine, uracil). In some embodiments, a nucleic acid comprises on or more, or all, non-natural residues. In some embodiments, a non-natural residue comprises a nucleoside analog (e.g., 2-aminoadenosine, 2-thiothymidine, inosine, pyrrolo-pyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, 6-O-methylguanine, 2-thiocytidine, methylated bases, intercalated bases, and combinations thereof). In some embodiments, a non-natural residue comprises one or more modified sugars (e.g., 2'-fluororibose, ribose, 2'-deoxyribose, arabinose, and hexose) as compared to those in natural residues. In some embodiments, a nucleic acid has a nucleotide sequence that encodes a functional gene product such as an RNA or polypeptide. In some embodiments, a nucleic acid has a nucleotide sequence that comprises one or more introns. In some embodiments, a nucleic acid may be prepared by isolation from a natural source, enzymatic synthesis (e.g., by polymerization based on a complementary template, e.g., in vivo or in vitro, reproduction in a recombinant cell or system, or chemical synthesis. In some embodiments, a nucleic acid is at least 3, 4, 5, 6, 7, 8, 9, 10, 15, 20, 25, 30, 35, 40, 45, 50, 55, 60, 65, 70, 75, 80, 85, 90, 95, 100, 1 10, 120, 130, 140, 150, 160, 170, 180, 190, 20, 225, 250, 275, 300, 325, 350, 375, 400, 425, 450, 475, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, or 20,000 or more residues or nucleotides long. When a number of nucleotides is used as an indication of size, e.g., of a fusion polynucleotide, a certain number of nucleotides refers to the number of nucleotides on a single strand, e.g., of a fusion polynucleotide.

Operably linked: as used herein, refers to a juxtaposition wherein the components described are in a relationship permitting them to function in their intended manner. A control element "operably linked" to a functional element is associated in such a way that expression and/or activity of the functional element is achieved under conditions compatible with the control element. In some embodiments, "operably linked" control elements are contiguous (e.g., covalently linked) with the coding elements of interest; in some embodiments, control elements act in trans to or otherwise at a from the functional element of interest.

Polypeptide: The term "polypeptide," which is interchangeably used herein with the term "protein," generally has its art-recognized meaning of a polymer of at least three amino acids or more. Those of ordinary skill in the art will appreciate that the term "polypeptide" is intended to be sufficiently general as to encompass not only polypeptides having a complete sequence recited herein, but also to encompass polypeptides that represent functional, biologically active, or characteristic fragments, portions or domains (e.g., fragments, portions, or domains retaining at least one activity) of such complete polypeptides. Polypeptides may contain L-amino acids, D-amino acids, or both and may contain any of a variety of amino acid modifications or analogs known in the art. Useful modifications include, e.g., terminal acetylation, amidation, methylation, etc. In some embodiments, polypeptides may comprise natural amino acids, non-natural amino acids, synthetic amino acids, and combinations thereof. In some embodiments, a polypeptide can be a protein.

Polyribonucleotide: As used herein, the term "polyribonucleotide" refers to a polymer of 3 ribonucleotides or more. In some embodiments, a polyribonucleotide is single stranded. In some embodiments, a polyribonucleotide is double stranded. In some embodiments, a polyribonucleotide comprises both single and double stranded portions. In some embodiments, a polyribonucleotide can comprise a backbone structure as described in the definition of "Nucleic acid/Oligonucleotide" above. A polyribonucleotide can be a regulatory RNA (e.g., siRNA, microRNA, etc.), or a messenger RNA (mRNA) oligonucleotide. In some embodiments where a polyribonucleotide is a mRNA oligonucleotide, a polyribonucleotide typically comprises at its 3' end a poly(A) region. In some embodiments where a polyribonucleotide is an mRNA oligonucleotide, a polyribonucleotide typically comprises at its 5' end an art-recognized cap structure, e.g., for recognizing and attachment of an mRNA to a ribosome to initiate translation. In some embodiments, a polyribonucleotide comprises an RNA oligonucleotide. When a number of ribonucleotides is used as an indication of size, e.g., for a polyribonucleotide, a certain number of nucleotides refers to the number of ribonucleotides on a single strand.

Recombinant: as used herein, is intended to refer to polypeptides that are designed, engineered, prepared, expressed, created, manufactured, and/or or isolated by recombinant means, such as polypeptides expressed using a recombinant expression vector transfected into a host cell; polypeptides isolated from a recombinant, combinatorial human polypeptide library; polypeptides isolated from an animal (e.g., a mouse, rabbit, sheep, fish, etc) that is transgenic for or otherwise has been manipulated to express a gene or genes, or gene components that encode and/or direct expression of the polypeptide or one or more component(s), portion(s), element(s), or domain(s) thereof; and/or polypeptides prepared, expressed, created or isolated by any other means that involves splicing or ligating selected nucleic acid sequence elements to one another, chemically synthesizing selected sequence elements, and/or otherwise generating a nucleic acid that encodes and/or directs expression of the polypeptide or one or more component(s), portion(s), element(s), or domain(s) thereof. In some embodiments, one or more of such selected sequence elements is found in nature. In some embodiments, one or more of such selected sequence elements is designed in silico. In some embodiments, one or more such selected sequence elements results from mutagenesis (e.g., in vivo or in vitro) of a known sequence element, e.g., from a natural or synthetic source such as, for example, in the germline of a source organism of interest (e.g., of a human, a mouse, etc).

Reference: As used herein describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

Sample: As used herein, the term "sample" typically refers to an aliquot of material obtained or derived from a source of interest. In some embodiments, a source of interest is a biological or environmental source. In some embodiments, a source of interest may be or comprise a cell or an organism, such as a microbe, a plant, or an animal (e.g., a human). In some embodiments, a source of interest is or comprises biological tissue or fluid. In some embodiments, a biological tissue or fluid may be or comprise amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humour, vomit, and/or combinations or component(s) thereof. In some embodiments, a biological fluid may be or comprise an intracellular fluid, an extracellular fluid, an intravascular fluid (blood plasma), an interstitial fluid, a lymphatic fluid, and/or a transcellular fluid. In some embodiments, a biological fluid may be or comprise a plant exudate. In some embodiments, a biological tissue or sample may be obtained, for example, by aspirate, biopsy (e.g., fine needle or tissue biopsy), swab (e.g., oral, nasal, skin, or vaginal swab), scraping, surgery, washing or lavage (e.g., brocheoalvealar, ductal, nasal, ocular, oral, uterine, vaginal, or other washing or lavage). In some embodiments, a biological sample is or comprises cells obtained from an individual. In some embodiments, a sample is a "primary sample" obtained directly from a source of interest by any appropriate means. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to one or more techniques such as amplification or reverse transcription of nucleic acid, isolation and/or purification of certain components, etc.

Subject: As used herein, the term "subject" refers an organism, typically a mammal (e.g., a human). In some embodiments, a subject is suffering from a disease, disorder or condition. In some embodiments, a subject is susceptible to a disease, disorder, or condition. In some embodiments, a subject displays one or more symptoms or characteristics of a disease, disorder or condition. In some embodiments, a subject does not display any symptom or characteristic of a disease, disorder, or condition. In some embodiments, a subject is someone with one or more features characteristic of susceptibility to or risk of a disease, disorder, or condition. In some embodiments, a subject is a patient. In some embodiments, a subject is an individual to whom diagnosis and/or therapy is and/or has been administered.

Treatment: As used herein, the term "treatment" (also "treat" or "treating") refers to any administration of a therapy that partially or completely alleviates, ameliorates, relives, inhibits, delays onset of, reduces severity of, and/or reduces incidence of one or more symptoms, features, and/or causes of a particular disease, disorder, and/or condition. In some embodiments, such treatment may be of a subject who does not exhibit signs of the relevant disease, disorder and/or condition and/or of a subject who exhibits early signs of the disease, disorder, and/or condition. Alternatively or additionally, such treatment may be of a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

Variant: As used herein, the term "variant" refers to an entity that shows significant structural identity with a reference entity but differs structurally from the reference entity in the presence or level of one or more chemical moieties as compared with the reference entity. In many embodiments, a variant also differs functionally from its reference entity. In general, whether a particular entity is properly considered to be a "variant" of a reference entity is based on its degree of structural identity with the reference entity. For example, a variant polypeptide may differ from a reference polypeptide as a result of one or more differences in amino acid sequence and/or one or more differences in chemical moieties (e.g., carbohydrates, lipids, etc.) covalently attached to the polypeptide backbone. Alternatively or additionally, in some embodiments, a variant polypeptide does not share at least one characteristic sequence element with a reference polypeptide. In some embodiments, the reference polypeptide has one or more biological activities. In some embodiments, a variant polypeptide shares one or more of the biological activities of the reference polypeptide. In some embodiments, a variant polypeptide lacks one or more of the biological activities of the reference polypeptide. In some embodiments, a variant polypeptide shows a reduced level of one or more biological activities as compared with the reference polypeptide.

Standard techniques may be used for recombinant DNA, oligonucleotide synthesis, e.g., mRNA synthesis, and tissue culture and transformation (e.g., electroporation, lipofection). Enzymatic reactions and purification techniques may be performed according to manufacturer's specifications or as commonly accomplished in the art or as described herein. The foregoing techniques and procedures may be generally performed according to conventional methods well known in the art and as described in various general and more specific references that are cited and discussed throughout the present specification. See e.g., Sambrook et al., Molecular Cloning: A Laboratory Manual (2nd ed., Cold Spring Harbor Laboratory Press, Cold Spring Harbor, N.Y. (1989)), which is incorporated herein by reference for any purpose.

DETAILED DESCRIPTION OF CERTAIN EMBODIMENTS

Protein secretion from living cells is a crucial step in many medical and scientific processes. Enhancements in protein secretion could enable greater production of biologics for less cost, smaller vaccine doses, and simpler experimental procedures for protein studies. Strategies have been employed to boost protein secretion from live cells, including expression boosters such as codon optimization and strong promoters, and addition of N-terminal signal peptide sequences that drive translocation to the ER. However there is still room to increase protein secretion further.

The present disclosure provides that associating an α-factor prepro sequence or a fragment thereof (e.g., an α-factor pre sequence or an α-factor pro sequence) with a wide range of polypeptides enhances the secretion of those proteins from mammalian cells (e.g., a human cell line). Polypeptides assessed include synthetic SARS-CoV-2 antigens, influenza hemagglutinin, HER2-targeted single chain antibodies, and biologic therapeutics. Furthermore, the present disclosure demonstrates that optimization of an α-factor prepro sequence or a fragment thereof can even further enhance secretion of associated polypeptides from a human cell line.

The present disclosure also provides the insight that associating an *Arabidopsis* Root Growth Factor (GLV) secretion peptide sequence disclosed herein alone or in combination with an α-factor prepro sequence disclosed herein with a wide range of polypeptides enhances the secretion of those proteins from plant cells, e.g., *Arabidopsis* cells.

α-Factor Prepro Sequence

Soluble secretory proteins are translocated from the cytoplasm into the ER, and then trafficked to the Golgi and finally to secretory vesicles which fuse with the plasma membrane, secreting their cargo from the cell. The yeast mating pheromone α-factor is a secreted peptide that binds to the receptors on the compatible yeast cell type to enable fusion (Naider et al., which is incorporated herein by reference in its entirety). α-factor is synthesized as a precursor protein, referred to as "prepro-α-factor," consisting of a signal peptide, a propeptide region, and four repeats of the active peptide pheromone. The signal peptide drives translocation to the ER, where it is cleaved. The propeptide region enables export from the ER and transport to the Golgi apparatus (Otte et al., which is incorporated herein by reference in its entirety). Proteolytic processing in the Golgi generates mature α-factor peptide. The α-factor sequence encompassing both the signal peptide and the propeptide region (prepro) has been shown to increase expression 20-fold when fused to human lysozyme and expressed in yeast cells (Oka et al., which is incorporated herein by reference in its entirety).

Polypeptides

Among other things, the present disclosure provides polypeptides. A polypeptide disclosed herein are engineered to comprise a payload polypeptide and a wild-type or engineered α-factor prepro sequence or a fragment thereof (e.g., an α-factor pre sequence or an α-factor pro sequence), where the wild-type or engineered α-factor prepro sequence or a fragment thereof is operably linked to the payload polypeptide. In some embodiments, a wild-type or engineered α-factor prepro sequence or a fragment thereof (e.g., an α-factor pre sequence or an α-factor pro sequence) is able to mediate the transport of a payload polypeptide. In some embodiments, a wild-type or engineered α-factor prepro sequence or a fragment thereof (e.g., an α-factor pre sequence or an α-factor pro sequence) is able to mediate the transport of a payload polypeptide to the cell membrane, e.g., for secretion outside the cell.

The present disclosure provides, for example, the insight that a wild-type or engineered α-factor prepro sequence or a fragment thereof (e.g., an α-factor pre sequence or an α-factor pro sequence) is able to mediate the transport of a payload polypeptide to the cell membrane, e.g., for secretion outside the cell (e.g., a mammalian cell), at a greater level than other signal peptides. In some embodiments, a level of secretion can be a secretion rate. In some embodiments, a level of secretion can be an amount of polypeptide secreted.

The present disclosure provides the recognition that the increased level of secretion can be useful for a number of methods in developing therapeutics, including the manufacture of polypeptides (e.g., polypeptide therapeutics) and the use of therapeutic polypeptides expressed in vivo from delivered polynucleotides. Accordingly, in some embodiments, a payload polypeptide is a therapeutic polypeptide. Multiple therapeutic polypeptides are known in the art, and the technology disclosed herein can be used with a wide variety of therapeutic polypeptides. The present disclosure recognizes that biologic therapeutics are becoming increasingly important for addressing health concerns. The present disclosure recognizes that multiple biologic polypeptides can be used as a payload polypeptide in engineered polypeptides described herein.

For example, in some embodiments, a payload polypeptide can comprise one or more antigens. In some embodiments, one or more antigens are one or more viral antigens. In some embodiments, one or more viral antigens are one or more SARS-CoV-2 antigens. In some embodiments, one or more viral antigens comprises a SARS-CoV-2 receptor binding domain or fragment thereof. In some embodiments, one or more viral antigens comprises a SARS-CoV-2 receptor binding domain variant or fragment thereof. In some embodiments, one or more viral antigens comprises a SARS-CoV-2 spike protein or fragment thereof. In some embodiments, one or more viral antigens comprises a SARS-CoV-2 spike protein variant or fragment thereof. In some embodiments, one or more viral antigens are one or more influenza antigens, e.g., influenza A antigens.

The use of the present technology for expressing antigens is not limited to viral antigens, and other antigens can be encoded by polypeptides disclosed herein. For instance, one or more antigens can be one or more bacterial antigens. In some embodiments, one or more antigens are one or more cancer antigens. In some embodiments, one or more antigens are one or more archaeal antigens.

In some embodiments, a payload polypeptide comprises an antibody or fragment thereof. An antibody refers to a polypeptide that includes canonical immunoglobulin sequence elements sufficient to confer specific binding to a particular target antigen. As is known in the art, intact antibodies as produced in nature are approximately 150 kD tetrameric agents comprised of two identical heavy chain polypeptides (about 50 kD each) and two identical light chain polypeptides (about 25 kD each) that associate with each other into what is commonly referred to as a "Y-shaped" structure. Antibody tetramers are comprised of two heavy chain-light chain dimers in which the heavy and light chains are linked to one another by a single disulfide bond; two other disulfide bonds connect the heavy chain hinge regions to one another, so that the dimers are connected to one another and the tetramer is formed. While canonical antibodies are tetramers, an antibody provided herein can have a variety of formats. For example, an antibody can be in a format selected from, but not limited to, intact IgA, IgG, IgE or IgM antibodies; or bi- or multispecific antibodies (e.g., Zybodies®, etc). In some embodiments, antibody fragments can be selected from Fab fragments, Fab' fragments, F(ab')2 fragments, Fd' fragments, Fd fragments, and isolated CDRs or sets thereof; single chain Fvs; polypeptide-Fc fusions; single domain antibodies (e.g., shark single domain antibodies such as IgNAR or fragments thereof); cameloid antibodies; masked antibodies (e.g., Probodies®); Small Modular ImmunoPharmaceuticals ("SMIPs™"); single chain or Tandem diabodies (TandAb®); VHHs; Anticalins®; Nanobodies® minibodies; BiTE®s; ankyrin repeat proteins or DARPINs®; Avimers®; DARTs; TCR-like antibodies;, Adnectins®; Affilins®; Trans-bodies®; Affibodies®; TrimerX®; MicroProteins; Fynomers®, Centyrins®; and KALBITOR®s. In some embodiments, an antibody may lack a covalent modification (e.g., attachment of a glycan) that it would have if produced naturally. In some embodiments, an antibody may contain a covalent modification (e.g., attachment of a glycan, a payload [e.g., a detectable moiety, a therapeutic moiety, a catalytic moiety, etc], or other pendant group [e.g., polyethylene glycol, etc.].

In some embodiments, a payload polypeptide can comprise a recombinant polypeptide (e.g., a fusion polypeptide) including an extracellular receptor. In some embodiments, a payload polypeptide can comprise a recombinant polypeptide (e.g., a fusion polypeptide) including an immunoglobulin constant region. In some embodiments, a payload polypeptide can comprise a recombinant polypeptide (e.g., a fusion polypeptide) including an extracellular receptor and an immunoglobulin constant region. For example, in some embodiments, a payload polypeptide can comprise aflibercept or fragments thereof. In some embodiments, aflibercept can have a sequence as provided at go.drugbank.com/drugs/DB08885, which is incorporated herein by reference in its entirety.

In some embodiments, a payload polypeptide can comprise a recombinant polypeptide (e.g., a fusion polypeptide) including a receptor agonist or antagonist. In some embodiments, a payload polypeptide can comprise a recombinant polypeptide (e.g., a fusion polypeptide) including an immunoglobulin constant region. In some embodiments, a payload polypeptide can comprise a recombinant polypeptide (e.g., a fusion polypeptide) including a receptor agonist or antagonist and an immunoglobulin constant region. For example, in some embodiments, a payload polypeptide can comprise dulaglutide or fragments thereof. In some embodiments, dulaglutide can have a sequence as provided at go.drugbank.com/drugs/DB09045, which is incorporated herein by reference in its entirety.

In some embodiments, a payload polypeptide can comprise secreted embryonic alkaline phosphatase (SEAP) or fragment thereof. In some embodiments, a payload polypeptide can comprise trastuzumab, a trastuzumab scFv, or fragment of trastuzumab. In some embodiments, a payload polypeptide can comprise pertuzumab, a pertuzumab scFV or fragment of pertuzumab. In some embodiments, a payload polypeptide can comprise GB235, a GB235 scFv or fragment of GB235. In some embodiments, a payload polypeptide can comprise adalimumab, adalimumab scFv, or a fragment of adalimumab. In some embodiments, a payload polypeptide can comprise pembrolizumab, a pembrolizumab scFV, or a fragment of pembrolizumab. In some embodiments, a payload polypeptide can comprise aflibercept or a fragment thereof. In some embodiments, a payload polypeptide can comprise dupilumab, dupilumab scFv, or a fragment of dupilumab. In some embodiments, a payload polypeptide can comprise ustekinumab, ustekinumab scFv, or a fragment of ustekinumab. In some embodiments, a payload polypeptide can comprise nivolumab, nivolumab scFv, or a fragment of nivolumab. In some embodiments, a payload polypeptide can comprise bevacizumab, bevacizumab scFv, or a fragment of bevacizumab. In some embodiments, a payload polypeptide can comprise etanercept or a fragment thereof. In some embodiments, a payload polypeptide can comprise tisagenlecleucel or a fragment thereof. In some embodiments, a payload polypeptide can comprise a tisagenlecleucel extracellular domain and/or a tisagenlecleucel transmembrane domain. In some embodiments, a payload polypeptide can comprise axicabtagene ciloleucel or a fragment thereof. In some embodiments, a payload polypeptide can comprise an axicabtagene ciloleucel extracellular domain and/or an axicabtagene ciloleucel transmembrane domain. In some embodiments, a payload polypeptide can comprise lisocabtagene maraleucel or a fragment thereof. In some embodiments, a payload polypeptide can comprise a lisocabtagene maraleucel extracellular domain and/or a lisocabtagene maraleucel transmembrane domain. In some embodiments, a payload polypeptide can comprise an A3B1 chimeric antigen receptor (A3B1 CAR) or a fragment thereof. In some embodiments, a payload polypeptide can comprise an A3B1 CAR extracellular domain and/or an A3B1 CAR transmembrane domain.

In some embodiments, a payload polypeptide comprises a sequence according to SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17, SEQ ID NO: 19, SEQ ID NO: 21, SEQ ID NO: 23, SEQ ID NO: 25, SEQ ID NO: 27, SEQ ID NO: 29, SEQ ID NO: 31, SEQ ID NO: 33, SEQ ID NO: 35, SEQ ID NO: 37, SEQ ID NO: 39, SEQ ID NO: 72, or SEQ ID NO: 79.

In some embodiments, a payload polypeptide can comprise a secreted embryonic alkaline phosphatase (SEAP) or fragment thereof; trastuzumab, a trastuzumab scFv, or fragment of trastuzumab; pertuzumab, a pertuzumab scFV or fragment of pertuzumab; GB235, a GB235 scFv or fragment of GB235; adalimumab, adalimumab scFv, or a fragment of adalimumab; pembrolizumab, a pembrolizumab scFV, or a fragment of pembrolizumab; aflibercept or a fragment thereof, dupilumab, dupilumab scFv, or a fragment of dupilumab; ustekinumab, ustekinumab scFv, or a fragment of ustekinumab; nivolumab, nivolumab scFv, or a fragment of nivolumab; bevacizumab, bevacizumab scFv, or a fragment of bevacizumab; etanercept or a fragment thereof; tisagenlecleucel or a fragment thereof (e.g., a tisagenlecleucel extracellular domain and/or a tisagenlecleucel transmembrane domain); axicabtagene ciloleucel or a fragment thereof (e.g., an axicabtagene ciloleucel extracellular domain and/or an axicabtagene ciloleucel transmembrane domain); lisocabtagene maraleucel or a fragment thereof (e.g., a lisocabtagene maraleucel extracellular domain and/or a lisocabtagene maraleucel transmembrane domain); or a combination thereof; or an A3B1 chimeric antigen receptor (A3B1 CAR) or a fragment thereof (e.g., an A3B1 CAR extracellular domain and/or an A3B1 CAR transmembrane domain).

In some embodiments, a wild-type or engineered α-factor prepro sequence or a fragment thereof is present on the N-terminus of the engineered polypeptide. In some embodiments, a wild-type or engineered α-factor prepro sequence or a fragment thereof (e.g., an α-factor pre sequence or an α-factor pro sequence) is present on the C-terminus of the engineered polypeptide.

In some embodiments, an engineered polypeptide comprises a wild-type α-factor prepro sequence or a fragment thereof (e.g., an α-factor pre sequence or an α-factor pro sequence). In some embodiments, a wild-type α-factor prepro sequence comprises a sequence according to SEQ ID NO: 2.

In some embodiments, an engineered polypeptide comprises a wild-type α-factor pre sequence. In some embodiments, a wild-type α-factor pre sequence comprises a sequence according to SEQ ID NO: 68.

In some embodiments, an engineered polypeptide comprises a wild-type α-factor pro sequence or a fragment thereof. In some embodiments, a wild-type α-factor pro sequence comprises a sequence according to SEQ ID NO: 69.

In some embodiments, an engineered polypeptide comprises an engineered α-factor prepro sequence or a fragment thereof (e.g., an α-factor pre sequence or an α-factor pro sequence). In some embodiments, an engineered α-factor prepro sequence comprises a sequence according to SEQ ID NO: 70.

In some embodiments, an engineered polypeptide comprises an engineered α-factor pro sequence or a fragment thereof. In some embodiments, an engineered α-factor pro sequence comprises a sequence according to SEQ ID NO: 71.

In some embodiments, an engineered polypeptide comprises an engineered α-factor prepro sequence. In some embodiments, an engineered α-factor prepro sequence comprises a tripeptide motif having Surf4 binding affinity (Surf4 motif). In some embodiments, an engineered α-factor prepro sequence comprises at least two (e.g., two, three, four, or more) Surf4 motifs. In some embodiments, a Surf4 motif is MPL. In some embodiments, a Surf4 motif replaces the N-terminal-most 3 residues of an α-factor propeptide sequence of an α-factor prepro sequence. In some embodiments, the N-terminal-most 3 residues of an α-factor propeptide sequence of an α-factor prepro sequence remain after an α-factor prepeptide sequence of an α-factor prepro sequence is cleaved. In some embodiments, the N-terminal-most 3 residues of an α-factor propeptide sequence of an α-factor prepro sequence are residues 20-22 of SEQ ID NO: 2.

In some embodiments, an engineered α-factor prepro sequence comprises two or more, three or more, or four or more Surf4 motifs. In some embodiments, Surf4 motifs are joined together by a linker. In some embodiments, a linker comprises at least 2 amino acids, at least 3 amino acids, at least 4 amino acids, at least 5 amino acids, at least 6 amino acids, at least 7 amino acids, at least 8 amino acids, at least 9 amino acids, at least 10 amino acids, or at least 15 amino acids. In some embodiments, a linker is a serine-glycine linker. In some embodiments, a serine-glycine linker can comprise a sequence of SGGGSGGSGS (SEQ ID NO: 66). In some embodiments, a linker is an alanine-alanine linker. In some embodiments, a serine-glycine linker can comprise a sequence of AA.

In some embodiments, an engineered α-factor prepro sequence does not include an Ste13 cleavage site. In some embodiments, an Ste13 cleavage site comprises EAEA (SEQ ID NO: 56).

In some embodiments, an engineered α-factor prepro sequence does not include a Kex2 cleavage site. In some embodiments, a Kex2 cleavage site comprises KR. In some embodiments, a Kex2 cleavage site found in a wild-type α-factor prepro sequence has been replaced in the engineered α-factor prepro sequence with a protease cleavage site of a human protease. In some embodiments, a Kex2 cleavage site found in a wild-type α-factor prepro sequence has been replaced in the engineered α-factor prepro sequence with a protease cleavage site of S1P, PCSK4, PCSK9, or furin. As used herein, "replace," "replacement," and variations thereof should not be understood as being limited to a direct replacement—e.g., a deletion of the original sequence and an insertion of another sequence. Rather, "replace," "replacement," or variations thereof encompass any situation in which the original sequence is no longer present following the "replacement," and another sequence is present following the "replacement." For example, an amino acid of the original sequence may remain after "replacement," but the original sequence is no longer present. "Replacements" can be achieved, e.g., by mutation of one or more amino acids of the original sequence (e.g., by changing a nucleotide sequence encoding the original amino acid sequence).

In some embodiments, a Kex2 cleavage site found in a wild-type α-factor prepro sequence has been replaced in the engineered α-factor prepro sequence with one or more protease cleavage sites of S1P, PCSK4, PCSK9, furin, or a combination thereof. In some embodiments, the one or more cleavage sites are the same. For example, in some embodiments, a Kex2 cleavage site found in a wild-type α-factor prepro sequence has been replaced in the engineered α-factor prepro sequence with a plurality of (e.g., two, three, four, or more) S1P cleavage sites. In some embodiments, a Kex2 cleavage site found in a wild-type α-factor prepro sequence has been replaced in the engineered α-factor prepro sequence with a plurality of (e.g., two, three, four, or more) PCSK4 cleavage sites. In some embodiments, a Kex2 cleavage site found in a wild-type α-factor prepro sequence has been replaced in the engineered α-factor prepro sequence with a plurality of (e.g., two, three, four, or more) PCSK9 cleavage sites. In some embodiments, a Kex2 cleavage site found in a wild-type α-factor prepro sequence has been replaced in the engineered α-factor prepro sequence with a plurality of (e.g., two, three, four, or more) furin cleavage sites. In some embodiments, the one or more cleavage sites are different. For example, in some embodiments, a Kex2 cleavage site found in a wild-type α-factor prepro sequence has been replaced in the engineered α-factor prepro sequence with a S1P cleavage site and a PCSK4 cleavage site. In some embodiments, a Kex2 cleavage site found in a wild-type α-factor prepro sequence has been replaced in the engineered α-factor prepro sequence with two (2) S1P cleavage sites and a PCSK4 cleavage site. In some embodiments, a Kex2 cleavage site found in a wild-type α-factor prepro sequence has been replaced in the engineered α-factor prepro sequence with two (2) Surf4 motifs joined with a glycine-serine linker, a deletion of the Ste13 cleavage site, and replacement of the Kex2 cleavage site with three (3) S1P cleavage sites. As set out in these exemplary embodiments, any combination of S1P, PCSK4, PCSK9, and furin cleavage sites may be used as disclosed herein, and the disclosure should not be understood as being limited to the specific embodiments provided above. Additional support for combinations can be found, e.g., in the Examples below.

A protease cleavage site of S1P can have a sequence according to SEQ ID NO: 55. In some embodiments, a protease cleavage site of PCSK4 has a sequence according to SEQ ID NO: 53. In some embodiments, a protease cleavage site of PCSK9 has a sequence according to SEQ ID NO: 54. In some embodiments, a protease cleavage site of furin has a sequence according to SEQ ID NO: 52.

In some embodiments, an engineered α-factor prepro sequence comprises a sequence that is capable of binding to one or more receptors that traffic proteins through one or more secretory pathways.

In some embodiments, a receptor that traffics proteins through one or more secretory pathways is LMAN1. Among proteins that have been reported to bind LMAN1 are Cathepsin C (CATHC) and coagulation factor VII (CFVII).

In some embodiments, a receptor that traffics proteins through one or more secretory pathways is Sortilin-1. Among proteins that have been reported to bind Sortilin-1 is brain-derived neurotrophic factor (BDNF) and a Sortilin-1 propeptide.

In some embodiments, an engineered α-factor prepro sequence comprises a plurality of (e.g., two, three, four, or more) LMAN1 binding domains. In some embodiments, a polypeptide comprising an LMAN1 binding domain is Cathepsin C or coagulation factor VII (CFVII).

In some embodiments, an engineered α-factor prepro sequence comprises a plurality of (e.g., two, three, four, or more) Cathepsin C (CATHC) peptide sequences or a fragments thereof. In some embodiments, a CATHC peptide comprises TPANCTYLD-LLGTWVFQVGSSGSQRDVNCSVMG (SEQ ID NO: 95). In some embodiments, a CATHC peptide is inserted into an engineered α-factor prepro sequence: (1) at the propeptide N-term following the 2× Surf4 motif with a flexible glycine-serine linker, (2) in the middle of the propeptide sequence, or (3) at the C-term immediately preceding the 3× S1P cleavage site.

In some embodiments, an engineered α-factor prepro sequence comprises a plurality of (e.g., two, three, four, or more) coagulation factor VII (CFVII) peptides containing glycosylation sites or fragments thereof. In some embodiments, a CFVII peptide comprises ILEKRNASKPQGR (SEQ ID NO: 96). In some embodiments, a CFVII peptide is inserted into an engineered α-factor prepro sequence: (1) at the propeptide N-term following the 2× Surf4 motif with a flexible glycine-serine linker, (2) in the middle of the propeptide sequence, or (3) at the C-term immediately preceding the 3× S1P cleavage site.

In some embodiments, an engineered α-factor prepro sequence comprises a plurality of (e.g., two, three, four, or more) Sortilin-1 binding domains. In some embodiments, a polypeptide comprising a Sortilin-1 binding domain is BDNF or Sortilin-1.

In some embodiments, an engineered α-factor prepro sequence comprises a plurality of (e.g., two, three, four, or more) Sortilin 1 peptides or fragments thereof. In some embodiments, a Sortilin 1 peptide comprises WSG-PIGVSWGLR (SEQ ID NO: 97). In some embodiments, a Sortilin 1 peptide is inserted into an engineered α-factor prepro sequence: (1) at the propeptide N-term following the 2× Surf4 motif with a flexible glycine-serine linker, (2) in the middle of the propeptide sequence, or (3) at the C-term immediately preceding the 3× S1P cleavage site.

In some embodiments, an engineered α-factor prepro sequence comprises a plurality of (e.g., two, three, four, or more) Brain-Derived Neurotrophic Factor (BDNF) peptides or fragments thereof. In some embodiments, a BDNF peptide comprises ESVNGPKAGSRGLTSLADT-FEHVIEELLDEDQKVRPNEENNKDAD-LYTSRVMLSSQVPL (SEQ ID NO: 98). In some embodiments, a BDNF peptide is inserted into an engineered α-factor prepro sequence: (1) at the propeptide N-term following the 2× Surf4 motif with a flexible glycine-serine linker, (2) in the middle of the propeptide sequence, or (3) at the C-term immediately preceding the 3× S1P cleavage site.

In some embodiments, an engineered α-factor prepro sequence comprises one or more tags, e.g., one or more Myc Tags. In some embodiments, an engineered α-factor prepro sequence comprising 3×Myc Tags is provided in SEQ ID NO: 106 or SEQ ID NO: 107.

In some embodiments, an engineered α-factor prepro sequence: comprises one or more tripeptide motifs having Surf4 binding affinity comprises one or more S1P cleavage sites (e.g., according to SEQ ID NO: 55); comprises one or more PCSK4 cleavage sites (e.g., according to SEQ ID NO: 53); comprises one or more PCSK9 cleavage sites (e.g., according to SEQ ID NO: 54); comprises one or more furin cleavage sites (e.g., according to SEQ ID NO: 52); does not comprise an Ste13 cleavage site (e.g., according to SEQ ID NO: 56); does not comprise a Kex2 cleavage site; or a combination thereof.

In some embodiments, an engineered α-factor prepro sequence has a sequence according to SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 71, SEQ ID NO: 92, SEQ ID NO: 93, SEQ ID NO: 94, SEQ ID NO: 106, SEQ ID NO: 107, SEQ ID NO: 108 or SEQ ID NO: 109.

In some embodiments, an engineered polypeptide has a sequence according to SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32, SEQ ID NO: 34, SEQ ID NO: 36, SEQ ID NO: 38, SEQ ID NO: 40, SEQ ID NO: 43, SEQ ID NO: 73, SEQ ID NO: 74, SEQ ID NO: 75. SEQ ID NO: 76, SEQ ID NO: 77, SEQ ID NO: 78, SEQ ID NO: 80, SEQ ID NO: 81, SEQ ID NO: 100, SEQ ID NO: 101, SEQ ID NO: 102, SEQ ID NO: 103, SEQ ID NO: 104 or SEQ ID NO: 105.

In some embodiments, a wild-type or engineered *Arabidopsis* root growth factor (GLV) sequence or a fragment thereof is present on the N-terminus of the engineered polypeptide. In some embodiments, a wild-type or engineered *Arabidopsis* root growth factor (GLV) sequence or a fragment thereof is present on the C-terminus of the engineered polypeptide.

In some embodiments, an engineered polypeptide comprises an engineered *Arabidopsis* root growth factor (GLV) sequence or a fragment thereof, an engineered α-factor prepro sequence or a fragment thereof, or both.

In some embodiments, an *Arabidopsis* root growth factor (GLV) sequence comprises SEQ ID NO: 99.

In some embodiments, an *Arabidopsis* root growth factor (GLV) sequence comprises SEQ ID NO: 82.

In some embodiments, an *Arabidopsis* root growth factor (GLV) sequence comprises SEQ ID NO: 83.

In some embodiments, an *Arabidopsis* root growth factor (GLV) sequence comprises SEQ ID NO: 84.

In some embodiments, an *Arabidopsis* root growth factor (GLV) sequence comprises SEQ ID NO: 85.

In some embodiments, an *Arabidopsis* root growth factor (GLV) sequence comprises SEQ ID NO: 86.

In some embodiments, an *Arabidopsis* root growth factor (GLV) sequence comprises SEQ ID NO: 87.

In some embodiments, an *Arabidopsis* root growth factor (GLV) sequence comprises SEQ ID NO: 88.

In some embodiments, an *Arabidopsis* root growth factor (GLV) sequence comprises SEQ ID NO: 89.

In some embodiments, an *Arabidopsis* root growth factor (GLV) sequence comprises SEQ ID NO: 90.

In some embodiments, an *Arabidopsis* root growth factor (GLV) sequence comprises SEQ ID NO: 91.

As discussed above, the present disclosure provides polypeptides that are secreted at increased levels. In some embodiments, an engineered polypeptide as provided herein is characterized in that when assessed in a cell, tissue or subject, the engineered polypeptide is secreted out of the cell, a cell of the tissue, or a cell or tissue of the subject at a greater level than a comparable polypeptide. In some embodiments, a comparable polypeptide comprises the same payload polypeptide as the engineered polypeptide and a signal peptide that is not a wild-type or engineered α-factor prepro sequence.

In some embodiments, a level of secretion is an amount of protein secreted (e.g., grams or moles of protein secreted or concentration of protein secreted). In some embodiments, a level of secretion is a rate of secretion (e.g., grams or moles of protein secreted per volume of media, e.g., cell culture media).

Polynucleotides

The present disclosure provides polynucleotides encoding an engineered polypeptide as described herein. As will be recognized by those in the art, multiple polynucleotides can encode the same polypeptide. Further, the sequence of a polynucleotide encoding a polypeptide can be determined by those in the art using routine methods.

In particular embodiments, a polynucleotide encoding an engineered polypeptide as described herein is a DNA polynucleotide.

In some embodiments, a polynucleotide encoding an engineered polypeptide as described herein is an RNA polynucleotide. In some embodiments, an RNA polynucleotide is an mRNA. In some embodiments, an mRNA comprises a cap and a poly-(A) tail.

In some embodiments, a polynucleotide comprises one or more chemically modified nucleotides. In some embodiments, a chemically modified nucleotide can be an N4-acetylcytidine. In some embodiments, a chemically modified nucleotide can be a 5-hydroxymethyluridine. The present disclosure recognizes that the inclusion of chemically modified nucleotides (e.g., N4-acetylcytidine and/or 5-hydroxymethyluridine) in polynucleotides described herein can allow the polynucleotide to evade an innate immune system, improve viability of cells into which said polynucleotide is introduced, and/or increase expression of a payload in cells into which said polynucleotide is introduced. The present disclosure recognizes that the inclusion of chemically modified nucleotides (e.g., N4-acetylcytidine and/or 5-hydroxymethyluridine) in polynucleotides described herein can reduce immunogenicity in a cell, tissue or subject against the polynucleotides.

Compositions

In addition to the embodiments discussed above, the present disclosure provides compositions. Compositions disclosed herein can comprise a cell. In some embodiments, a cell can comprise an engineered polypeptide and/or a polynucleotide as described herein. In some embodiments, a cell is a mammalian cell.

Compositions disclosed herein can comprise an engineered polypeptide and/or a polynucleotide as described herein.

Pharmaceutical Compositions

In some embodiments, a composition comprising an engineered polypeptide, a polynucleotide, and/or cell described herein is a pharmaceutical composition.

In some embodiments, a pharmaceutical composition is or comprises an immunogenic composition. In some embodiments, a pharmaceutical composition is or comprises a vaccine.

In some embodiments, a pharmaceutical composition is or comprises a gene therapy.

In some embodiments, a pharmaceutical composition is or comprises a chemotherapy.

In some embodiments, a pharmaceutical composition is or comprises a protein replacement therapy.

In some embodiments, a pharmaceutical composition is or comprises an immunotherapy.

In some embodiments, a pharmaceutical composition is or comprises a cell engineering therapy.

In some embodiments, a pharmaceutical composition can include a pharmaceutically acceptable carrier or excipient, which, as used herein, includes any and all solvents, dispersion media, diluents, or other liquid vehicles, dispersion or suspension aids, surface active agents, isotonic agents, thickening or emulsifying agents, preservatives, solid binders, lubricants and the like, as suited to the particular dosage form desired. Remington's The Science and Practice of Pharmacy, 21st Edition, A. R. Gennaro (Lippincott, Williams & Wilkins, Baltimore, MD, 2006; incorporated herein by reference) discloses various excipients used in formulating pharmaceutical compositions and known techniques for the preparation thereof. Suitable pharmaceutically acceptable carriers include but are not limited to water, salt solutions (e.g., NaCl), saline, buffered saline, glycerol, sugars such as mannitol, sucrose, or others, dextrose, fatty acid esters, etc., as well as combinations thereof.

A pharmaceutical composition can, if desired, be mixed with auxiliary agents (e.g., lubricants, preservatives, stabilizers, wetting agents, emulsifiers, salts for influencing osmotic pressure, buffers, coloring, flavoring and/or aromatic substances and the like), which do not deleteriously react with the active compounds or interfere with their activity. In certain embodiments, a water-soluble carrier suitable for intravenous administration is used. In some embodiments, a pharmaceutical composition can be sterile.

A suitable pharmaceutical composition, if desired, can also contain minor amounts of wetting or emulsifying agents, or pH buffering agents. A pharmaceutical composition can be a liquid solution, suspension, or emulsion.

A pharmaceutical composition can be formulated in accordance with the routine procedures as a pharmaceutical composition adapted for administration to human beings. The formulation of a pharmaceutical composition should suit the mode of administration. For example, in some embodiments, a composition for intravenous administration is typically a solution in sterile isotonic aqueous buffer. Where necessary, the composition may also include a solubilizing agent and a local anesthetic to ease pain at the site of the injection. Generally, the ingredients are supplied either separately or mixed together in unit dosage form, for example, as a dry lyophilized powder or water free concentrate in a hermetically sealed container such as an ampule or sachet indicating the quantity of active agent. Where a pharmaceutical composition is to be administered by infusion, it can be dispensed with an infusion bottle containing sterile pharmaceutical grade water, saline or dextrose/water. Where a pharmaceutical composition is administered by injection, an ampule of sterile water for injection or saline can be provided so that the ingredients may be mixed prior to administration.

Although the descriptions of pharmaceutical compositions provided herein are principally directed to pharmaceutical compositions that are suitable for ethical administration to humans, it will be understood by the skilled artisan that such compositions are generally suitable for administration to animals of all sorts or cells in vitro or ex vivo. Modification of pharmaceutical compositions suitable for administration to humans in order to render the compositions suitable for administration to various animals or cells in vitro or ex vivo is well understood, and the ordinarily skilled practitioner, e.g., a veterinary pharmacologist, can design and/or perform such modification with merely ordinary, if any, experimentation.

Formulations of the pharmaceutical compositions described herein may be prepared by any method known or hereafter developed in the art of pharmacology. In general, such preparatory methods include the step of bringing the active ingredient into association with a diluent or another excipient and/or one or more other accessory ingredients, and then, if necessary and/or desirable, shaping and/or packaging the product into a desired single- or multi-dose unit.

A pharmaceutical composition in accordance with the present disclosure may be prepared, packaged, and/or sold in bulk, as a single unit dose, and/or as a plurality of single unit doses. As used herein, a "unit dose" is discrete amount of a pharmaceutical composition described herein.

Methods of Using Compositions Disclosed Herein

The disclosure provides, among other things, methods for using an engineered polypeptide, a polynucleotide, and/or cell described herein.

In some embodiments, provided herein is a method of administering a an engineered polypeptide, a polynucleotide, and/or cell described herein to a cell, tissue or subject. In some embodiments, a cell is a mammalian cell. In some embodiments, a tissue is a mammalian tissue. In some embodiments, a subject is a mammal. In some embodiments, a subject is a human.

In some embodiments, provided herein is a vaccination method comprising administering an engineered polypeptide, a polynucleotide, and/or cell described herein to a cell, tissue or subject.

In some embodiments, disclosed herein is a gene therapy method comprising administering an engineered polypeptide, a polynucleotide, and/or cell described herein to a cell, tissue or subject. In some embodiments, a gene therapy method comprises delivery of one or more components of a gene therapy, e.g., a guide RNA and/or a Cas polypeptide.

In some embodiments, provided herein is a method for stimulating an immune response comprising administering an engineered polypeptide, a polynucleotide, and/or cell described herein to a cell, tissue or subject.

In some embodiments, also provided herein is a cell therapy engineering method comprising administering an engineered polypeptide, a polynucleotide, and/or cell described herein to a cell, tissue or subject.

In some embodiments, provided herein is an immunotherapy method comprising administering an engineered polypeptide, a polynucleotide, and/or cell described herein to a cell, tissue or subject. In some embodiments, an immunotherapy method comprises delivery of an antibody therapy and/or an immune checkpoint therapy.

In some embodiments, disclosed herein is a protein replacement therapy method comprising administering an engineered polypeptide, a polynucleotide, and/or cell described herein to a cell, tissue or subject. In some embodiments, a protein replacement therapy comprises delivery of an enzyme replacement therapy.

In some embodiments, provided herein is a chemotherapeutic method comprising administering an engineered polypeptide, a polynucleotide, and/or cell described herein to a cell, tissue or subject.

In some embodiments, a method provided herein comprises determining a level of engineered polypeptide secreted from the cell, a cell of the tissue, or a cell or tissue of the subject.

In some embodiments, further comprising comparing the level of engineered polypeptide secreted from the cell, a cell of the tissue, or a cell or tissue of the subject to a reference level. In some embodiments, a reference level is a level of reference polypeptide secreted a comparable cell, tissue or subject, wherein the reference polypeptide comprises the same payload polypeptide as the engineered polypeptide and a signal peptide that is not a wild-type or engineered α-factor prepro sequence.

In some embodiments, a method or use disclosed herein further comprises determining efficacy of an engineered polypeptide, a polynucleotide, and/or cell described herein in a cell, tissue or subject to which an engineered polypeptide, a polynucleotide, and/or cell described herein has been administered.

In some embodiments, determining efficacy comprises determining an antibody response or cellular response in a cell, tissue or subject. In some embodiments, a cell, tissue or subject to which an engineered polypeptide, a polynucleotide, and/or cell described herein has been administered exhibits an increased antibody response or cellular response as compared to a reference. In some embodiments, a reference is an antibody response or cellular response of a cell, tissue or subject that has been administered a comparable engineered polypeptide, polynucleotide, and/or cell described herein. In some embodiments, a comparable engineered polypeptide described herein comprises a signal polypeptide that is not a wild-type or engineered α-factor prepro sequence.

In some embodiments, a method or use disclosed herein comprises administering an engineered polypeptide, a polynucleotide, and/or cell described herein comprising the same to a cell, tissue or subject at least two times. In some embodiments, a method disclosed herein comprises administering an engineered polypeptide, a polynucleotide, and/or cell described herein to a cell, tissue or subject 2 times, 3 times, 4 times, 5 times, 6 times, 7 times, 8 times, 9 times or 10 times.

In some embodiments, a method or use disclosed herein comprises administering a plurality of doses of an engineered polypeptide, a polynucleotide, and/or cell described herein to a cell, tissue or subject. In some embodiments, a second or subsequent dose of an engineered polypeptide, a polynucleotide, and/or cell described herein has a substantially similar efficacy in a cell, tissue, or subject compared to administration of a first dose of an engineered polypeptide, a polynucleotide, and/or cell described herein.

In some embodiments of any of the methods or uses disclosed herein, the composition is administered via any one of the following routes of administration: intramuscular, intravenous, subcutaneous, intrathecal, intradermal, ocular, intranasal, sublingual, or oral.

In some embodiments of any of the methods or uses disclosed herein a cell is a mammalian cell.

In some embodiments of any of the methods or uses disclosed herein a tissue is a mammalian tissue.

In some embodiments of any of the methods or uses disclosed herein, a subject is a mammal. In some embodiments, a mammal is a human.

The present disclosure also provides methods of manufacturing an engineered polypeptide, comprising expressing a polynucleotide as described herein from a cell. In some embodiments, a cell is a mammalian cell.

Kits

Another aspect of the present disclosure further provides a pharmaceutical pack or kit. In some embodiments, a kit can comprise an engineered polypeptide, a polynucleotide, and/or cell described herein. In some embodiment, kits may be used in any applicable method, e.g., methods as described herein.

EXEMPLIFICATION

Example 1: Cloning Methods

This Example provides exemplary methods for generating constructs and encoded polypeptides for improving polypeptide secretion from mammalian, insect, and plant cells.

Example 1.1: Receptor-Binding Domain Constructs

DNA gblocks encoding a wild-type receptor-binding domain of SARS-CoV-2 (WT RBD) and two other variants of the SARS-CoV-2 receptor-binding domain (Variant_1 and Variant_2) were ordered and separately cloned into a NanoLuc protein fusion vector, pNLF1-C (Promega), using NEBuilder HiFi DNA Assembly Master Mix (New England Biolabs). The Master Mix included enzymes and buffers that facilitate quick and efficient Gibson assembly of two or more pieces of DNA. More specifically, the pNLF1-C vector was first linearized by double digesting it with restriction enzymes EcoRI-HF and Nhe1-HF. The digested vector was then purified using QIAquick Gel Extraction Kit (Qiagen) and concentrated using the Zymo DNA Clean and Concentrator-5 (Zymoresearch). In separate reactions, the gblock constructs corresponding to WT RBD, Variant_1 and Variant_2 were each inserted into the linearized vector by mixing, in a 1.5 ml tube, 50 ng of the purified vector, a two-fold molar excess of insert, 10 μl of the master mix, and an appropriate volume of ultrapure water to make a 20 μl reaction. The reaction was then incubated at 50° C. for 15 minutes. The resulting constructs are referred to herein as pNLF1C_RBD_WT, pNLF1C_RBD_Variant_1, and pNLF1C_RBD_Variant_2.

The ligation reaction was then diluted 1:4 and 2 μl of the diluted reaction was then used to transform One Shot TOP10 Chemically Competent *E. coli* cells (ThermoFisher Scientific) by heat shock at 42° C. for 30 seconds. Next, the cells were streaked on ampicillin agar plates and incubated for 24 hours at 37° C. The next day, colonies were screened for uptake of the chimeric vector using colony PCR. Colonies were first suspended in 100 μl of water, and 1 μl of that mixture was mixed with 1 μl of 10 μM forward and reverse primers, 10 μl of 2× Platinum SuperFi PCR Master Mix (ThermoFisher Scientific), and an appropriate volume of water to make a 20 μl reaction in a 1.5 ml tube. PCR was then conducted using a Mastercycler X50 (Eppendorf) with appropriate cycling parameters, based on primer properties and recommendations provided by the PCR enzyme vendor. The PCR product of positive colonies was sent out to Genewiz for sequencing to confirm the insertion of the constructs. Meanwhile, positive colonies were grown for 18 hours in a solution of LB and Ampicillin by shaking in an incubator at 37C. After 18 hours, chimeric plasmids from one positive colony per construct were extracted by miniprepping using the NucleoSpin Plasmid Mini Kit (Macherey-Nagel). Plasmids were sent out for sequencing again to ensure that the right constructs were inserted and that no mutations were introduced during replication in *E. coli.*

Example 1.2: Receptor-Binding Domain Constructs Including Prepro Sequence

An α-factor prepro sequence (e.g., α-factor signal peptide and propeptide sequence) was added to Variant_1 and Variant_2 in pNLF1-C using restriction-free cloning with a gBlock megaprimer (IDT) encoding the prepro sequence with 50 bp homology on either end to both pNLF1C_RBD_Variant_1 and pNLF1C_RBD_Variant_2. The homology arms were designed to insert the prepro sequence between the Kozak sequence and the RBD variant, replacing the Spike secretion peptide. 27.2 μL water, 10 μL 5× Phusion HF Buffer, 1 uL 10 mM dNTPs, 20 ng pNLF1C_RBD_Variant_1 or pNLF1C_RBD_Variant_2 in 1 uL water, 10 μL prepro megaprimer at 10 ng/μL, and 0.8 uL Phusion DNA Polymerase (New England BioLabs) were mixed together in PCR tubes on ice. Tubes were placed in a thermal cycler and the following PCR program was run: 95° C. for 30 seconds; 25 cycles of 95° C. for 30 seconds, 60° C. for 1 minute, and 72° C. for 5 minutes; and 72° C. for 7 minutes. 10 μL of these reactions were mixed with 34 μL water, 5 μL 10× CutSmart Buffer, and 1 μL DpnI (20 units/μL) (New England BioLabs) in PCR tubes on ice.

Tubes were placed in a thermal cycler and incubated at 37° C. for 1 hour to digest template DNA. Reactions were diluted 1:4 in water and transformed into TOP10 cells (Thermo Fisher Scientific) and plated on LB agar plates containing ampicillin (Teknova) as described above. The following day colony PCR was performed as described above using NLuc_Nterm_cPCR_F primer (SEQ ID NO: 59) and NLuc_Nterm_cPCR_R prime r(SEQ ID NO: 60) to identify colonies containing the prepro insert. PCR products were sequenced by Genewiz using the NLuc_seq primer (SEQ ID NO: 61). Colonies containing inserts were grown up in LB media containing ampicillin overnight and miniprepped as described above in Example 1.1.

A prepro sequence was added to the WT RBD sequence using PCR. 31.5 μL water, 10 μL 5× Phusion HF Buffer, 1 μL 10 mM dNTPs, 2.5 μL 10 μM NLuc_RBD_F primer (SEQ ID NO: 62), 2.5 μL 10 μM NLuc_RBD_R primer (SEQ ID NO: 63), 1 μL RBD_WT_NLuc gBlock at 5 ng/μL, 1 μL prepro megaprimer gBlock at 5 ng/μL, and 0.5 μL Phusion DNA Polymerase (New England BioLabs) were mixed together in a PCR tube on ice. The tube was transferred to a thermal cycler preheated to 98° C. and the following PCR program was run: 98° C. for 30 seconds; 30 cycles of 98° C. for 7 seconds followed by 72° C. for 15 seconds; and 72° C. for 7 minutes and 30 seconds. The PCR reaction was purified using DNA Clean and Concentrator-5 (Zymo Research). The purified PCR product was cloned into pNLF1-C using NEBuilder HiFi DNA Assembly Master Mix as described above.

Example 1.3: Optimized Prepro Sequences

To optimize the α-factor prepro sequence, a new vector was constructed consisting of Variant_1 in pNLF1-C with an upstream cloning site for a prepro sequence optimization library. pNLF1-C was digested using NheI and EcoRI as described in Example 1.1 above. A gBlock (IDT) containing a Kozak sequence, an NheI cut site, a 6 bp spacer, an EcoRI cut site, and Variant_1 was cloned into the digested vector using NEBuilder HiFi DNA Assembly Master Mix as described in Example 1.1 above. The homology arms of the gBlock were designed to remove the NheI and EcoRI restriction sites from the pNLF1-C plasmid, so the cut sites in the gBlock are unique in the new vector, referred to as pSP. The vector was digested using NheI and EcoRI as described in Example 1.1 above. Sequence variations of prepro were ordered from IDT as eBlocks, gBlocks, or primers based on length, and contained 20 bp homology arms to pSP to enable in-frame cloning with Variant_1. These sequences were cloned into digested pSP using NEBuilder HiFi DNA Assembly Master Mix as described in Example 1.1 above. eBlocks were kept at a 2-fold molar excess over pSP; primers were kept at 45 nM. Colony PCR was performed using NLuc_Nterm_cPCR_F (SEQ ID NO: 59) and NLuc_Nterm_cPCR_R primers (SEQ ID NO: 60).

Example 1.4: Additional Constructs

Influenza H1N1/PR8 hemagglutinin extracellular domain (HA) with native secretion peptide or prepro, human secreted embryonic alkaline phosphatase (SEAP) with native secretion peptide or prepro, trastuzumab scFv with SARS-CoV-2 Spike secretion peptide (Ssp) or prepro, pertuzumab scFv with Ssp or prepro, and GB235 scFv with Ssp or prepro, adalimumab scFv with a strong immunoglobulin secretion peptide or PPA, pembrolizumab scFv with a strong immunoglobulin secretion peptide or PPA, aflibercept with vascular endothelial growth factor receptor secretion peptide or PPA, dupilumab scFv with a strong immunoglobulin secretion peptide or PPA, ustekinumab scFv with a strong immunoglobulin secretion peptide or PPA, nivolumab scFv with a strong immunoglobulin secretion peptide or PPA, bevacizumab scFv with a strong immunoglobulin secretion peptide or PPA, and etanercept with tumor necrosis factor receptor secretion peptide or PPA, were cloned into pNLF1-C, as described in Example 1.1 above.

Example 1.5: Chimeric Antigen Receptor Constructs

DNA gBlocks encoding tisagenlecleucel extracellular and transmembrane domains with CD8a secretion peptide or prepro, axicabtagene ciloleucel extracellular and transmembrane domains with interleukin 2 secretion peptide or prepro, and lisocabtagene maraleucel with immunoglobulin kappa secretion peptide or prepro were cloned into pcDNA3.3-TOPO (ThermoFisher Scientific) digested with XbaI and AgeI as described in Example 1.1 above.

Example 1.6: Constructs for Expression in Insect and Plant Cells

Sequences encoding SARS-CoV-2 receptor-binding domain Variant_1 fused to NanoLuciferase and with adipokinetic hormone (AKH) signal peptide or α-factor signal peptide and propeptide were codon optimized for *Spodoptera frugiperda* and ordered as DNA gBlocks (IDT). These sequences were cloned into the pIEx-4 insect cell expression vector (Millipore Sigma) digested with NcoI and NotI restriction enzymes as described in Example 1.1 above.

Sequences encoding Variant_1 fused to NanoLuciferase and Arabidposis root growth factor GLV1, GLV2, GLV3, GLV4, GLV5, GLV6, GLV7, GLV8, GLV9, GLV10, or GLV11 signal peptide and propeptide; α-factor signal peptide and propeptide; *Arabidopsis* root growth factor signal peptide and α-factor propeptide; or α-factor signal peptide and *Arabidopsis* root growth factor propeptide were codon optimized for *Arabidopsis thaliana* and ordered as DNA gBlocks (IDT). These sequences were cloned into the pRI 101-AN plant cell expression vector (Takara) digested with NdeI and EcoRI restriction enzymes as described in Example 1.1 above.

Example 2: Secretion Screen

This Example provides exemplary methods for detecting secretion of polypeptides from mammalian cells.

HEK293T cells were cultured in Dulbecco's Modified Eagle Medium (DMEM) (Thermo Fisher Scientific) containing fetal bovine serum (FBS), penicillin, and streptomycin in a C170i CellXpert $CO_2$ Cell Culture Incubator (Eppendorf) at 37° C. and 5% $CO_2$. Once cells achieved ~90% confluence, the cells were harvested using trypsin, spun at 200 g for 5 minutes, resuspended at $2\times10^6$ cells/ml, and then diluted to $1\times10^5$ cells/ml. Next, 100 μl ($1\times10^4$ cells) of the diluted cell solution was added to the wells of white-walled round bottom 96 well plates. Cells were incubated for 24 hours. At 24 hours, cells were transfected with the appropriate dose of chimeric plasmid DNA using the Lipofectamine 3000 Transfection Reagent (ThermoFisher Scientific) and its accompanying protocol. After transfection, cells were incubated for 72 hours.

At approximately 72 hours, the supernatant of the cell solution in the 96-well plates was screened for luciferase activity using the Intracellular TE Nano-Glo Substrate/Inhibitor (Promega). First, cells were removed from the incubator and allowed to equilibrate at room temperature for 15 minutes. Then a 3× substrate solution was prepared in Opti-MEM Reduced Serum Medium (ThermoFisher Scientific) according to the Promega protocol. Next, the supernatant was transferred to 96-well PCR plates and spun at 200 g for 5 minutes. Next, a 10 μl aliquot of the spun down supernatant was transferred to white 96-well plates and diluted in 90 μl of phosphate buffered saline (PBS). Finally, 50 μl of the 3× substrate solution was added to the wells, and the plate was incubated at room temperature for 2-3 minutes. Within 10 minutes of adding the substrate solution, luminescence was measured using the GloMax Discover System (Promega) at an integration time of 0.1 seconds.

Example 3: ACE2 Binding Measurement

This Example provides exemplary methods for measuring SARS-CoV-2 Spike RBD polypeptide binding to ACE2. SARS-CoV-2 Spike polypeptides, e.g., those including an RBD, are known to bind ACE2 expressed on the surface of mammalian cells. Accordingly, ACE2 binding assays can be indicative of an amount of SARS-CoV-2 Spike polypeptide that is being secreted out of cells (e.g., mammalian cells).

ACE2 protein (Sino Biological 10108-H08H) was diluted in PBS to 1 μg/mL. 100 μL were added to wells of a clear flat-bottom Immuno MaxiSorp 96-well plate. The plate was covered and incubated at 4° C. overnight. The plate was washed with PBS with 0.05% Tween-20 (PBS-T), 3 washes of 300 μL/well each. 300 μL SuperBlock in PBS+0.05% Tween-20 (Thermo Fisher Scientific 37516) were added to each well, the plate was covered and incubated at room temperature for 1 hour, and the wells were washed again.

72 hours following HEK293T cell transfection, supernatant was collected as described in Example 2 above. 50 µL SuperBlock and 50 µL supernatant were added to wells of ACE2-coated plate. The plate was covered and incubated at room temperature for 2 hours, and then the wells were washed again. 100 µL PBS were added to each well. 3× complete NanoLuc substrate solution (Promega) were added to each well and luminescence was measured as described in Example 2 above.

Example 4: Recombinant Polypeptide Secretion from Mammalian Cells Increased with Prepro Sequence This Example demonstrates that the inclusion of a prepro sequence can increase recombinant polypeptide secretion from mammalian cells.

Figure 1:
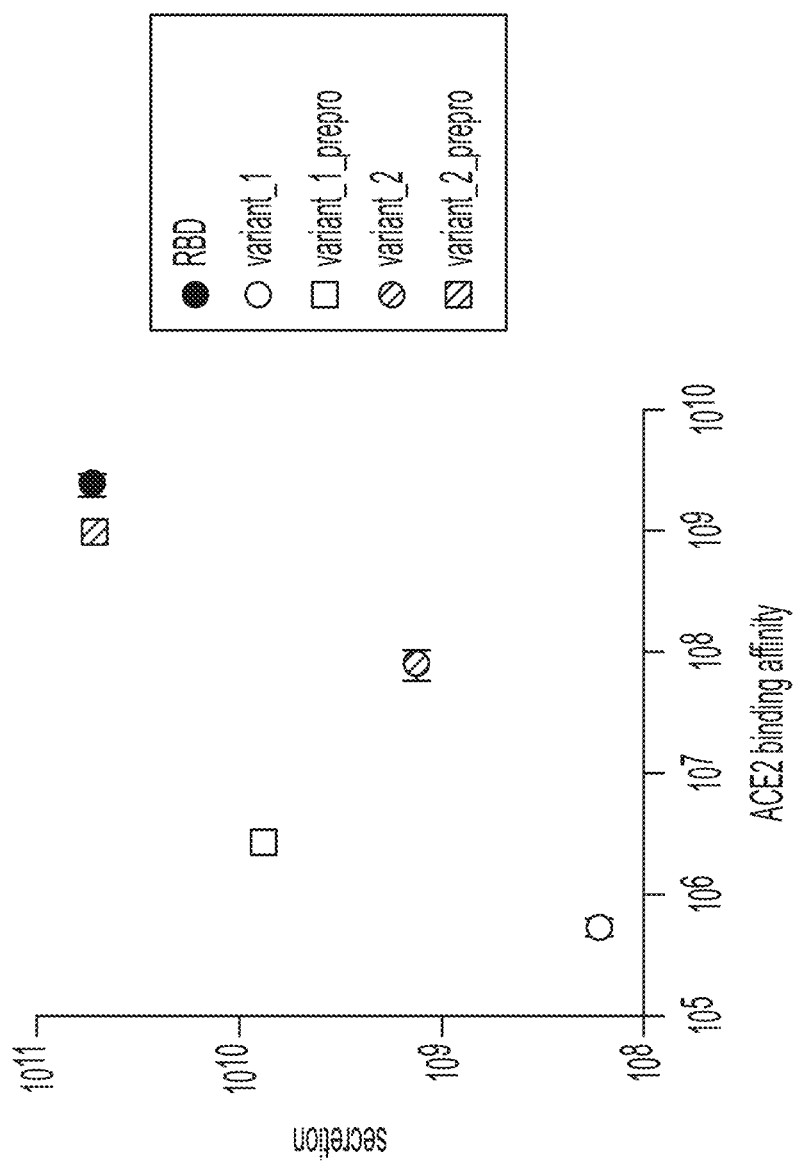
FIG. 1 is a graph showing measured secretion levels and ACE2 binding affinities of each of a SARS-CoV-2 receptor binding domain (RBD; black circle), RBD Variant 1 (white circle), RBD Variant 1 with a prepro sequence (white square), RBD Variant 2 (gray circle), and RBD Variant 2 with a prepro sequence (gray square).

Variant forms of the SARS-CoV-2 Spike RBD antigen have been developed as antigens to focus an immune response on neutralizing epitopes and variants of concern. However, the introduction of mutations in variants can lead to profound effects on expression, and these engineered antigens are often expressed at significantly decreased levels compared to wild type sequences following administration of, e.g., encoding RNA. Substitution of the native Spike secretion peptide with the α-factor signal peptide and propeptide sequences (prepro) in two RBD variants—Variant_1 and Variant_2—enhanced protein secretion by 10-70× across a range of doses in HEK293T human cells (FIG. 1). Secreted protein maintained its proper folding, as measured by a 5-20× increase in ACE2 binding (FIG. 1). Notably, for Variant_2, both secretion and ACE2 binding were rescued almost to wild type RBD levels.

Figure 2:
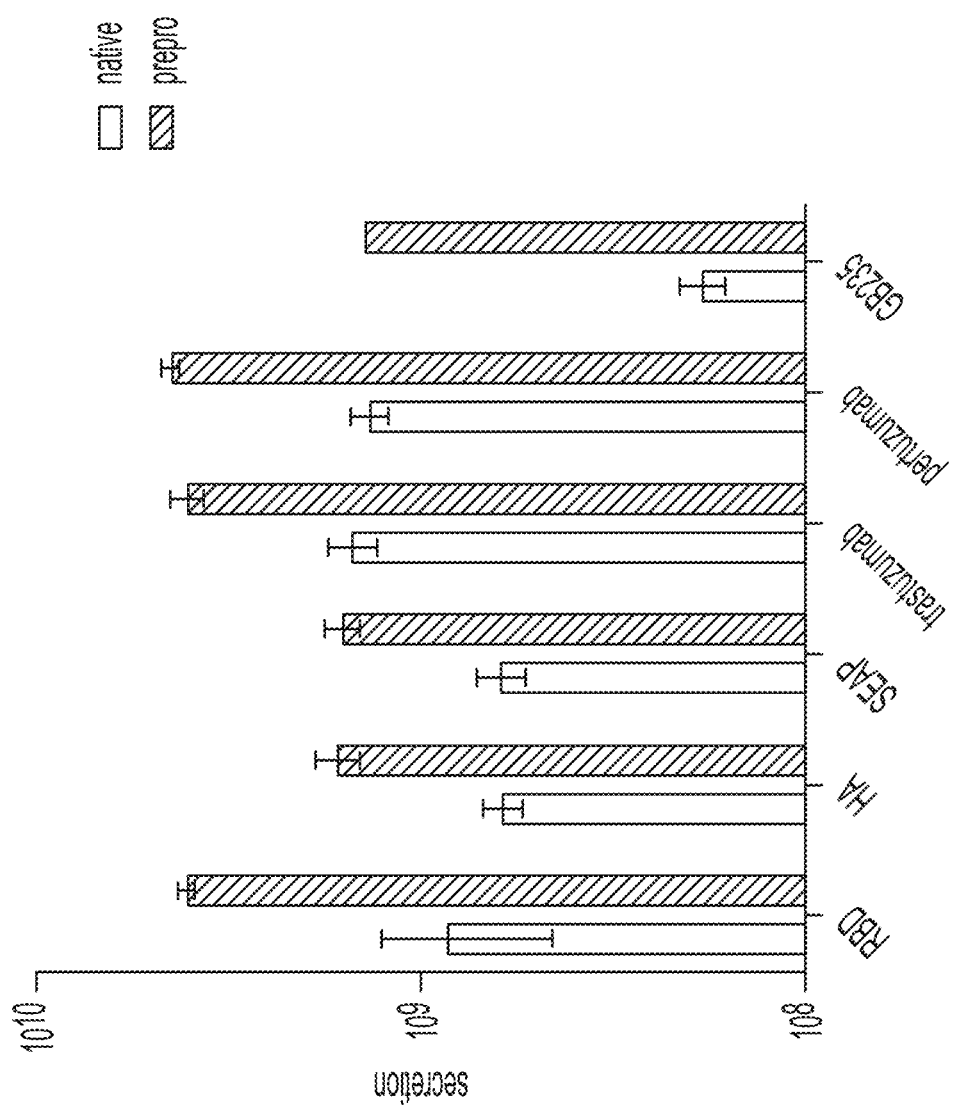
FIG. 2 is a bar graph showing secretion levels of certain polypeptides with a native signal peptide (white bars) and with a wild-type prepro secretion sequence (gray bars).

The performance of a prepro sequence in a small library of model secreted proteins was tested. The library consisted of wild type SARS-CoV-2 Spike RBD, influenza H1N1/PR8 hemagglutinin extracellular domain (HA), human secreted embryonic alkaline phosphatase (SEAP), and three single-chain antibody fragments designed from Her2-targeting monoclonal antibodies targeting distinct epitopes: trastuzumab (Herceptin), pertuzumab (Perjeta), and GB235 (Shu et al., which is incorporated herein by reference in its entirety). Substitution of native secretion peptide (a SARS-CoV-2 Spike secretion peptide was used for scFvs) with a prepro sequence enhanced secretion from HEK293T cells 2.5-7.5× across a range of doses (FIG. 2).

Figure 3:
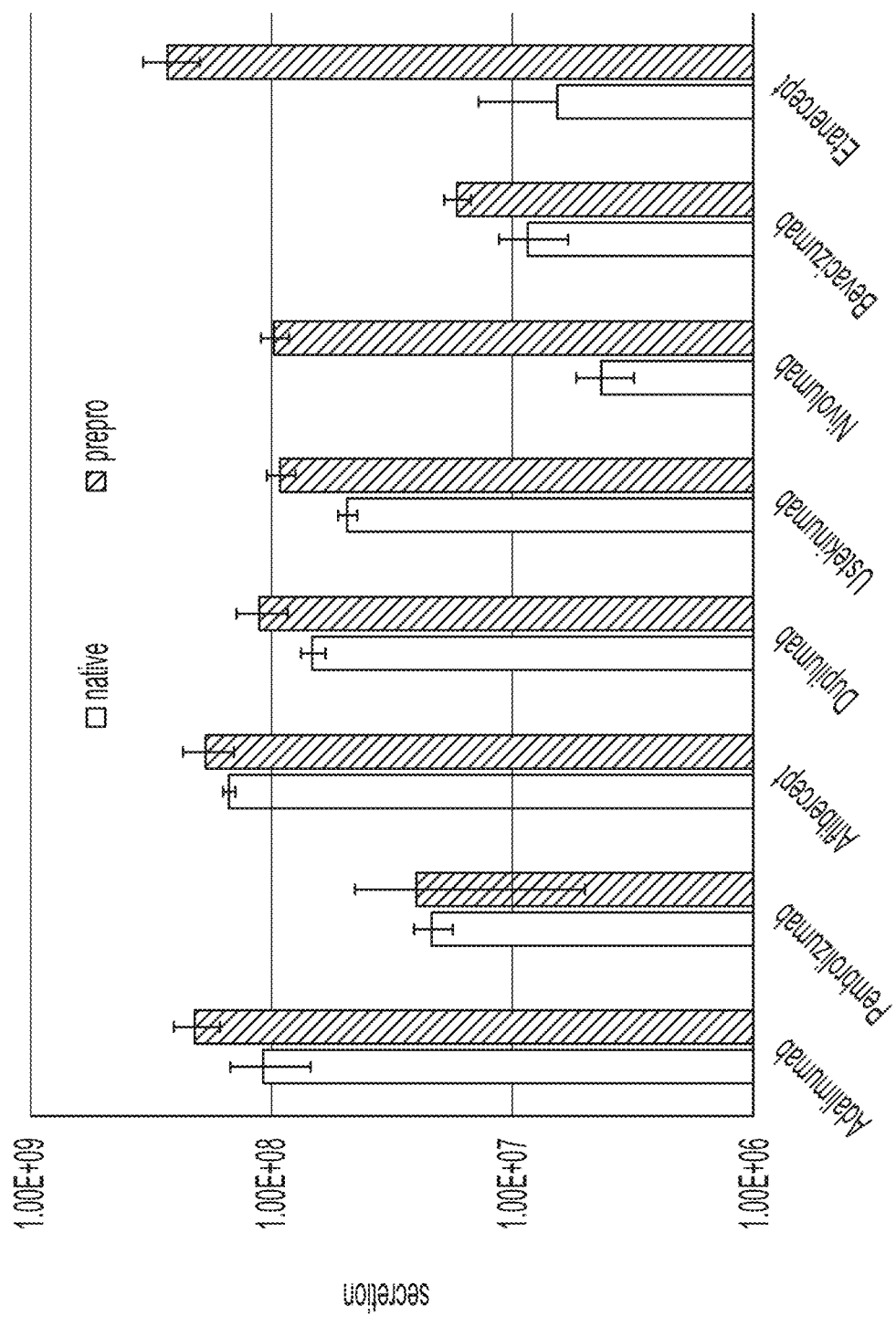
FIG. 3 is a bar graph showing secretion levels of certain polypeptides with a native signal peptide (white bars) and with a wild-type prepro secretion sequence (gray bars).

Next, the performance of the prepro sequence in eight of the top-selling biologic drugs from 2020 was investigated (Buntz et al., which is incorporated herein by reference in its entirety). These molecules consist of single-chain antibodies and chimeric fusion proteins composed of cellular receptors fused to immunoglobulin domains. For biologics for which the native secretion peptide is not publicly available, a strong secretion peptide from human antibody sequences that has been experimentally validated was selected instead (Haryadi et al., which is incorporated herein by reference in its entirety). For all eight biologics tested, the prepro sequence enhanced secretion over the native/strong human antibody secretion peptide (FIG. 3). The effect size ranged from 1.2-40×.

Example 5: Optimized Prepro Sequences Increase Secretion

Figure 4:
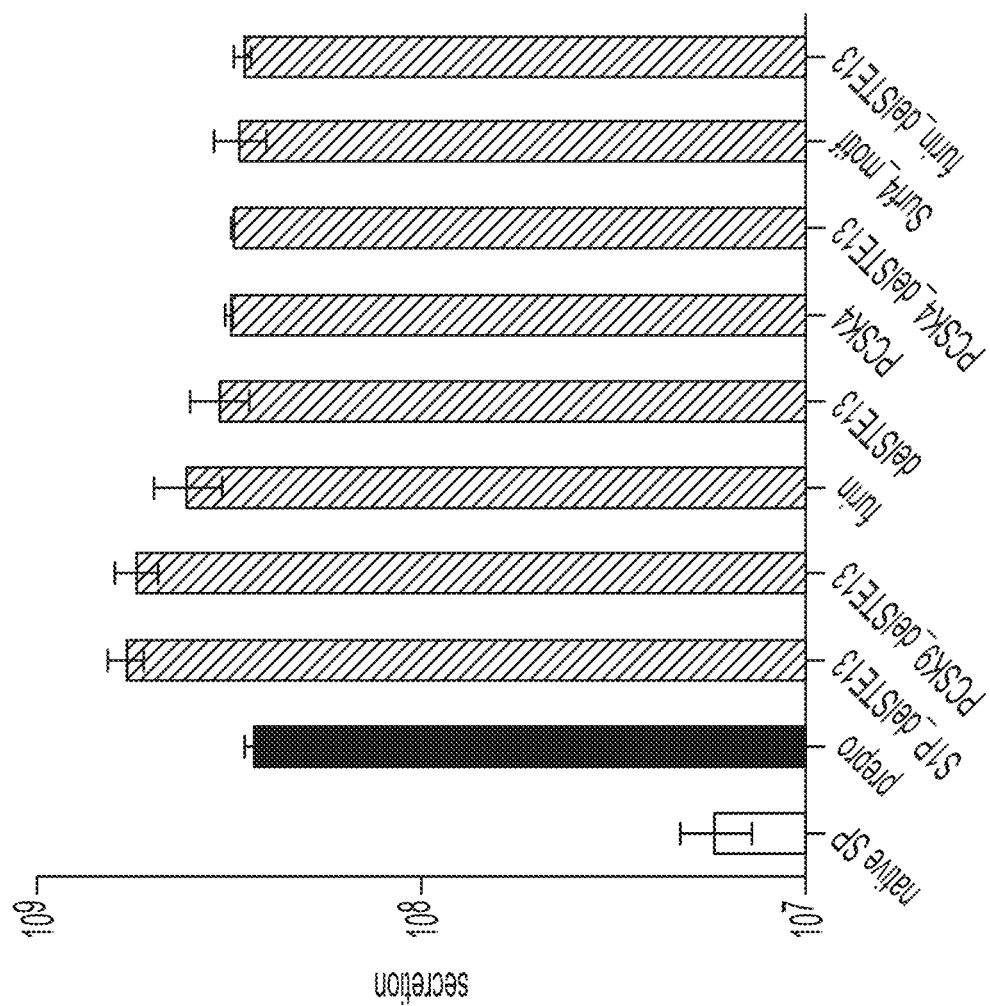
FIG. 4 is a bar graph showing measured secretion levels of an RBD Variant_1 polypeptide associated with certain signal peptides. "Native SP" refers to an RBD polypeptide associated with a wild-type RBD signal peptide. "Prepro" refers to an RBD polypeptide associated with a wild-type α-factor prepro sequence. "S1P_delSTE13" refers to an RBD polypeptide associated with an engineered α-factor prepro sequence, in which (i) the Kex2 cleavage site of a wild-type prepro sequence has been replaced with an SiP cleavage site, and (ii) the Ste13 cleavage site of the wild-type prepro sequence has been deleted. "PCSK9_delSTE13" refers to an RBD polypeptide associated with an engineered α-factor prepro sequence, in which (i) the Kex2 cleavage site of a wild-type prepro sequence has been replaced with a PCSK9 cleavage site, and (ii) the Ste13 cleavage site of the wild-type prepro sequence has been deleted. "Furin" refers to an RBD polypeptide associated with an engineered α-factor prepro sequence, in which the Kex2 cleavage site of a wild-type prepro sequence has been replaced with a furin cleavage site. "delSTE13" refers to an RBD polypeptide associated with an engineered α-factor prepro sequence, in which the Ste13 cleavage site of a wild-type prepro sequence has been deleted. "PCSK4" refers to an RBD polypeptide associated with an engineered α-factor prepro sequence, in which its Kex2 cleavage site has been replaced with a PCSK4 cleavage site. "PCSK4_delSTE13" refers to an RBD polypeptide associated with an engineered α-factor prepro sequence, in which (i) its Kex2 cleavage site has been replaced with a PCSK4 cleavage site and (ii) its Ste13 cleavage site has been deleted. "Surf4_motif" refers to an RBD polypeptide associated with an engineered α-factor prepro sequence, in which the amino-terminal residues of a wild-type prepro sequence have been mutated to a tripeptide motif with high Surf4 binding affinity (referred to herein as a "Surf4 motif"). "Furin_delSTE13" refers to an RBD polypeptide associated with an engineered α-factor prepro sequence, in which (i) its Kex2 cleavage site has been replaced with a furin cleavage site and (ii) its Ste13 cleavage site has been deleted.

Prepro sequences were optimized for activity in human cells based on a mechanism of secretion enhancement in yeast cells. Typically, the function of the propeptide region of α-factor is to enable export from the endoplasmic reticulum (ER) and transport to the Golgi, where it is cleaved by proteases to generate the mature α-factor peptide, which is then secreted. Specifically, the propeptide sequence binds to the ER membrane protein Erv29p, which is responsible for packaging proteins into COPII vesicles for secretion from the cell (Otte et al., which is incorporated herein by reference in its entirety). The human homologue of Erv29p is Surf4, which establishes different steady-state concentrations for soluble proteins within the ER through interaction with the amino-terminal tripeptides exposed after signal peptide cleavage (Yin et al., which is incorporated herein by reference in its entirety). The affinity of the tripeptide motif for Surf4 determines the cargo protein's steady-state concentration, and a subset of all possible tripeptides established a continuum of concentrations, with the highest affinity motifs driving the greatest amount of secretion for the lowest ER concentration (Yin et al., which is incorporated herein by reference in its entirety). Mutation of the amino-terminal residues of the α-factor propeptide sequence to a tripeptide motif with high Surf4 binding affinity increased the secretion of a SARS-CoV-2 Spike RBD variant antigen having an engineered prepro sequence (FIG. 4).

Additionally, once in the ER, a propeptide region is cleaved by proteases to generate a mature protein. Specifically, an α-factor propeptide is cleaved by yeast proteases Kex2 and Ste13 (Fitzgerald et al, which is incorporated herein by reference in its entirety). Mutation of the Kex2 cleavage site to the cleavage sites of human proteases S1P, PCSK9, furin, and PCSK4, and deletion of the Ste13 cleavage site, resulted in enhanced secretion of a variant RBD antigen over a wild type prepro sequence (FIG. 4).

Combining humanized protease sites with Ste13 deletions gave the greatest enhancement, which suggests that these secretion-enhancing mutations may be combined to further enhance secretion and fully optimize the sequence for function in human cells.

Figure 5:
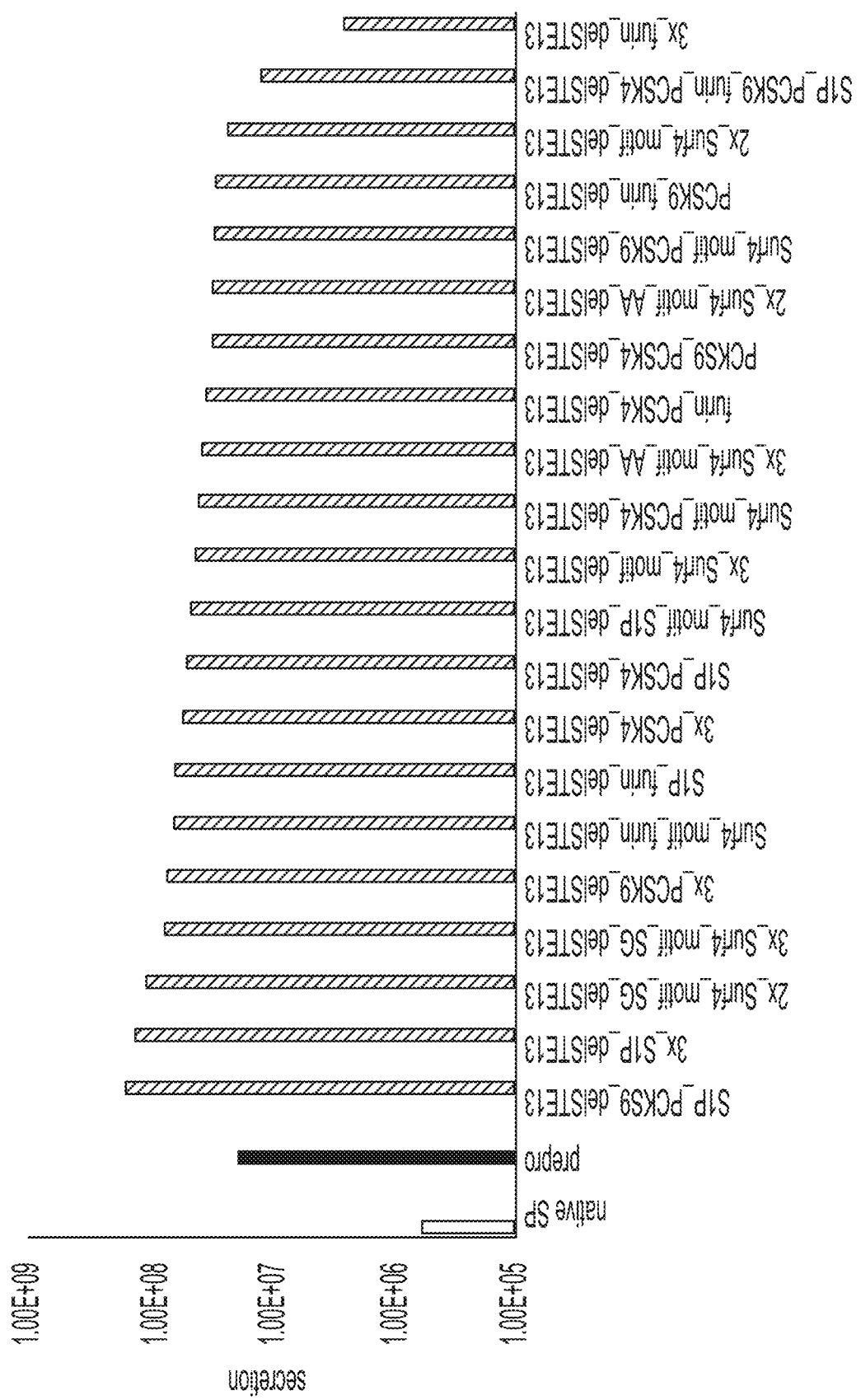
FIG. 5 is a bar graph showing measured secretion levels of showing measured secretion levels of an RBD Variant 1 polypeptide associated with certain signal peptides. "Native SP" refers to an RBD polypeptide associated with a wild-type RBD signal peptide. "Prepro" refers to an RBD polypeptide associated with a wild-type α-factor prepro sequence. "S1P_PCSK9_delSTE13" refers to an RBD Variant_1 polypeptide associated with an engineered α-factor prepro sequence, in which (i) the Kex2 cleavage site of a wild-type prepro sequence has been replaced with an S1P cleavage site and a PCSK9 cleavage site, and (ii) the Ste13 cleavage site of the wild-type prepro sequence has been deleted. "3x_S1P_delSTE13" refers to an RBD Variant 1 polypeptide associated with an engineered α-factor prepro sequence, in which (i) the Kex2 cleavage site of a wild-type prepro sequence has been replaced with three (3) S1P cleavage sites, and (ii) the Ste13 cleavage site of the wild-type prepro sequence has been deleted. "2x_Surf4_motif SG delSTE13" refers to an RBD Variant_1 polypeptide associated with an engineered α-factor prepro sequence, in which (i) the amino-terminal residues of a wild-type prepro sequence have been replaced with two (2) Surf4 motifs joined by an serine-glycine linker, and (ii) the Ste13 cleavage site of the wild-type prepro sequence has been deleted. "3x_Surf4_motif SG delSTE13" refers to an RBD Variant_1 polypeptide associated with an engineered α-factor prepro sequence, in which (i) the amino-terminal residues of a wild-type prepro sequence have been replaced with three (3) Surf4 motifs joined by an serine-glycine linker, and (ii) the Ste13 cleavage site of the wild-type prepro sequence has been deleted. "3x_PCSK9_delSTE13" refers to an RBD Variant_1 polypeptide associated with an engineered α-factor prepro sequence, in which (i) the Kex2 cleavage site of a wild-type prepro sequence has been replaced with three (3) PCSK9 cleavage sites, and (ii) the Ste13 cleavage site of the wild-type prepro sequence has been deleted. "Surf4_motif_furin_delSTE13" refers to an RBD Variant_1 polypeptide associated with an engineered α-factor prepro sequence, in which (i) the amino-terminal residues of a wild-type prepro sequence have been replaced with an Surf4 motif, (ii) the Kex2 cleavage site of a wild-type prepro sequence has been replaced with a furin cleavage site, and (iii) the Ste13 cleavage site of the wild-type prepro sequence has been deleted. "SP1_furin_delSTE13" refers to an RBD Variant_1 polypeptide associated with an engineered α-factor prepro sequence, in which (i) the Kex2 cleavage site of a wild-type prepro sequence has been replaced with a S1P cleavage site and a furin cleavage site, and (ii) the Ste13 cleavage site of the wild-type prepro sequence has been deleted. "3x_PCSK4_delSTE13" refers to an RBD Variant_1 polypeptide associated with an engineered α-factor prepro sequence, in which (i) the Kex2 cleavage site of a wild-type prepro sequence has been replaced with three (3) PCSK4 cleavage sites, and (ii) the Ste13 cleavage site of the wild-type prepro sequence has been deleted. "S1P_PCSK4_delSTE13" refers to an RBD Variant_1 polypeptide associated with an engineered α-factor prepro sequence, in which (i) the Kex2 cleavage site of a wild-type prepro sequence has been replaced with a S1P cleavage site and a PCSK4 cleavage site, and (ii) the Ste13 cleavage site of the wild-type prepro sequence has been deleted. "Surf4_motif_S1P_delSTE13" refers to an RBD Variant_1 polypeptide associated with an engineered α-factor prepro sequence, in which (i) the amino-terminal residues of a wild-type prepro sequence have been replaced with an Surf4 motif, (ii) the Kex2 cleavage site of a wild-type prepro sequence has been replaced with a S1P cleavage site, and (iii) the Ste13 cleavage site of the wild-type prepro sequence has been deleted. "3x_Surf4_motif_delSTE13" refers to an RBD Variant_1 polypeptide associated with an engineered α-factor prepro sequence, in which (i) the amino-terminal residues of a wild-type prepro sequence have been replaced with three (3) Surf4 motifs, and (ii) the Ste13 cleavage site of the wild-type prepro sequence has been deleted. "Surf4_motif_PCSK4_delSTE13" refers to an RBD Variant_1 polypeptide associated with an engineered α-factor prepro sequence, in which (i) the amino-terminal residues of a wild-type prepro sequence have been replaced with an Surf4 motif, (ii) the Kex2 cleavage site of a wild-type prepro sequence has been replaced with a PCSK4 cleavage site, and (iii) the Ste13 cleavage site of the wild-type prepro sequence has been deleted. "3x_Surf4_motif_AA_delSTE13" refers to an RBD Variant_1 polypeptide associated with an engineered α-factor prepro sequence, in which (i) the amino-terminal residues of a wild-type prepro sequence have been replaced with three (3) Surf4 motifs joined by an alanine-alanine linker, and (ii) the Ste13 cleavage site of the wild-type prepro sequence has been deleted. "furin_PCSK4_delSTE13" refers to an RBD Variant_1 polypeptide associated with an engineered α-factor prepro sequence, in which (i) the Kex2 cleavage site of a wild-type prepro sequence has been replaced with a furin cleavage site and a PCSK4 cleavage site, and (ii) the Ste13 cleavage site of the wild-type prepro sequence has been deleted. "PCSK9_PCSK4_delSTE13" refers to an RBD Variant_1 polypeptide associated with an engineered α-factor prepro sequence, in which (i) the Kex2 cleavage site of a wild-type prepro sequence has been replaced with a PCSK9 cleavage site and a PCSK4 cleavage site, and (ii) the Ste13 cleavage site of the wild-type prepro sequence has been deleted. "2x_Surf4_motif_AA_delSTE13" refers to an RBD Variant_1 polypeptide associated with an engineered α-factor prepro sequence, in which (i) the amino-terminal residues of a wild-type prepro sequence have been replaced with two (2) Surf4 motifs joined by an alanine-alanine linker, and (ii) the Ste13 cleavage site of the wild-type prepro sequence has been deleted. "Surf4_motif_PCSK9_delSTE13" refers to an RBD Variant_1 polypeptide associated with an engineered α-factor prepro sequence, in which (i) the amino-terminal residues of a wild-type prepro sequence have been replaced with an Surf4 motif, (ii) the Kex2 cleavage site of a wild-type prepro sequence has been replaced with a PCSK9 cleavage site, and (iii) the Ste13 cleavage site of the wild-type prepro sequence has been deleted. "PCSK9_furin_delSTE13" refers to an RBD Variant_1 polypeptide associated with an engineered α-factor prepro sequence, in which (i) the Kex2 cleavage site of a wild-type prepro sequence has been replaced with a PCSK9 cleavage site and a furin cleavage site, and (ii) the Ste13 cleavage site of the wild-type prepro sequence has been deleted. "2x_Surf4_motif_delSTE13" refers to an RBD Variant_1 polypeptide associated with an engineered α-factor prepro sequence, in which (i) the amino-terminal residues of a wild-type prepro sequence have been replaced with two (2) Surf4 motifs, and (ii) the Ste13 cleavage site of the wild-type prepro sequence has been deleted. "S1P_PCSK9_furin_PCSK4_delSTE13" refers to an RBD Variant_1 polypeptide associated with an engineered α-factor prepro sequence, in which (i) the Kex2 cleavage site of a wild-type prepro sequence has been replaced with a S1P cleavage site, a PCSK9 cleavage site, a furin cleavage site, and a PCSK4 cleavage site, and (ii) the Ste13 cleavage site of the wild-type prepro sequence has been deleted.

Hits that individually enhanced secretion in the initial screen were combined for a second round of sequence optimization. Specifically, sequences tested include (1) combinations of the tripeptide Surf4 binding motif with humanized protease cleavage sites, (2) combinations of different humanized protease cleavage sites, (3) repeats of the Surf4 binding motif with various spacer architectures, and (4) repeats of individual humanized protease cleavage sites. All of the sequences tested contained the Ste13 cleavage site deletion. Generally, combinations of individual secretion-enhancing mutations further enhanced secretion in an additive manner (FIG. 5).

Hits from the second screen were combined for a third round of sequence optimization. All of these sequences contained the Ste13 cleavage site deletion as well as a 2× Surf4 motif with a flexible glycine-serine linker. While all combinations tested enhanced secretion compared to the wild-type prepro sequence (FIG. 6), the greatest enhancement observed came from the combination of a 2× Surf4 motif with a flexible glycine-serine linker, the deletion of the Ste13 cleavage site, and the mutation of the Kex2 cleavage site to 3× S1P cleavage site. The human protease S1P (membrane-bound transcription factor site-1 protease) processes protein and peptide precursors trafficking through the secretory pathway in the ER and Golgi (Garten et al., which is incorporated herein by reference in its entirety). Together, these changes to the wild-type prepro sequence resulted in a 10× enhancement of secretion.

This engineered prepro sequence (hereafter referred to as prepro_2) was further optimized for activity in human cells by inserting additional peptide sequences that purportedly bind to receptors that traffic proteins through the secretory pathway. LMAN1/ERGIC53 is a resident protein of the endoplasmic reticulum (ER)—Golgi intermediate compartment that shuttles glycosylated proteins from the ER to the Golgi (Nichols et al.). Identified cargo that binds LMAN1 include the protease cathepsin C (CATHC) and coagulation factor proteins. Peptide sequences from CATHC and coagulation factor VII (CFVII) containing glycosylation sites enhanced protein secretion when inserted into the engineered prepro_2 sequence (FIG. 7). Peptide sequences were inserted into one of three locations in the prepro_2 sequence: (1) at the propeptide N-term following the 2× Surf4 motif with a flexible glycine-serine linker, (2) in the middle of the propeptide sequence, or (3) at the C-term immediately preceding the 3× S1P cleavage site.

An additional membrane-bound receptor that shuttles cargo through the secretory pathway is Sortilin 1 (SORT1), which resides in the Golgi and helps transport cargo proteins into secretory vesicles (Petersen et al.). SORT1 has been shown to bind and transport multiple protein cargos including brain-derived neurotrophic factor (BDNF) (Chen et al.). Additionally, SORT1 binds to its own propeptide until it is cleaved when it reaches its resident Golgi location. Peptide sequences from BDNF and SORT1 enhanced protein secretion when inserted into prepro_2 at the same 3 locations as mentioned above (FIG. 7).

These data suggest that independent sequences and domains may be combined in a single polypeptide sequence to target a protein to multiple independent secretory pathway receptors and secretion mechanisms. Combining the LMAN1-binding and the SORT1-binding domains together in the engineered sequence did not seem to enhance secretion any further. Without wishing to be bound by any particular theory, this data suggests that separate sequences each containing the LMAN1-binding and the SORT1-binding domains in a prepro_2 context may be co-delivered to a cell to populate the two different secretory receptors/pathways in parallel.

Example 6: Expression of Chimeric Antigen Receptors Measurement

This Example provides exemplary methods for detecting the display of anti-CD19 Chimeric Antigen Receptor (CAR) T-cell Therapy receptor polypeptides on the surface of mammalian cells.

Cell surface membrane-bound proteins follow a similar trafficking path to secreted proteins, but it was unclear whether a prepro sequence will function similarly and enhance the cell surface display of transmembrane proteins. The receptors of clinically approved CAR-T cell therapies may serve as a model system to measure the effects of a prepro sequence on the display of cell membrane proteins. Specifically, both the expression and folding of anti-CD19 CAR-T receptors on the surface of HEK293T cells can be measured using fluorescently-labeled CD19 ligand and quantified on a per-cell basis using flow cytometry.

Example 6.1: Expression of Chimeric Antigen Receptors in HEK293T cells

HEK293T cells are cultured, harvested, seeded and treated with plasmids encoding CAR proteins formulated in Lipofectamine 3000, as described in Example 2 above. At approximately 72 hours, cells are harvested using enzyme-free cell dissociation buffer (ThermoFisher Scientific) and are spun down in black v-bottom plates at 300 ×g for 10 minutes. Supernatant is discarded and cells are placed on ice. Cells are resuspended in eBioscience Flow Cytometry Staining Buffer (ThermoFisher Scientific) containing 20 µg/mL biotinylated CD19 (BPS Bioscience) and are incubated on ice for 30 minutes. Cells are spun down, supernatant is discarded, and cells are resuspended in eBioscience Flow Cytometry Staining Buffer containing 10 µg/mL phycoerythrin (PE)-conjugated streptavidin and are incubated on ice for 30 minutes. Cells are spun down, supernatant is discarded, and cells are resuspended in eBioscience Flow Cytometry Staining Buffer. Cells are diluted in eBioscience Flow Cytometry Staining Buffer to ~1e5 cells/mL and are strained through a 35 µm mesh (StemCell) immediately prior to flow cytometry analysis.

CD19 binding to the cell surface is quantified using flow cytometry. CD19 signal is measured using the BL2 channel (488 nm excitation laser, 574/26 nm filter emission) on an Attune CytPix Flow Cytometer (ThermoFisher Scientific).

Example 6.2: Expression of Chimeric Antigen Receptors in Primary Human T Cells Approximately 2e7 frozen human peripheral blood pan-T cells (STEMCELL) are thawed and transferred to a 50 ml tube, and complete T-cell media (50 ml of ImmunoCult-XF T-Cell Expansion Medium (STEMCELL) and 50 ul of 0.1 mg/ml of CHO-expressed recombinant human IL-2 (STEMCELL)) is added to the tube dropwise while swirling. The cells are pelleted by spinning the tube at 300 g for 10. The supernatant is aspirated off, and the cells are washed by resuspending in 20 ml of complete T-cell media. The cells are pelleted again, as described above, the supernatant can be removed, and cells are resuspended in 5 ml of complete T-cell media. The cell suspension is adjusted to 1e6 cells/ml. 7 ml of this cell suspension (7e6 cells) is transferred to a T25 flask. 20 ul/1e6 cells of ImmunoCult Human CD3/CD28/CD2 T-Cell Activator (STEMCELL) is added to the cells in the flasks. The cells are then incubated at 37C, 95% RH, and 5% $CO_2$ for 72 hours. The cell concentration in the flasks is maintained at 1e6 cells/ml by topping off the culture media with fresh complete T-cell media two days post-activation.

Lipid nanoparticles (LNPs) are formulated using the protocol accompanying the Genvoy-ILM T-Cell Kit, Spark (PRECISION NANOSYSTEMS). Briefly, 1 mg/ml mRNA encoding Tisagenlecleucel with CD8 signal peptide, prepro, or prepro_2; Genvoy lipid mix; and aqueous diluting formulation buffer are mixed at a 1:2:3 ratio using the setting three protocol of the Spark instrument (PRECISION NANOSYSTEMS). The LNPs are then characterized for payload concentration, diameter, and encapsulation efficiency using the modified Ribogreen assay described in the kit protocol referenced above.

Activated T-cells are retrieved from the incubator and transferred to a 15 ml tube. The cells are pelleted by spinning at 300 g for 10 minutes and suspended at 0.5e6 cells/ml in supernatant supplements with 1 µg/ml. Next, 125 ul of the 0.5e6 cells/ml suspension is transferred to a clear flat-bottom 96 well plate. LNPs are added to each well. The plate is then incubated for 48 hours at 37C, 95% RH, and 5% $CO_2$.

The quantify CAR expression, cells are retrieved from the incubator and pelleted by spinning at 300 g for 10 minutes. The supernatant is removed, and the cells are washed by resuspending in 200 ul of 1× PBS, pelleting, and removing the supernatant. The cells are stained with 100 ul of a 1:1000 dilution of LIVE/DEAD Fixable Violet Dead Cell Stain (ThermoFisher Scientific) for 30 minutes. The viability stain is removed by pelleting the cells and removing the supernatant. The cells are then stained with 100 ul of a 1:50 dilution of APC-labelled human CD19 (ACROBIOSYSTEMS) in eBioscience Flow Cytometry Staining (FACS) Buffer (ThermoFisher Scientific) for 1 hour. The staining reagent is removed by pelleting the cells and removing the supernatant. The cells are washed three times using ice-cold FACS Buffer and suspended in FACS Buffer. CAR expression is quantified by proxy via CD19 binding to the cell surface using flow cytometry. Cell viability is measured using the VL1 channel (405 nm excitation laser, 440/50 nm filter emission) and CD19 signal is measured using the RL1 channel (637 nm excitation laser, 670/14 nm filter emission) on an Attune CytPix Flow Cytometer (ThermoFisher Scientific).

To test the activity of surface-expressed anti-CD19 CARs on primary human T cells, the killing activity against CD19-positive Nalm6 cells stably expressing GFP and Firefly luciferase (Fluc) (Nalm6-FLuc/EGFP) (Imanis) is measured. Nalm6-FLuc/EGFP cells are cultured in RPMI 1640 media (STEMCELL) containing 10% FBS, 1% Penn-Strep, 10 mM HEPES, 1 mg/ml G418, and 1 µg/ml of puromycin. Cells are maintained by passaging every three days to keep the cell concentration at 1e6 cells/ml.

To test killing efficacy, 1e5 Nalm6-FLuc/EGFP cells are co-cultured in a flat-bottom, opaque, white 96 well plate with different amounts of CAR-T cells to achieve the following effector-target ratios: 0:1, 2:1, 1:1, 1:2, 1:4, 1:8, and 1:16. The plate is incubated at 37C, 95% RH, and 5% CO2 for 18 hours.

After 18 hours, the plate of cells is retrieved from the incubator and allowed to equilibrate to room temperature. After equilibrating, 100 ul of Bright-Glo luciferase substrate (Promega) is added to each plate well and incubated at room temperature for 2 minutes. Luminescence is measured using the GloMax Discover Microplate Reader (Promega). Specific cell lysis is then calculated using the luminescence data.

Different cell types have different secretory demands, and thus exhibit unique expression patterns of secretory pathway genes and proteins (Feizi et al.). Therefore, a sequence optimized for protein secretion in one cell type may not be the optimal sequence for protein secretion in a different cell type. Combining an engineered pro sequence (pro_2) with signal peptide sequences that are known to drive high protein secretion in primary T cells (e.g., IgK light chain, CD8, and IL2 signal peptide sequences) or in a mammalian cells generally (e.g., SARS-CoV-2 Spike signal peptide sequence) may enhance protein cell surface display on primary human T cells beyond the engineered prepro sequence alone and can be screened for expression, folding, and activity as described above.

CAR T-cell therapy receptor polypeptide sequences have been highly optimized for protein expression and folding in mammalian cells, and for target antigen binding; indeed, any polypeptide sequence that has been successfully developed for biomanufacturing or clinical use has been highly optimized for these purposes. In many cases, it may be ideal to utilize a polypeptide sequence that has not been highly optimized. For example, omitting directed evolution and/or affinity maturation steps in antibody single chain fragment development can save significant amounts of time in the biologic therapeutic development process. Additionally, treatment with CAR T-cell therapies is often accompanied by severe side effects such as cytokine storm or off-target toxicities that result from high receptor affinity for the target cancer cell antigen (Rafiq et al.); utilizing a lower-affinity receptor could mitigate these effects, but often at the cost of reduced protein expression. The prepro sequence may be fused to these less-optimal protein sequences to enhance their expression, thus rescuing the detrimental effects. For example, the anti-CD19 single chain fragment A3B1 (Castella et al.) exhibits lower expression and affinity than clinically approved CAR-T cell therapy single chain fragments, and may serve as a model system to measure the effects of a prepro sequence on the expression and cell surface display of less-optimal protein sequences. Specifically, the expression, folding, and activity of the anti-CD19 single chain fragment A3B1 on the surface of primary human T cells can be measured as described above.

Example 7: Expression in Additional Biomanufacturing Cell Lines

This Example provides exemplary methods for detecting secretion of polypeptides from additional mammalian, insect, and plant cells that are routinely used for biologic therapeutic production.

Example 7.1: Exemplary Protocols for Biomanufacturing in Mammalian and Insect Cell Lines CHO-K1 Chinese hamster ovary cells (ATCC) are grown in F12K medium (ATCC) supplemented with 10% FBS and penicillin and streptomycin in a C170i CellXpert C02 Cell Culture Incubator (Eppendorf) at 37° C. and 5% C02. Cells are harvested, seeded, and treated with mammalian pNLF1C-based plasmids formulated in Lipofectamine 3000, as described in Example 2 above.

Insect Sf9 cells (ThermoFisher Scientific) are grown in Grace's Insect Medium, supplemented (ThermoFisher Scientific) with added 10% FBS and penicillin and streptomycin in a non-humidified incubator at 27° C. Cells are harvested and seeded as described in Example 2 above. Cells are treated with pIEx-4 insect cell expression vector-based chimeric plasmids formulated in Lipofectamine 3000 as described in Example 2 above.

Example 7.2: Biomanufacturing and Expression in CHO-K1 and Sf9 Cell Lines

CHO-K1 Chinese hamster ovary cells (ATCC) were grown in F12K medium (ATCC) supplemented with 10% FBS and penicillin and streptomycin in a C170i CellXpert C02 Cell Culture Incubator (Eppendorf) at 37° C. and 5% C02. Cells were harvested, seeded, and treated with mammalian pNLF1C-based plasmids formulated in Lipofectamine 3000, as described in Example 2 above.

Insect Sf9 cells (ThermoFisher Scientific) were grown in Grace's Insect Medium, supplemented (ThermoFisher Scientific) with added 10% FBS and penicillin and streptomycin in a non-humidified incubator at 27° C. Once cells achieved ~90% confluence, the cells were harvested by pipetting, spun at 200 g for 5 min, and resuspended at $4 \times 10^5$ cells/ml in Sf-900 III Serum-Free Medium (ThermoFisher Scientific). Next, 2 ml ($8 \times 10^5$ cells) of the diluted cell solution was added to the wells of 6-well plates. Cells were allowed to attach for 15 min. Cells were then transfected with pIEx-4 insect cell expression vector-based chimeric plasmids using the CellFectin II Reagent (ThermoFisher Scientific) and its accompanying protocol. 72 hours after transfection, supernatants were collected and luminescence was measured, as described in Example 2 above.

As shown in FIGS. 8A-8B, substitution of the native Spike signal peptide (Ssp) with the α-factor signal peptide and propeptide sequences (prepro) enhanced protein secretion of RBD Variant_1 and Variant_2 by 1.1-15.6× across a range of doses from 1 to 100 ng in CHO-K1 Chinese hamster ovary cells (FIG. 8A). Substitution of the cell-type specific Adipokinetic Hormone signal peptide with α-factor prepro enhanced secretion of Variant_1 by 3.7-5.6× across a range of doses from 100 to 1,000 ng in Sf9 *Spodoptera frugiperda* cells (FIG. 8B).

Example 8: Expression in Plant Cell Lines

This Example provides exemplary methods for detecting secretion of polypeptides from plant cells that are routinely used for biologic therapeutic production.

Plant T87 cells (Ohio State University *Arabidopsis* Biological Resource Center) are grown in NT-1 medium in a non-humidified incubator at 24° C. with orbital shaking at 120 rpm. Cells are grown in suspension to ~90% confluence, then transfected with the appropriate dose of pRI 101-AN plant cell expression vector-based chimeric plasmid DNA using either electroporation or *Agrobacterium*-mediated transfection. Electroporation is performed using a Bio-Rad Gene Pulser II in a 4 mm-wide cuvette with the following program: 375 V/cm, 10 ms, 5 times, and a 50 ms interval for poring pulse, and 50 V/cm, 50 ms, 20 times, and a 50 ms interval for transfer pulse. Following electroporation, cells are seeded in 96-well plates. *Agrobacterium*-mediated transfection is performed using LBA4404 cells (Takara). LBA4404 cells are electroporated with 1 ng pRI 101-AN-based chimeric plasmid DNA using a Bio-Rad Gene Pulser II in a 1 mm-wide cuvette with the following program: 25 μF, 200 ohms, 2 kV, single pulse. Cells are recovered in SOC medium shaking at 100 rpm at 30° C. for 1 hour, then will be plated on agar plates with Kanamycin and incubated for 48 hours at 30° C. Next, colonies are selected and cultured in LB medium containing Kanamycin shaking at 30° C. For transfection of T87 plant cells, LBA4404 cells transformed with the appropriate plasmids are added to T87 cells seeded in 96-well plates. After transfection, cells are incubated for 72 hours. Supernatants are then collected and luminescence is measured, as described in Example 2 above.

Example 9: Prepro Enhances Immune Response to Vaccination

This example provides exemplary methods for measuring immune responses in vivo following vaccination with SARS-CoV-2 antigen polypeptides, including IgG and IgA induction and psuedotype virus neutralization. It also contains data demonstrating that prepro and prepro_2 enhance serum IgG and mucosal IgA responses and pseudotype virus neutralization from SARS-CoV-2 Spike RBD vaccination in mice. Finally, it contains proposed experiments to enhance IgA responses by abrogating propeptide cleavage, and data supporting this strategy in vitro.

Example 9.1:Methods for Vaccination

Constructs were synthesized as IDT gBlocks. DNA templates were amplified with T7-AGG_fwd and 120 pA_rev primers using Herculase II polymerase (Agilent) with an annealing temperature of 50° C. The resulting PCR products were cleaned up using the DNA Clean & Concentrator-25 kit (Zymo Research). 19.9 μL transcription mixes consisting of 1× HiScribe T7 High Yield buffer (NEB), 7.5 mM of each NTP (ac4-CTP, GTP, ATP, and UTP), 7.5 mM CleanCap AG (TriLink Biotech), 2M betaine (ThermoSci), 20 mM MgCl2, and 0.1 μL/μL HiScribe T7 Polymerase Mix were added to 2.1 uL DNA solution consisting of 200 ng T7 template in nuclease free H2O. Transcription was carried out for 1 hr at 50° C. The transcribed RNAs were purified using the 500 μg capacity Monarch RNA Cleanup Kit, treated for 5 min at 37° C. with 10 U DNAse I (New England Biolabs) and 100 U Calf Intestinal Alkaline Phosphatase (Promega) in DNase I buffer, and purified again using 500 μg-capacity Monarch columns. Concentrations were determined using a NanoDrop spectrophotometer.

Formulations of mRNA in lipid nanoparticles (mRNA-LNPs) were prepared using the NanoAssem1r Ignite microfluidic mixer (Precision Nanosystems). GenVoy-ILM lipid mixture (Precision Nanosystems) was diluted to 12.5 mM in anhydrous ethanol and combined with an aqueous solution of mRNA (0.14 mg/mL) in PNI buffer (Precision Nanosystems), using the manufacturer-recommended formulation parameters. Formulations were immediately diluted 30:1 in phosphate-buffered saline (pH 7.4) and concentrated using Amicon centrifugation filters (MilliporeSigma UFC901008). Formulations were stored at 4° C. and used for in vivo studies within 14 days.

All animal experiments were carried out in accordance with the guidelines set forth by Charles River Accelerator Development Lab (CRADL) and were approved by the CRADL Institutional Animal Care and Use committee. Female BALB/C mice (7-9 weeks old) were purchased from Charles River Laboratories and housed at CRADL. Mice were acclimated for at least 3 days before the initiation of a study. On day 1, mice were injected in the right quadriceps with 50 μL mRNA-LNP formulation (0.4 g mRNA). Mice were boosted on day 21 injected in the left quadriceps with 50 μL mRNA-LNP formulation for booster immunizations. Mice were euthanized at day 27, at which time blood was collected via intracardiac stick. Blood was allowed to clot at room temperature for 30 min, and serum was then separated from blood in MiniCollect serum separator tubes (Greiner Bio-One 450472) by centrifugation at 4° C., 1200 × g, for 10 minutes. Fresh serum was stored at 4° C. and used to evaluate immunogenicity by ELISA, the remainder was aliquoted and frozen at −80° C.

Washes of the vaginal mucosa were performed immediately following animal sacrifice and IC blood collection. A p20 pipet was used to introduce 20 μl sterile PBS into the vagina. The fluid was pipetted back and forth within the organ 8 times before transferring the sample volume into a 1.5 mL tube. This process was repeated a total of 3 times per animal, using a clean p20 tip each time, yielding a final pooled collection volume of 60 μl per animal. Vaginal wash samples were centrifuged at 300×g for 7 minutes and the supernatant was collected, stored overnight at 4C, and used for IgA ELISA assays the next day.

Example 9.2: Methods for Antibody Titer Measurements

The serum IgG ELISA protocol was adapted from one previously established by Amanat, et al. (Nat Med 26: 1033-1036, 2020). 96-well Immulon 4 HBX plates (Thermo Fisher Scientific) were coated with 50 μl per well of a 2 μg/ml solution of SARS-CoV-2 (2019-nCoV) Spike S1+S2 ECD-His recombinant protein (Sino Biological #40589-V08B1) in PBS and incubated at 4° C. overnight. Plates were then washed three times with 300 µl of 0.1% Tween 20 in PBS (PBS-T) using an automated plate washer (BioTek) and blocked with 200 µl per well of SuperBlock PBS blocking buffer (Thermo Fisher Scientific) for 1 hr at room temperature. Serial dilutions of serum samples were prepared in a 1:3 dilution of Superblock in PBS. 100 µl of each serial dilution was added to the plates and incubated for 2 hr at room temperature. The wells were then washed three times using PBS-T, as previously described. 50 µl of a 1:3,000 dilution of goat anti-mouse IgG horseradish peroxidase-conjugated secondary antibody (Sigma-Aldrich, AP127P) in a 1:3 dilution of Superblock in PBS was added to all wells and incubated at room temperature for 1 hr. Plates were again washed three times in PBS-T. 100 µl SIGMAFAST OPD (Sigma-Aldrich) solution was added to each well and incubated for 10 min at room temperature. Reactions were stopped by addition of 50 µl per well of 2N hydrochloric acid. Optical density was measured at 490 nm using a GloMax Discover (Promega) plate reader. End-point titers were determined by taking the last dilution before the signal dropped below 1 standard deviation above the average of the signal from the untreated control serum at the same dilution. The last dilution was taken as the titer if the signal never dropped below this threshold. If no signal above the threshold was detected, the value in the dilution series before the least-dilute sample tested was used.

For IgA ELISA, 96-well Immulon 4 HBX plates (Thermo Fisher Scientific) were coated with 50 µl per well of a 4 µg/ml solution of SARS-CoV-2 (2019-nCoV) Spike S1+S2 ECD-His recombinant protein (Sino Biological #40589-V08B1) in PBS and incubated at 4° C. overnight. Plates were then washed three times with 300 µl of 0.1% Tween 20 in PBS (PBS-T) using an automated plate washer (BioTek) and blocked with 200 µl per well of 3% non-fat milk in PBS-T for 1 hr at room temperature. Serial dilutions of vaginal wash samples were prepared in 1% non-fat milk in PBS-T. 75 µl of each serial dilution was added to the plates and incubated for 2 hr at room temperature. The wells were then washed three times using PBS-T, as previously described. 50 µl of a 1:1,000 dilution of goat anti-mouse IgA horseradish peroxidase-conjugated secondary antibody (ab-cam ab97235) in 1% milk PBS-T was added to all wells and incubated at room temperature for 1 hr. Plates were again washed three times in PBS-T. 100 µl SIGMAFAST OPD (Sigma-Aldrich) solution was added to each well and incubated for 10 min at room temperature. Reactions were stopped by addition of 50 µl per well of 2N hydrochloric acid. Optical density was measured at 490 nm using a GloMax Discover (Promega) plate reader. End-point titers were determined by taking the last dilution before the signal dropped below 1 standard deviation above the average of the signal from the untreated control serum at the same dilution. The last dilution was taken as the titer if the signal never dropped below this threshold. If no signal above the threshold was detected, the value in the dilution series before the least-dilute sample tested was used.

Example 9.3: Methods for SARS-CoV-2 Pseudotype Virus Neutralization Measurements Human ACE2-overexpressing HEK cells (Integral Molecular) used for viral transduction experiments were maintained in high glucose GlutaMAX-containing DMEM (ThermoFisher Scientific 10564) supplemented with 1 µg/mL puromycin, 10% heat-inactivated fetal bovine serum and 100 U/mL penicillin/streptomycin. Serum dilutions were mixed with spike-pseudotyped (either D61G Wuhan or Omicron) *Renilla* luciferase-encoding reporter viral particles built using a second-generation lentiviral system (Integral Molecular) in puromycin-free culture media to a total volume of 100 µl. Virus and serum were incubated in a 96-well cell culture plate at 37° C. for 1 h. 20,000 freshly harvested HEK cells were then added in 50 µL puromycin-free culture media, and transduction was allowed to proceed for 3 days. Cells were stored in −20° C. prior to analysis. Luciferase was measured using the *Renilla*-Glo Luciferase Assay System (Promega). N50 titers were determined by taking the last dilution before the signal dropped below 50% of the signal from the untreated control serum at the same dilution.

Example 9.4: Prepro Sequences Enhance Humoral IgG and IgA Responses to Vaccination BALB/c mice were vaccinated and boosted as described above with an ac4C-modified mRNA encoding the receptor-binding domain (RBD) of SARS-CoV-2 Wuhan strain, with either the native spike signal peptide, prepro, or prepro_2. Both prepro and prepro_2 showed a marked improvement over the strong spike signal peptide in both overall serum IgG titers, and vaginal mucosal IgA titers (FIG. 9). In line with improved secretion, prepro_2 exhibited ~4× higher IgA titers than when using prepro.

When RBD was fused to the immunostimulatory Sbi(III-IV) protein domain, a prepro leader produced ≥2.3-fold higher mucosal IgA titers than prepro_2 (FIG. 10). Since the pro cleavage efficiency of prepro is expected to be less efficient than that of the human-adapted prepro_2, this observation suggests that retention of the pro leader sequence in the secreted antigen may be immunostimulatory. Without wishing to be bound by any particular theory, a possible mechanism of action may involve SURF4-mediated uptake of soluble pre-RBD-Sbi(III-IV) by antigen-presenting cells, vascular epithelial cells, or other cell types capable of stimulating humoral immune responses. In some embodiments, prepro leaders that lack or have a weakened Ste13 and/or Kex2 cleavage site and prepro_2 leaders that lack or have a weakened S1P cleavage site can be immunostimulatory.

This observation suggests that, in some embodiments, vaccinating mammals with prepro(ΔSte13 ΔKex2) or prepro_2 (ΔS1P) fused to an antigen, with or without a further fusion with Sbi(III-IV) or other immunostimulatory adjuvant domains, can result in stronger mucosal IgA responses than when using mammalian signal peptides (e.g., strong mammalian signal peptides).

Example 9.5: Prepro_2 Cleavage

To investigate whether the prepro_2 sequence is cleaved from protein prior to secretion, both total protein secretion and uncleaved protein secretion were measured in HEK293T cells.

HEK293T cells were cultured and transfected as described in Example 2 above. Cells were transfected with chimeric plasmids encoding the SARS-CoV-2 Spike receptor binding domain Variant_1 fused to NanoLuciferase with prepro_2 containing a 3x MYC protein tag to allow for the detection of the propeptide sequence in secreted protein in the supernatant via MYC ELISA.

Total protein secretion was measured as described in Example 2 above. Uncleaved protein secretion was measured via MYC ELISA. Capture anti-MYC tag antibody (Abcam ab32) was diluted in PBS to 8 µg/mL. 100 µL were added to wells of a clear flat-bottom Immuno MaxiSorp 96-well plate. The plate was covered and incubated at 4° C. overnight. The plate was washed with PBS with 0.05% Tween-20 (PBS-T), 3 washes of 300 µL/well each. 300 µL SuperBlock in PBS+0.05% Tween-20 (Thermo Fisher Scientific 37516) were added to each well, the plate was covered and incubated at room temperature for 1 hour, and the wells were washed again. 72 hours following HEK293T cell transfection, supernatant was collected as described in Example 2 above. 50 µL SuperBlock and 50 µL supernatant were added to wells of the anti-MYC antibody-coated plate. The plate was covered and incubated at room temperature for 2 hours, and then the wells were washed again. Detection anti-MYC tag antibody conjugated to HRP (abcam 1326) was diluted in SuperBlock to 400 ng/mL and 100 µL were added per well. The plate was covered and incubated at room temperature for 1 hour, and then the wells were washed again. SIGMAFAST OPD chromogen (Millipore Sigma) was prepared according to the manufacturer's protocol and 100 µL were added to each well. After 10 minutes the reaction was quenched with 50 µL 2M HCl (Millipore Sigma). Absorbance at 490 nm was measured using the GloMax Discover System (Promega). The uncleaved protein secretion measurement (MYC ELISA signal) was normalized to the total protein secretion measurement (luminescence signal) to account for differences in protein secretion between constructs.

Uncleaved protein was detected in the supernatants of HEK293T cells transfected with chimeric plasmid containing prepro_2 with a 3× MYC tag (FIG. 11). The amount of uncleaved protein detected in the supernatant with prepro_2 is less than the amount detected with prepro_2 with the protease cleavage sites removed (FIG. 11), suggesting that the propeptide of prepro_2 is partially cleaved from secreted protein. Without wishing to be bound by any particular theory, this observation suggests that the prepro_2 propeptide is present in secreted polypeptides and may affect antibody responses to vaccination in vivo.

Example 9.6: Prepro Sequence Enhances SARS-CoV-2 Pseudovirus Neutralization and Antibody Titers from Vaccination with RBD Fused to Sbi(III-IV) Having a Prepro Sequence BALB/C mice were vaccinated as described above with ac4C-modified mRNA encoding the receptor-binding domain (RBD) of SARS-CoV-2 Wuhan or Omicron strains fused to the immunostimulatory Sbi(III-IV) protein domain, with either the native spike signal peptide or prepro, with the exception that mice were administered 10 g mRNA and euthanized at day 35.

Pseudotype virus neutralization assays demonstrated that prepro enhanced N50 titers for both viral strains (FIG. 12). Consistent with increased neutralization, prepro enhanced both mucosal IgA and serum IgG titers (FIG. 13).

This data shows that the presence of a prepro sequence on an antigen enhances vaccination efficacy and/or efficiency, and can also enhance immune responses generated from vaccinations.

EXEMPLARY EMBODIMENTS

Embodiment 1. An engineered polypeptide comprising:
(i) a payload polypeptide,
(ii) a wild-type or engineered α-factor prepro sequence or a fragment thereof,
wherein the wild-type or engineered α-factor prepro sequence or a fragment thereof is operably linked to the payload polypeptide.

Embodiment 2. The engineered polypeptide of embodiment 1, wherein the payload polypeptide is a therapeutic polypeptide.

Embodiment 3. The engineered polypeptide of embodiment 1 or 2, wherein the payload polypeptide comprises one or more antigens.

Embodiment 4. The engineered polypeptide of embodiment 3, wherein the one or more antigens are one or more viral antigens.

Embodiment 5. The engineered polypeptide of embodiment 4, wherein the one or more viral antigens are one or more SARS-CoV-2 antigens.

Embodiment 6. The engineered polypeptide of embodiment 5, wherein the one or more viral antigens comprises a SARS-CoV-2 receptor binding domain or fragment thereof.

Embodiment 7. The engineered polypeptide of embodiment 5 or 6, wherein the one or more viral antigens comprises a SARS-CoV-2 spike protein or fragment thereof.

Embodiment 8. The engineered polypeptide of embodiment 4, wherein the one or more viral antigens are one or more influenza antigens.

Embodiment 9. The engineered polypeptide of embodiment 8, wherein the one or more influenza antigens are one or more influenza A antigens.

Embodiment 10. The engineered polypeptide of embodiment 3, wherein the one or more antigens are one or more bacterial antigens.

Embodiment 11. The engineered polypeptide of embodiment 3, wherein the one or more antigens are one or more cancer antigens.

Embodiment 12. The engineered polypeptide of embodiment 3, wherein the one or more antigens are one or more archaeal antigens.

Embodiment 13. The engineered polypeptide of embodiment 1 or 2, wherein the payload polypeptide comprises an antibody or fragment thereof.

Embodiment 14. The engineered polypeptide of embodiment 1 or 2, wherein the payload polypeptide comprises a fusion protein including an extracellular receptor and an immunoglobulin constant region.

Embodiment 15. The engineered polypeptide of embodiment 1 or 2, wherein the payload polypeptide comprises a fusion protein including a receptor agonist and an immunoglobulin constant region.

Embodiment 16. The engineered polypeptide of embodiment 1 or 2, wherein the payload polypeptide comprises a fusion protein including a receptor antagonist and an immunoglobulin constant region.

Embodiment 17. The engineered polypeptide of any one of embodiments 1-16, wherein the wild-type or engineered α-factor prepro sequence or a fragment thereof is present on the N-terminus of the engineered polypeptide.

Embodiment 18. The engineered polypeptide of any one of embodiments 1-16, wherein the wild-type or engineered α-factor prepro sequence or a fragment thereof is present on the C-terminus of the engineered polypeptide.

Embodiment 19. The engineered polypeptide of any one of embodiments 1-18, wherein the engineered polypeptide comprises a wild-type α-factor prepro sequence or a fragment thereof.

Embodiment 20. The engineered polypeptide of embodiment 19, wherein the wild-type α-factor prepro sequence comprises a sequence according to SEQ ID NO: 2, SEQ ID NO: 68, or SEQ ID NO: 69.

Embodiment 21. The engineered polypeptide of any one of embodiments 1-18, wherein the engineered polypeptide comprises an engineered α-factor prepro sequence or a fragment thereof.

Embodiment 22. The engineered polypeptide of embodiment 21, wherein the engineered α-factor prepro sequence comprises a tripeptide motif having Surf4 binding affinity.

Embodiment 23. The engineered polypeptide of embodiment 22, wherein the tripeptide motif is MPL.

Embodiment 24. The engineered polypeptide of any one of the preceding embodiments, wherein the engineered α-factor prepro sequence does not include an Ste13 cleavage site.

Embodiment 25. The engineered polypeptide of embodiment 24, wherein the Ste13 cleavage site comprises EAEA (SEQ ID NO: 56).

Embodiment 26. The engineered polypeptide of any one of the preceding embodiments, wherein the engineered α-factor prepro sequence does not include a Kex2 cleavage site.

Embodiment 27. The engineered polypeptide of embodiment 26, wherein the Kex2 cleavage site comprises KR.

Embodiment 28. The engineered polypeptide of embodiment 26 or 27, wherein the Kex2 cleavage site found in a wild-type α-factor prepro sequence has been replaced in the engineered α-factor prepro sequence with a protease cleavage site of a human protease.

Embodiment 29. The engineered polypeptide of embodiment 28, wherein the Kex2 cleavage site found in a wild-type α-factor prepro sequence has been replaced in the engineered α-factor prepro sequence with a protease cleavage site of S1P, PCSK4, PCSK9, or furin.

Embodiment 30. The engineered polypeptide of embodiment 29, wherein the protease cleavage site of S1P has a sequence according to SEQ ID NO: 55.

Embodiment 31. The engineered polypeptide of embodiment 29, wherein the protease cleavage site of PCSK4 has a sequence according to SEQ ID NO: 53.

Embodiment 32. The engineered polypeptide of embodiment 29, wherein the protease cleavage site of PCSK9 has a sequence according to SEQ ID NO: 54.

Embodiment 33. The engineered polypeptide of embodiment 29, wherein the protease cleavage site of furin has a sequence according to SEQ ID NO: 52.

Embodiment 34. The engineered polypeptide of any one of the preceding embodiments, wherein the engineered α-factor prepro sequence comprises a CATHC peptide sequence or a fragment thereof.

Embodiment 35. The engineered polypeptide of embodiment 34, wherein the CATHC peptide has a sequence according to SEQ ID NO: 95.

Embodiment 36. The engineered polypeptide of any one of the preceding embodiments, wherein the engineered α-factor prepro sequence comprises a CFVII peptide sequence or a fragment thereof.

Embodiment 37. The engineered polypeptide of embodiment 36, wherein the CFVII peptide has a sequence according to SEQ ID NO: 96.

Embodiment 38. The engineered polypeptide of any one of the preceding embodiments, wherein the engineered α-factor prepro sequence comprises a Sortilin 1 peptide sequence or a fragment thereof.

Embodiment 39. The engineered polypeptide of embodiment 38, wherein the Sortilin-1 peptide has a sequence according to SEQ ID NO: 97.

Embodiment 40. The engineered polypeptide of any one of the preceding embodiments, wherein the engineered α-factor prepro sequence comprises a BDNF peptide sequence or a fragment thereof.

Embodiment 41. The engineered polypeptide of embodiment 40, wherein the BDNF peptide has a sequence according to SEQ ID NO: 98.

Embodiment 42. The engineered polypeptide of any one of embodiments 1-18 and 21, wherein the engineered α-factor prepro sequence has a sequence according to SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 71, SEQ ID NO: 92, SEQ ID NO: 93, SEQ ID NO: 94, SEQ ID NO: 106, SEQ ID NO: 107, SEQ ID NO: 108 or SEQ ID NO: 109.

Embodiment 43. The engineered polypeptide of any one of embodiments 1, 2, and 17-42, wherein the payload polypeptide comprises a sequence according to SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17, SEQ ID NO: 19, SEQ ID NO: 21, SEQ ID NO: 23, SEQ ID NO: 25, SEQ ID NO: 27, SEQ ID NO: 29, SEQ ID NO: 31, SEQ ID NO: 33, SEQ ID NO: 35, SEQ ID NO: 37, SEQ ID NO: 39, SEQ ID NO: 72, or SEQ ID NO: 79.

Embodiment 44. The engineered polypeptide of embodiment 1, wherein the engineered polypeptide has a sequence according to SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32, SEQ ID NO: 34, SEQ ID NO: 36, SEQ ID NO: 38, SEQ ID NO: 40, SEQ ID NO: 43, SEQ ID NO: 73, SEQ ID NO: 74, SEQ ID NO: 75. SEQ ID NO: 76, SEQ ID NO: 77, SEQ ID NO: 78, SEQ ID NO: 80, SEQ ID NO: 81, SEQ ID NO: 100, SEQ ID NO: 101, SEQ ID NO: 102, SEQ ID NO: 103, SEQ ID NO: 104 or SEQ ID NO: 105.

Embodiment 45. The engineered polypeptide of any one of the preceding embodiments, characterized in that when assessed in a cell, tissue or subject, the engineered polypeptide is secreted out of the cell, a cell of the tissue, or a cell or tissue of the subject at a greater level than a comparable polypeptide.

Embodiment 46. The engineered polypeptide of embodiment 45, wherein the comparable polypeptide comprises the same payload polypeptide as the engineered polypeptide and a signal peptide that is not a wild-type or engineered α-factor prepro sequence.

Embodiment 47. A polynucleotide encoding the engineered polypeptide of any one of embodiments 1-46.

Embodiment 48. The polynucleotide of embodiment 47, wherein the polynucleotide is DNA.

Embodiment 49. The polynucleotide of embodiment 40, wherein the polynucleotide is RNA.

Embodiment 50. The polynucleotide of embodiment 49, wherein the RNA is an mRNA.

Embodiment 51. The polynucleotide of embodiment 50, wherein the mRNA comprises a cap and a poly-(A) tail.

Embodiment 52. The polynucleotide of any one of embodiments 49-51, wherein the polynucleotide comprises one or more N4-acetylcytidine residues.

Embodiment 53. The polynucleotide of any one of embodiments 49-52, wherein the polynucleotide comprises one or more 5-hydroxymethyluridine residues.

Embodiment 54. A cell comprising the engineered polypeptide of any one of embodiments 1-46 or the polynucleotide of any one of embodiments 47-53.

Embodiment 55. The cell of embodiment 54, wherein the cell is a mammalian cell.

Embodiment 56. A composition comprising the engineered polypeptide of any one of embodiments 1-36, the polynucleotide of any one of embodiments 47-53, or the cell of embodiment 54 or 55.

Embodiment 57. The composition of embodiment 56, wherein the composition is a pharmaceutical composition.

Embodiment 58. The composition of embodiment 57, wherein the pharmaceutical composition comprises a pharmaceutically acceptable carrier, diluent, or excipient.

Embodiment 59. The composition of embodiment 57 or 58, wherein the pharmaceutical composition is or comprises an immunogenic composition.

Embodiment 60. The composition of any one of embodiments 57-59, wherein the pharmaceutical composition is or comprises a vaccine.

Embodiment 61. The composition of embodiment 57 or 58, wherein the pharmaceutical composition is or comprises a gene therapy.

Embodiment 62. The composition of embodiment 57 or 58, wherein the pharmaceutical composition is or comprises a chemotherapy.

Embodiment 63. The composition of embodiment 57 or 58, wherein the pharmaceutical composition is or comprises a protein replacement therapy.

Embodiment 64. The composition of embodiment 57 or 58, wherein the pharmaceutical composition is or comprises an immunotherapy.

Embodiment 65. The composition of embodiment 57 or 58, wherein the pharmaceutical composition is or comprises a cell engineering therapy.

Embodiment 66. A method comprising administering the engineered polypeptide of any one of embodiments 1-36, the polynucleotide of any one of embodiments 47-53, the cell of embodiment 54 or 55 or the composition of any one of embodiments 56-65 to a cell, tissue or subject.

Embodiment 67. The method of embodiment 66, wherein the cell is a mammalian cell, the tissue is a mammalian tissue, or the subject is a mammal.

Embodiment 68. The method of embodiment 66 or 67, wherein the subject is a human.

Embodiment 69. A method comprising administering the polynucleotide of any one of embodiments 47-53 to a cell, tissue or subject.

Embodiment 70. The method of embodiment 69, wherein the cell is a mammalian cell, the tissue is a mammalian tissue, or the subject is a mammal.

Embodiment 71. The method of embodiment 69 or 70, wherein the subject is a human.

Embodiment 72. The method of any one of embodiments 69-71, comprising determining a level of engineered polypeptide secreted from the cell, a cell of the tissue, or a cell or tissue of the subject.

Embodiment 73. The method of embodiment 72, further comprising comparing the level of engineered polypeptide secreted from the cell, a cell of the tissue, or a cell or tissue of the subject to a reference level.

Embodiment 74. The method of embodiment 73, wherein the reference level is a level of reference polypeptide secreted a comparable cell, tissue or subject, wherein the reference polypeptide comprises the same payload polypeptide as the engineered polypeptide and a signal peptide that is not a wild-type or engineered α-factor prepro sequence.

Embodiment 75. The method of any one of embodiments 66-74, wherein the method is a method to stimulate an immune response.

Embodiment 76. The method of any one of embodiments 66-74, wherein the method is a vaccination method.

Embodiment 77. The method of any one of embodiments 66-74, wherein the method is a gene therapy method.

Embodiment 78. The method of any one of embodiments 66-74, wherein the method is a cell therapy engineering method.

Embodiment 79. The method of any one of embodiments 66-74, wherein the method is an immunotherapy method.

Embodiment 80. The method of embodiment 79, wherein the immunotherapy method comprises delivery of an antibody therapy and/or an immune checkpoint therapy.

Embodiment 81. The method of any one of embodiments 66-74, wherein the method is a protein replacement therapy method.

Embodiment 82. The method of embodiment 81, wherein the protein replacement therapy method comprises delivery of an enzyme replacement therapy.

Embodiment 83. The method of any one of embodiments 66-74, wherein the method is a chemotherapeutic method.

Embodiment 84. A method of manufacturing an engineered polypeptide, comprising expressing the polynucleotide of any one of embodiments 47-53 from a cell.

Embodiment 85. The method of embodiment 84, wherein the cell is a mammalian cell.

Embodiment 86. Use of the engineered polypeptide of any one of embodiments 1-36, the polynucleotide of any one of embodiments 47-53, the cell of embodiment 54 or 55 or the composition of any one of embodiments 56-65 to stimulate an immune response.

Embodiment 87. Use of the engineered polypeptide of any one of embodiments 1-36, the polynucleotide of any one of embodiments 47-53, the cell of embodiment 54 or 55 or the composition of any one of embodiments 56-65 as a vaccine.

Embodiment 88. Use of the engineered polypeptide of any one of embodiments 1-36, the polynucleotide of any one of embodiments 47-53, the cell of embodiment 54 or 55 or the composition of any one of embodiments 56-65 as an immunotherapy.

Embodiment 89. Use of the polynucleotide of any one of embodiments 1-36, the polynucleotide of any one of embodiments 47-53, the cell of embodiment 54 or 55 or the composition of any one of embodiments 56-65 as a gene therapy.

Embodiment 90. Use of the engineered polypeptide of any one of embodiments 1-36, the polynucleotide of any one of embodiments 47-53, the cell of embodiment 54 or 55 or the composition of any one of embodiments 56-65 as a protein replacement therapy.

Embodiment 91. Use of the engineered polypeptide of any one of embodiments 1-36, the polynucleotide of any one of embodiments 47-53, the cell of embodiment 54 or 55 or the composition of any one of embodiments 56-65 as a cell engineering therapy.

Embodiment 92. Use of the engineered polypeptide of any one of embodiments 1-36, the polynucleotide of any one of embodiments 47-53, the cell of embodiment 54 or 55 or the composition of any one of embodiments 56-65 as a chemotherapy.

Embodiment 93. The use of any one of embodiments 86-92, wherein the polypeptide, polynucleotide, cell, or composition is administered to a cell, tissue or subject.

Embodiment 94. The use of embodiment 93, wherein the cell is a mammalian cell, the tissue is a mammalian tissue, or the subject is a mammal.

Embodiment 95. The use of embodiment 94, wherein the mammal is a human.

Embodiment 96. A method of making a polynucleotide comprising adding a nucleotide sequence encoding a wild-type or engineered α-factor prepro sequence to a nucleotide sequence encoding a payload polypeptide.

Embodiment 97. The engineered polypeptide of any one of embodiments 1-41, wherein the engineered polypeptide further comprises an *Arabidopsis* Root Growth Factor (GLV) secretion peptide sequence or a fragment thereof.

Embodiment 98. The engineered polypeptide of embodiment 97, wherein an *Arabidopsis* Root Growth Factor (GLV) sequence comprises SEQ ID NO: 82, SEQ ID NO: 83, SEQ ID NO: 84, SEQ ID NO: 85, SEQ ID NO: 86, SEQ ID NO: 87, SEQ ID NO: 88, SEQ ID NO:89, SEQ ID NO: 90, SEQ ID NO: 91, or SEQ ID NO: 99.

Embodiment 99. An engineered polypeptide comprising:

(i) a payload polypeptide, (ii) a wild-type or engineered *Arabidopsis* Root Growth Factor (GLV) secretion peptide sequence or a fragment thereof, wherein the wild-type or engineered *Arabidopsis* Root Growth Factor (GLV) secretion peptide sequence or a fragment thereof is operably linked to the payload polypeptide.

Embodiment 100. The engineered polypeptide of embodiment 99, wherein the engineered polypeptide further comprises an α-factor prepro sequence or a fragment thereof.

Embodiment 101. The engineered polypeptide of any one of embodiments 34-41, wherein the CATHC peptide, the CFVII peptide, the Sortilin-1 peptide, or the BDNF peptide are inserted into an engineered α-factor prepro sequence at the propeptide N-term following the 2× Surf4 motif with a flexible glycine-serine linker.

Embodiment 102. The engineered polypeptide of any one of embodiments 34-41, wherein the CATHC peptide, the CFVII peptide, the Sortilin-1 peptide, or the BDNF peptide are inserted into an engineered α-factor prepro sequence in the middle of the propeptide sequence.

Embodiment 103. The engineered polypeptide of any one of embodiments 34-41, wherein the CATHC peptide, the CFVII peptide, the Sortilin-1 peptide, or the BDNF peptide are inserted into an engineered α-factor prepro sequence at the C-term immediately preceding the 3x S1P cleavage site.

| EXEMPLARY SEQUENCES |
|---|
| Exemplary SARS-COV-2 Spike Secretion Peptide Amino Acid Sequence (SEQ ID NO: 1):<br>MFVFLVLLPLVSSAA |
| Exemplary Prepro Amino Acid Sequence (SEQ ID NO: 2):<br>MRFPSIFTAVLFAASSALAAPVNTTTEDETAQIPAEAVIGYLDLEGDFDVAVLPFSNSTNNGLL<br>FINTTIASIAAKEEGVSLDKREAEAAA |
| Exemplary Pre Amino Acid Sequence (SEQ ID NO: 68 ):<br>MRFPSIFTAVLFAASSALA |
| Exemplary Pro Amino Acid Sequence (SEQ ID NO: 69)<br>APVNTTTEDETAQIPAEAVIGYLDLEGDFDVAVLPFSNSTNNGLLFINTTIASIAAKEEGVSLD<br>KREAEAAA |
| Exemplary Prepro_2 Amino Acid Sequence = Prepro Sequence with 2x Surf4 Motif Replacement with a Flexible Gylcine-Serine Linker and 3x S1P Cleavage Site and Deletion of an Ste13 Cleavage Site ("2x_Surf4_SG_3x_S1P_delSTE13") (SEQ ID NO: 70)<br>MRFPSIFTAVLEAASSALAMPLSGGGSGGSGSMPLNTTTEDETAQIPAEAVIGYLDLEGDFDVA<br>VLPFSNSTNNGLLFINTTIASIAAKEEGVSRRLLRRLLRRLLAA |
| Exemplary Pro_2 Amino Acid Sequence (SEQ ID NO: 71)<br>MPLSGGGSGGSGSMPLNTTTEDETAQIPAEAVIGYLDLEGDEDVAVLPESNSTNNGLLFINTTI<br>ASIAAKEEGVSRRLLRRLLRRLLAA |
| Exemplary SARS-COV-2 Wild Type Receptor Binding Domain (WT-RBD) Amino Acid Sequence (SEQ ID NO: 3):<br>MFVFLVLLPLVSSAANITNLCPFGEVFNATRFASVYAWNRKRISNCVADYSVLYNSASFSTFKC<br>YGVSPTKLNDLCFTNVYADSFVIRGDEVRQIAPGQTGKIADYNYKLPDDFTGCVIAWNSNNLDS<br>KVGGNYNYLYRLFRKSNLKPFERDISTEIYQAGSTPCNGVEGFNCYFPLQSYGFQPTNGVGYQP<br>YRVVVLSFELLHAPATVCGP |
| Exemplary Amino Acid Sequence for WT-RBD with Prepro Sequence (SEQ ID NO: 4):<br>MRFPSIFTAVLFAASSALAAPVNTTTEDETAQIPAEAVIGYLDLEGDFDVAVLPFSNSTNNGLL<br>FINTTIASIAAKEEGVSLDKREAEAAANITNLCPFGEVFNATRFASVYAWNRKRISNCVADYSV<br>LYNSASFSTFKCYGVSPTKLNDLCFTNVYADSFVIRGDEVRQIAPGQTGKIADYNYKLPDDFTG |

CVIAWNSNNLDSKVGGNYNYLYRLFRKSNLKPFERDISTEIYQAGSTPCNGVEGFNCYFPLQSY

GFQPTNGVGYQPYRVVVLSFELLHAPATVCGP

Exemplary Variant_1 Amino Acid Sequence (SEQ ID NO: 5):
MFVFLVLLPLVSSAANITNLCPFGEVFNATRFASVYAWNRKRISNCVADYSVLYNSASAAAAC

YGVSPTKLNDLCFTNVYADSFVIRGDEVRQIAPGQTGKIADYNYKLPDDFTGCVIAWNSNNLDS

KVGGNYNYLYRLFRKSNLKPFERDISTEIYQAGSTPCNGVEGFNCYFPLQSYGFQPTNGVGYQP

YRVVVLSFELLHAPATVCGP

Exemplary Amino Acid Sequence for Variant_1 with Prepro Sequence
(SEQ ID NO: 6):
MRFPSIFTAVLFAASSALAAPVNTTTEDETAQIPAEAVIGYLDLEGDFDVAVLPFSNSTNNGLL

FINTTIASIAAKEEGVSLDKREAEAAANITNLCPFGEVFNATRFASVYAWNRKRISNCVADYSV

LYNSASAAAAACYGVSPTKLNDLCFTNVYADSFVIRGDEVRQIAPGQTGKIADYNYKLPDDFTG

CVIAWNSNNLDSKVGGNYNYLYRLFRKSNLKPFERDISTEIYQAGSTPCNGVEGFNCYFPLQSY

GFQPTNGVGYQPYRVVVLSFELLHAPATVCGP

Exemplary Variant_2 Amino Acid Sequence (SEQ ID NO: 7):
MFVFLVLLPLVSSAANITNLCPFGEVFNATRFASVYAWNRKRISNCVADYSVLYNSA

SFSTFKCYGVSPTKLNDLCFTNVYADSFVIRGDEVRQIAPGQTGKIADYNYKLPDDFTGCVIAW

NSNNLDSKVGGNYNYLYRLFRKSNLKPFERDISTEIYQAGSTPCNGVEGFNCYFPLQSYGFQPT

NGVGYQPYRVVVLSFELLHAAAAACGP

Exemplary Amino Acid Sequence for Variant_2 with Prepro Sequence
(SEQ ID NO: 8):
MRFPSIFTAVLFAASSALAAPVNTTTEDETAQIPAEAVIGYLDLEGDFDVAVLPFSNSTNNGLL

FINTTIASIAAKEEGVSLDKREAEAAANITNLCPFGEVFNATRFASVYAWNRKRISNCVADYSV

LYNSASFSTFKCYGVSPTKLNDLCFTNVYADSFVIRGDEVRQIAPGQTGKIADYNYKLPDDFTG

CVIAWNSNNLDSKVGGNYNYLYRLFRKSNLKPFERDISTEIYQAGSTPCNGVEGFNCYFPLQSY

GFQPTNGVGYQPYRVVVLSFELLHAAAAACGP

Exemplary Influenza H1N1/PR8 Hemagglutinin Extracellular Domain (HA)
Amino Acid Sequence (SEQ ID NO: 9):
MKANLLVLLCALAAADADTICIGYHANNSTDTVDTVLEKNVTVTHSVNLLEDSHNGKLCRLKGI

APLQLGKCNIAGWLLGNPECDPLLPVRSWSYIVETPNSENGICYPGDFIDYEELREQLSSVSSF

ERFEIFPKESSWPNHNTNGVTAACSHEGKSSFYRNLLWLTEKEGSYPKLKNSYVNKKGKEVLVL

WGIHHPPNSKEQQNLYQNENAYVSVVTSNYNRRFTPEIAERPKVRDQAGRMNYYWTLLKPGDTI

IFEANGNLIAPMYAFALSRGFGSGIITSNASMHECNTKCQTPLGAINSSLPYQNIHPVTIGECP

KYVRSAKLRMVTGLRNIPSIQSRGLFGAIAGFIEGGWTGMIDGWYGYHHQNEQGSGYAADQKST

QNAINGITNKVNTVIEKMNIQFTAVGKEFNKLEKRMENLNKKVDDGFLDIWTYNAELLVLLENE

RTLDFHDSNVKNLYEKVKSQLKNNAKEIGNGCFEFYHKCDNECMESVRNGTYDYPKYSEESKLN

REKVDGVKLESMGIYQ

Exemplary Amino Acid Sequence for HA with Prepro Sequence (SEQ ID NO:
10):
MRFPSIFTAVLFAASSALAAPVNTTTEDETAQIPAEAVIGYLDLEGDFDVAVLPFSNSTNNGLL

FINTTIASIAAKEEGVSLDKREAEAAADTICIGYHANNSTDTVDTVLEKNVTVTHSVNLLEDSH

NGKLCRLKGIAPLQLGKCNIAGWLLGNPECDPLLPVRSWSYIVETPNSENGICYPGDFIDYEEL

REQLSSVSSFERFEIFPKESSWPNHNTNGVTAACSHEGKSSFYRNLLWLTEKEGSYPKLKNSYV

| EXEMPLARY SEQUENCES |
| --- |
| NKKGKEVLVLWGIHHPPNSKEQONLYONENAYVSVVTSNYNRRFTPEIAERPKVRDQAGRMNYY |
| WTLLKPGDTIIFEANGNLIAPMYAFALSRGFGSGIITSNASMHECNTKCQTPLGAINSSLPYQN |
| IHPVTIGECPKYVRSAKLRMVTGLRNIPSIQSRGLFGAIAGFIEGGWTGMIDGWYGYHHQNEQG |
| SGYAADQKSTQNAINGITNKVNTVIEKMNIQFTAVGKEFNKLEKRMENLNKKVDDGFLDIWTYN |
| AELLVLLENERTLDFHDSNVKNLYEKVKSQLKNNAKEIGNGCFEFYHKCDNECMESVRNGTYDY |
| PKYSEESKLNREKVDGVKLESMGIYQ |
| Exemplary Human Secreted Embryonic Alkaline Phosphatase (SEAP) Amino Acid Sequence (SEQ ID NO: 11): MLGPCMLLLLLLGLRLQLSLGIIPVEEENPDFWNREAAEALGAAKKLQPAQTAAKNLIIFLGD |
| GMGVSTVTAARILKGQKKDKLGPEIPLAMDRFPYVALSKTYNVDKHVPDSGATATAYLCGVKGN |
| FQTIGLSAAARFNQCNTTRGNEVISVMNRAKKAGKSVGVVTTTRVQHASPAGTYAHTVNRNWYS |
| DADVPASARQEGCQDIATQLISNMDIDVILGGGRKYMFRMGTPDPEYPDDYSQGGTRLDGKNLV |
| QEWLAKRQGARYVWNRTELMQASLDPSVTHLMGLFEPGDMKYEIHRDSTLDPSLMEMTEAALRL |
| LSRNPRGFFLFVEGGRIDHGHHESRAYRALTETIMFDDAIERAGQLTSEEDTLSLVTADHSVF |
| SFGGYPLRGSSIFGLAPGKARDRKAYTVLLYGNGPGYVLKDGARPDVTESESGSPEYRQQSAVP |
| LDEETHAGEDVAVFARGPQAHLVHGVQEQTFIAHVMAFAACLEPYTACDLAPPAGTTD |
| Exemplary Amino Acid Sequence for SEAP with Prepro Sequence (SEQ ID NO: 12): MRFPSIFTAVLFAASSALAAPVNTTTEDETAQIPAEAVIGYLDLEGDFDVAVLPFSNSTNNGLL |
| FINTTIASIAAKEEGVSLDKREAEAAAIIPVEEENPDFWNREAAEALGAAKKLQPAQTAAKNLI |
| IFLGDGMGVSTVTAARILKGQKKDKLGPEIPLAMDRFPYVALSKTYNVDKHVPDSGATATAYLC |
| GVKGNFQTIGLSAAARFNQCNTTRGNEVISVMNRAKKAGKSVGVVTTTRVQHASPAGTYAHTVN |
| RNWYSDADVPASARQEGCQDIATQLISNMDIDVILGGGRKYMFRMGTPDPEYPDDYSQGGTRLD |
| GKNLVQEWLAKRQGARYVWNRTELMQASLDPSVTHLMGLFEPGDMKYEIHRDSTLDPSLMEMTE |
| AALRLLSRNPRGFFLFVEGGRIDHGHHESRAYRALTETIMFDDAIERAGQLTSEEDTLSLVTAD |
| HSVFSFGGYPLRGSSIFGLAPGKARDRKAYTVLLYGNGPGYVLKDGARPDVTESESGSPEYRQ |
| QSAVPLDEETHAGEDVAVFARGPQAHLVHGVQEQTFIAHVMAFAACLEPYTACDLAPPAGTTD |
| Exemplary Trastuzumab scFv Amino Acid Sequence (SEQ ID NO: 13): MFVFLVLLPLVSSAAEVQLVESGGGLVQPGGSLRLSCAASGFNIKDTYIHWVRQAPGKGLEWVA |
| RIYPTNGYTRYADSVKGRFTISADTSKNTAYLQMNSLRAEDTAVYYCSRWGGDGFYAMDYWGQG |
| TLVTVSSGGGGSGGGGSGGGGSDIQMTQSPSSLSASVGDRVTITCRASQDVNTAVAWYQQKPGK |
| APKLLIYSASFLYSGVPSRFSGSRSGTDFTLTISSLQPEDFATYYCQQHYTTPPTFGQGTKVEI |
| KR |
| Exemplary Amino Acid Sequence for Trastuzumab scFv with Prepro Sequence (SEQ ID NO: 14): MRFPSIFTAVLFAASSALAAPVNTTTEDETAQIPAEAVIGYLDLEGDFDVAVLPFSNSTNNGLL |
| FINTTIASIAAKEEGVSLDKREAEAAAEVQLVESGGGLVQPGGSLRLSCAASGFNIKDTYIHWV |
| RQAPGKGLEWVARIYPTNGYTRYADSVKGRFTISADTSKNTAYLQMNSLRAEDTAVYYCSRWGG |
| DGFYAMDYWGQGTLVTVSSGGGGSGGGGSGGGGSDIQMTQSPSSLSASVGDRVTITCRASQDVN |
| TAVAWYQQKPGKAPKLLIYSASFLYSGVPSRFSGSRSGTDFTLTISSLQPEDFATYYCQQHYTT |
| PPTFGQGTKVEIKR |

EXEMPLARY SEQUENCES

Exemplary Pertuzumab scFv Amino Acid Sequence (SEQ ID NO: 15):
MFVFLVLLPLVSSAAEVQLVESGGGLVQPGGSLRLSCAASGFTFTDYTMDWVRQAPGKGLEWVA

DVNPNSGGSIYNQRFKGRFTLSVDRSKNTLYLQMNSLRAEDTAVYYCARNLGPSFYFDYWGQGT

LVTVSSGGGGSGGGGSGGGGSDIQMTQSPSSLSASVGDRVTITCKASQDVSIGVAWYQQKPGKA

PKLLIYSASYRYTGVPSRFSGSGSGTDFTLTISSLQPEDFATYYCQQYYIYPYTFGQGTKVEIK

R

Exemplary Amino Acid Sequence for Pertuzumab scFv with Prepro Sequence
(SEQ ID NO: 16):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVESGGGLVQPGGSLRLSCAASGFTFTDYTMDWV

RQAPGKGLEWVADVNPNSGGSIYNQRFKGRFTLSVDRSKNTLYLQMNSLRAEDTAVYYCARNLG

PSFYFDYWGQGTLVTVSSGGGGSGGGGSGGGGSDIQMTQSPSSLSASVGDRVTITCKASQDVSI

GVAWYQQKPGKAPKLLIYSASYRYTGVPSRFSGSGSGTDFTLTISSLQPEDFATYYCQQYYTYP

YTFGQGTKVEIKR

Exemplary GB235 scFv Amino Acid Sequence (SEQ ID NO: 17):
MFVFLVLLPLVSSAAEVQLVQSGAEVKKPGAPVKVSCKASGYTFTSYDINWVRQATGQGLEWMG

WMNPNSGNTGYAQKFOGRVTMTRNTSISTAYMELSSLRSEDTAVYYCARGYYLSRGDFWGQGTL

VTVSSGGGGSGGGGSGGGGSDIQMTQSPSSVSASVGDRVTITCRASQGISSWLAWYQQKPGKAP

KLLIYAASSLQSGVPSRFSGSGSGTDFTLTISSLQPEDFATYYCQQANSFPLTFGGGTKVEIKR

Exemplary Amino Acid Sequence for GB235 scFv with Prepro Sequence
(SEQ ID NO: 18):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVQSGAEVKKPGAPVKVSCKASGYTFTSYDINWV

RQATGQGLEWMGWMNPNSGNTGYAQKFQGRVTMTRNTSISTAYMELSSLRSEDTAVYYCARGYY

LSRGDFWGQGTLVTVSSGGGGSGGGGSGGGGSDIQMTQSPSSVSASVGDRVTITCRASQGISSW

LAWYQQKPGKAPKLLIYAASSLQSGVPSRFSGSGSGTDFTLTISSLQPEDFATYYCQQANSFPL

TFGGGTKVEIKR

Exemplary Adalimumab scFv Amino Acid Sequence (SEQ ID NO: 19):
MEFGLSWVFLVALFRGVQCEVQLVESGGGLVQPGRSLRLSCAASGFTFDDYAMHWVRQAPGKGL

EWVSAITWNSGHIDYADSVEGRFTISRDNAKNSLYLQMNSLRAEDTAVYYCAKVSYLSTASSLD

YWGQGTLVTVSSGGGGSGGGGSGGGGSDIQMTQSPSSLSASVGDRVTITCRASQGIRNYLAWYQ

QKPGKAPKLLIYAASTLQSGVPSRFSGSGSGTDFTLTISSLQPEDVATYYCQRYNRAPYTFGQG

TKVEIKR

Exemplary Amino Acid Sequence for Adalimumab scFv with Prepro Sequence
(SEQ ID NO: 20):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVESGGGLVQPGRSLRLSCAASGFTFDDYAMHWV

RQAPGKGLEWVSAITWNSGHIDYADSVEGRFTISRDNAKNSLYLQMNSLRAEDTAVYYCAKVSY

LSTASSLDYWGQGTLVTVSSGGGGSGGGGSGGGGSDIQMTQSPSSLSASVGDRVTITCRASQGI

RNYLAWYQQKPGKAPKLLIYAASTLQSGVPSRFSGSGSGTDFTLTISSLQPEDVATYYCQRYNR

APYTFGQGTKVEIKR

EXEMPLARY SEQUENCES

Exemplary Pembrolizumab scFv Amino Acid Sequence (SEQ ID NO: 21):
MDWTWRFLFVVAAATGVQSQVQLVQSGVEVKKPGASVKVSCKASGYTFTNYYMYWVRQAPGQGL

EWMGGINPSNGGTNFNEKFKNRVTLTTDSSTTTAYMELKSLQFDDTAVYYCARRDYRFDMGFDY

WGQGTTVTVSSGGGGSGGGGSGGGGSEIVLTQSPATLSLSPGERATLSCRASKGVSTSGYSYLH

WYQQKPGQAPRLLIYLASYLESGVPARFSGSGSGTDFTLTISSLEPEDFAVYYCQHSRDLPLTF

GGGTKVEIKR

Exemplary Amino Acid Sequence for Pembrolizumab scFv with Prepro
Sequence (SEQ ID NO: 22):
MRFPSIFTAVLFAASSALAAPVNTTTEDETAQIPAEAVIGYLDLEGDFDVAVLPFSNSTNNGLL

FINTTIASIAAKEEGVSLDKREAEAAAQVQLVQSGVEVKKPGASVKVSCKASGYTFTNYYMYWV

RQAPGQGLEWMGGINPSNGGTNFNEKFKNRVTLTTDSSTTTAYMELKSLQFDDTAVYYCARRDY

RFDMGFDYWGQGTTVTVSSGGGGSGGGGSGGGGSEIVLTQSPATLSLSPGERATLSCRASKGVS

TSGYSYLHWYQQKPGQAPRLLIYLASYLESGVPARFSGSGSGTDFTLTISSLEPEDFAVYYCQH

SRDLPLTFGGGTKVEIKR

Exemplary Aflibercept Fragment Amino Acid Sequence (SEQ ID NO: 23):
MVSYWDTGVLLCALLSCLLLTGSSSGSDTGRPFVEMYSEIPEIIHMTEGRELVIPCRVTSPNIT

VTLKKFPLDTLIPDGKRIIWDSRKGFIISNATYKEIGLLTCEATVNGHLYKTNYLTHRQTNTII

DVVLSPSHGIELSVGEKLVLNCTARTELNVGIDFNWEYPSSKHQHKKLVNRDLKTQSGSEMKKF

LSTLTIDGVTRSDQGLYTCAASSGLMTKKNSTFVRVHEK

Exemplary Amino Acid Sequence for Aflibercept Fragment with Prepro
Sequence (SEQ ID NO: 24):
MRFPSIFTAVLFAASSALAAPVNTTTEDETAQIPAEAVIGYLDLEGDFDVAVLPFSNSTNNGLL

FINTTIASIAAKEEGVSLDKREAEAAASDTGRPFVEMYSEIPEIIHMTEGRELVIPCRVTSPNI

TVTLKKFPLDTLIPDGKRIIWDSRKGFIISNATYKEIGLLTCEATVNGHLYKTNYLTHRQTNTI

IDVVLSPSHGIELSVGEKLVLNCTARTELNVGIDFNWEYPSSKHQHKKLVNRDLKTQSGSEMKK

FLSTLTIDGVTRSDQGLYTCAASSGLMTKKNSTFVRVHEK

Exemplary Dupilumab scFv Amino Acid Sequence (SEQ ID NO: 25):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVESGGGLEQPGGSLRLSCAGSGFTFRDYAMTWV

RQAPGKGLEWVSSISGSGGNTYYADSVKGRFTISRDNSKNTLYLQMNSLRAEDTAVYYCAKDRL

SITIRPRYYGLDVWGQGTTVTVSSGGGGSGGGGSGGGGSDIVMTQSPLSLPVTPGEPASISCRS

SQSLLYSIGYNYLDWYLQKSGQSPQLLIYLGSNRASGVPDRFSGSGSGTDFTLKISRVEAEDVG

FYYCMQALQTPYTFGQGTKLEIKR

Exemplary Amino Acid Sequence for Dupilumab scFv with Prepro Sequence
(SEQ ID NO: 26):
MRFPSIFTAVLFAASSALAAPVNTTTEDETAQIPAEAVIGYLDLEGDFDVAVLPFSNSTNNGLL

FINTTIASIAAKEEGVSLDKREAEAAAQVQLVQSGVEVKKPGASVKVSCKASGYTFTNYYMYWV

RQAPGQGLEWMGGINPSNGGTNFNEKFKNRVTLTTDSSTTTAYMELKSLQFDDTAVYYCARRDY

RFDMGFDYWGQGTTVTVSSGGGGSGGGGSGGGGSEIVLTQSPATLSLSPGERATLSCRASKGVS

TSGYSYLHWYQQKPGQAPRLLIYLASYLESGVPARFSGSGSGTDFTLTISSLEPEDFAVYYCQH

SRDLPLTFGGGTKVEIKR

EXEMPLARY SEQUENCES

Exemplary Ustekinumab scFv Amino Acid Sequence (SEQ ID NO: 27):
MELGLSWIFLLAILKGVQCEVQLVQSGAEVKKPGESLKISCKGSGYSFTTYWLGWVRQMPGKGL

DWIGIMSPVDSDIRYSPSFQGQVTMSVDKSITTAYLQWNSLKASDTAMYYCARRRPGQGYFDFW

GQGTLVTVSSGGGGSGGGGSGGGGSDIQMTQSPSSLSASVGDRVTITCRASQGISSWLAWYQQK

PEKAPKSLIYAASSLQSGVPSRFSGSGSGTDFTLTISSLQPEDFATYYCQQYNIYPYTFGQGTK

LEIKR

Exemplary Amino Acid Sequence for Ustekinumab scFv with Prepro Sequence
(SEQ ID NO: 28):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVQSGAEVKKPGESLKISCKGSGYSFTTYWLGWV

RQMPGKGLDWIGIMSPVDSDIRYSPSFQGQVTMSVDKSITTAYLQWNSLKASDTAMYYCARRRP

GQGYFDFWGQGTLVTVSSGGGGSGGGGSGGGGSDIQMTQSPSSLSASVGDRVTITCRASQGISS

WLAWYQQKPEKAPKSLIYAASSLQSGVPSRFSGSGSGTDFTLTISSLQPEDFATYYCQQYNIYP

YTFGQGTKLEIKR

Exemplary Nivolumab scFv Amino Acid Sequence (SEQ ID NO: 29):
MKHLWFFLLLVAAPRWVLSQVQLVESGGGVVQPGRSLRLDCKASGITFSNSGMHWVRQAPGKGL

EWVAVIWYDGSKRYYADSVKGRFTISRDNSKNTLFLQMNSLRAEDTAVYYCATNDDYWGQGTLV

TVSSGGGGSGGGGSGGGGSEIVLTQSPATLSLSPGERATLSCRASQSVSSYLAWYQQKPGQAPR

LLIYDASNRATGIPARFSGSGSGTDFTLTISSLEPEDFAVYYCQQSSNWPRTFGQGTKVEIKR

Exemplary Amino Acid Sequence for Nivolumab scFv with Prepro Sequence
(SEQ ID NO: 30):
MRFPSIFTAVLFAASSALAAPVNTTTEDETAQIPAEAVIGYLDLEGDFDVAVLPFSNSTNNGLL

FINTTIASIAAKEEGVSLDKREAEAAAQVQLVESGGGVVQPGRSLRLDCKASGITFSNSGMHWV

RQAPGKGLEWVAVIWYDGSKRYYADSVKGRFTISRDNSKNTLFLQMNSLRAEDTAVYYCATNDD

YWGQGTLVTVSSGGGGSGGGGSGGGGSEIVLTQSPATLSLSPGERATLSCRASQSVSSYLAWYQ

QKPGQAPRLLIYDASNRATGIPARFSGSGSGTDFTLTISSLEPEDFAVYYCQQSSNWPRTFGQG

TKVEIKR

Exemplary Bevacizumab scFv Amino Acid Sequence (SEQ ID NO: 31):
MEFGLSWLFLVAILKGVQCEVQLVESGGGLVQPGGSLRLSCAASGYTFTNYGMNWVRQAPGKGL

EWVGWINTYTGEPTYAADFKRRFTFSLDTSKSTAYLQMNSLRAEDTAVYYCAKYPHYYGSSHWY

FDVWGQGTLVTVSSGGGGSGGGGSGGGGSDIQMTQSPSSLSASVGDRVTITCSASQDISNYLNW

YQQKPGKAPKVLIYFTSSLHSGVPSRFSGSGSGTDFTLTISSLQPEDFATYYCQQYSTVPWTFG

QGTKVEIKR

Exemplary Amino Acid Sequence for Bevacizumab scFv with Prepro Sequence
(SEQ ID NO: 32):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVQLVESGGGLVQPGGSLRLSCAASGYTFTNYGMNWV

RQAPGKGLEWVGWINTYTGEPTYAADFKRRFTFSLDTSKSTAYLQMNSLRAEDTAVYYCAKYPH

YYGSSHWYFDVWGQGTLVTVSSGGGGSGGGGSGGGGSDIQMTQSPSSLSASVGDRVTITCSASQ

DISNYLNWYQQKPGKAPKVLIYFTSSLHSGVPSRFSGSGSGTDFTLTISSLQPEDFATYYCQQY

STVPWTFGQGTKVEIKR

EXEMPLARY SEQUENCES

Exemplary Etanercept Fragment Amino Acid Sequence (SEQ ID NO: 33):
MAPVAVWAALAVGLELWAAAHALPAQVAFTPYAPEPGSTCRLREYYDQTAQMCCSKCSPGQHAK

VFCTKTSDTVCDSCEDSTYTQLWNWVPECLSCGSRCSSDQVETQACTREQNRICTCRPGWYCAL

SKQEGCRLCAPLRKCRPGFGVARPGTETSDVVCKPCAPGTFSNTTSSTDICRPHQICNVVAIPG

NASMDAVCTSTSPTRSMAPGAVHLPQPVSTRSQHTQPTPEPSTAPSTSFLLPMGPSPPAEGSTG

D

Exemplary Amino Acid Sequence for Etanercept Fragment with Prepro Sequence (SEQ ID NO: 34):
MRFPSIFTAVLFAASSALAAPVNTTTEDETAQIPAEAVIGYLDLEGDFDVAVLPFSNSTNNGLL

FINTTIASIAAKEEGVSLDKREAEAAALPAQVAFTPYAPEPGSTCRLREYYDQTAQMCCSKCSP

GQHAKVFCTKTSDTVCDSCEDSTYTQLWNWVPECLSCGSRCSSDQVETQACTREQNRICTCRPG

WYCALSKQEGCRLCAPLRKCRPGFGVARPGTETSDVVCKPCAPGTFSNTTSSTDICRPHQICNV

VAIPGNASMDAVCTSTSPTRSMAPGAVHLPQPVSTRSQHTQPTPEPSTAPSTSFLLPMGPSPPA

EGSTGD

Exemplary Tisagenlecleucel Extracellular and Transmembrane Domains Amino Acid Sequence (SEQ ID NO: 35):
MALPVTALLLPLALLLHAARPEVKLQESGPGLVAPSQSLSVTCTVSGVSLPDYGVSWIRQPPRK

GLEWLGVIWGSETTYYNSALKSRLTIIKDNSKSQVFLKMNSLQTDDTAIYYCAKHYYYGGSYAM

DYWGQGTSVTVSSGGGGSGGGGSGGGGSDIQMTQTTSSLSASLGDRVTISCRASQDISKYLNWY

QQKPDGTVKLLIYHTSRLHSGVPSRFSGSGSGTDYSLTISNLEQEDIATYFCQQGNTLPYTFGG

GTKLEITTTTPAPRPPTPAPTIASQPLSLRPEACRPAAGGAVHTRGLDFACDIYIWAPLAGTCG

VLLLSLVITLYC

Exemplary Amino Acid Sequence for Tisagenlecleucel Extracellular and Transmembrane Domains with Prepro Sequence (SEQ ID NO: 36):
MRFPSIFTAVLFAASSALAAPVNTTTEDETAQIPAEAVIGYLDLEGDFDVAVLPFSNSTNNGLL

FINTTIASIAAKEEGVSLDKREAEAAAEVKLQESGPGLVAPSQSLSVTCTVSGVSLPDYGVSWI

RQPPRKGLEWLGVIWGSETTYYNSALKSRLTIIKDNSKSQVFLKMNSLQTDDTAIYYCAKHYYY

GGSYAMDYWGQGTSVTVSSGGGGSGGGGSGGGGSDIQMTQTTSSLSASLGDRVTISCRASQDIS

KYLNWYQQKPDGTVKLLIYHTSRLHSGVPSRFSGSGSGTDYSLTISNLEQEDIATYFCQQGNTL

PYTFGGGTKLEITTTTPAPRPPTPAPTIASQPLSLRPEACRPAAGGAVHTRGLDFACDIYIWAP

LAGTCGVLLLSLVITLYC

Exemplary Tisagenlecleucel Amino Acid Sequence (SEQ ID NO: 72):
MALPVTALLLPLALLLHAARPEQKLISEEDLDIQMTQTTSSLSASLGDRVTISCRASQDISKYL

NWYQQKPDGTVKLLIYHTSRLHSGVPSRFSGSGSGTDYSLTISNLEQEDIATYFCQQGNTLPYT

FGGGTKLEITGGGGSGGGGSGGGGSEVKLQESGPGLVAPSQSLSVTCTVSGVSLPDYGVSWIRQ

PPRKGLEWLGVIWGSETTYYNSALKSRLTIIKDNSKSQVFLKMNSLQTDDTAIYYCAKHYYYGG

SYAMDYWGQGTSVTVSSAAAFVPVFLPAKPTTTPAPRPPTPAPTIASQPLSLRPEACRPAAGGA

VHTRGLDFACDIYIWAPLAGTCGVLLLSLVITLYCKRGRKKLLYIFKQPFMRPVQTTQEEDGCS

CRFPEEEEGGCELRVKFSRSADAPAYQQGQNQLYNELNLGRREEYDVLDKRRGRDPEMGGKPRR

KNPQEGLYNELQKDKMAEAYSEIGMKGERRRGKGHDGLYQGLSTATKDTYDALHMQALPPR

EXEMPLARY SEQUENCES

Exemplary Amino Acid Sequence for Tisagenlecleucel with Prepro Sequence
(SEQ ID NO: 73):
MRFPSIFTAVLFAASSALAAPVNTTTEDETAQIPAEAVIGYLDLEGDFDVAVLPFSNSTNNGLL

FINTTIASIAAKEEGVSLDKREAEAAAEQKLISEEDLDIQMTQTTSSLSASLGDRVTISCRASQ

DISKYLNWYQQKPDGTVKLLIYHTSRLHSGVPSRESGSGSGTDYSLTISNLEQEDIATYFCQQG

NTLPYTFGGGTKLEITGGGGSGGGGSGGGGSEVKLQESGPGLVAPSQSLSVTCTVSGVSLPDYG

VSWIRQPPRKGLEWLGVIWGSETTYYNSALKSRLTIIKDNSKSQVFLKMNSLQTDDTAIYYCAK

HYYYGGSYAMDYWGQGTSVTVSSAAAFVPVFLPAKPTTTPAPRPPTPAPTIASQPLSLRPEACR

PAAGGAVHTRGLDFACDIYIWAPLAGTCGVLLLSLVITLYCKRGRKKLLYIFKQPFMRPVQTTQ

EEDGCSCRFPEEEEGGCELRVKFSRSADAPAYQQGQNQLYNELNLGRREEYDVLDKRRGRDPEM

GGKPRRKNPQEGLYNELQKDKMAEAYSEIGMKGERRRGKGHDGLYQGLSTATKDTYDALHMQAL

PPR

Exemplary Amino Acid Sequence for Tisagenlecleucel with Pre-
pro_2 Sequence
(SEQ ID NO: 74):
MRFPSIFTAVLFAASSALAMPLSGGGSGGSGSMPLNTTTEDETAQIPAEAVIGYLDLEGDFDVA

VLPFSNSTNNGLLFINTTIASIAAKEEGVSRRLLRRLLRRLLAAEQKLISEEDLDIQMTQTTSS

LSASLGDRVTISCRASQDISKYLNWYQQKPDGTVKLLIYHTSRLHSGVPSRESGSGSGTDYSLT

ISNLEQEDIATYFCQQGNTLPYTFGGGTKLEITGGGGSGGGGSGGGGSEVKLQESGPGLVAPSQ

SLSVTCTVSGVSLPDYGVSWIRQPPRKGLEWLGVIWGSETTYYNSALKSRLTIIKDNSKSQVFL

KMNSLQTDDTAIYYCAKHYYYGGSYAMDYWGQGTSVTVSSAAAFVPVFLPAKPTTTPAPRPPTP

APTIASQPLSLRPEACRPAAGGAVHTRGLDFACDIYIWAPLAGTCGVLLLSLVITLYCKRGRKK

LLYIFKQPFMRPVQTTQEEDGCSCRFPEEEEGGCELRVKFSRSADAPAYQQGQNQLYNELNLGR

REEYDVLDKRRGRDPEMGGKPRRKNPQEGLYNELQKDKMAEAYSEIGMKGERRRGKHDGLYQG

LSTATKDTYDALHMQALPPR

Exemplary Amino Acid Sequence for Tisagenlecleucel with IgK Light Chain
Signal Peptide Sequence and Pro_2 Sequence (SEQ ID NO: 75):
MDMRVPAQLLGLLLLWLSGARCMPLSGGGSGGSGSMPLNTTTEDETAQIPAEAVIGYLDLEGDF

DVAVLPFSNSTNNGLLFINTTIASIAAKEEGVSRRLLRRLLRRLLAAEQKLISEEDLDIQMTQT

TSSLSASLGDRVTISCRASQDISKYLNWYQQKPDGTVKLLIYHTSRLHSGVPSRESGSGSGTDY

SLTISNLEQEDIATYFCQQGNTLPYTFGGGTKLEITGGGGSGGGGSGGGGSEVKLQESGPGLVA

PSQSLSVTCTVSGVSLPDYGVSWIRQPPRKGLEWLGVIWGSETTYYNSALKSRLTIIKDNSKSQ

VFLKMNSLQTDDTAIYYCAKHYYYGGSYAMDYWGQGTSVTVSSAAAFVPVFLPAKPTTTPAPRP

PTPAPTIASQPLSLRPEACRPAAGGAVHTRGLDFACDIYIWAPLAGTCGVLLLSLVITLYCKRG

RKKLLYIFKQPFMRPVQTTQEEDGCSCRFPEEEEGGCELRVKFSRSADAPAYQQGQNQLYNELN

LGRREEYDVLDKRRGRDPEMGGKPRRKNPQEGLYNELQKDKMAEAYSEIGMKGERRRGKHDGL

YQGLSTATKDTYDALHMQALPPR

Exemplary Amino Acid Sequence for Tisagenlecleucel with CD8 Signal
Peptide Sequence and Pro_2 Sequence (SEQ ID NO: 76):
MALPVTALLLPLALLLHAARPMPLSGGGSGGSGSMPLNTTTEDETAQIPAEAVIGYLDLEGDFD

VAVLPFSNSINNGLLFINTTIASIAAKEEGVSRRLLRRLLRRLLAAEQKLISEEDLDIQMTQTT

SSLSASLGDRVTISCRASQDISKYLNWYQQKPDGTVKLLIYHTSRLHSGVPSRESGSGSGTDYS

LTISNLEQEDIATYFCQQGNTLPYTFGGGTKLEITGGGGSGGGGSGGGGSEVKLQESGPGLVAP

| EXEMPLARY SEQUENCES |
| --- |
| SQSLSVTCTVSGVSLPDYGVSWIRQPPRKGLEWLGVIWGSETTYYNSALKSRLTIIKDNSKSQV |
| FLKMNSLQTDDTAIYYCAKHYYYGGSYAMDYWGQGTSVTVSSAAAFVPVFLPAKPTTTPAPRPP |
| TPAPTIASQPLSLRPEACRPAAGGAVHTRGLDFACDIYIWAPLAGTCGVLLLSLVITLYCKRGR |
| KKLLYIFKQPFMRPVQTTQEEDGCSCRFPEEEEGGCELRVKFSRSADAPAYQQGQNQLYNELNL |
| GRREEYDVLDKRRGRDPEMGGKPRRKNPQEGLYNELQKDKMAEAYSEIGMKGERRRGKGHDGLY |
| QGLSTATKDTYDALHMQALPPR |

Exemplary Amino Acid Sequence for Tisagenlecleucel with IL2 Signal Peptide Sequence and Pro_2 Sequence (SEQ ID NO: 77):
MYRMQLLSCIALSLALVTNSMPLSGGGSGGSGSMPLNTTTEDETAQIPAEAVIGYLDLEGDFDV

AVLPFSNSTNNGLLFINTTIASIAAKEEGVSRELLRRLLRRLLAAEQKLISEEDLDIQMTQTTS

SLSASLGDRVTISCRASQDISKYLNWYQQKPDGTVKLLIYHTSRLHSGVPSRESGSGSGTDYSL

TISNLEQEDIATYFCQQGNTLPYTFGGGTKLEITGGGGSGGGGSGGGGSEVKLQESGPGLVAPS

QSLSVTCTVSGVSLPDYGVSWIRQPPRKGLEWLGVIWGSETTYYNSALKSRLTIIKDNSKSQVF

LKMNSLQTDDTAIYYCAKHYYYGGSYAMDYWGQGTSVTVSSAAAFVPVFLPAKPTTTPAPRPPT

PAPTIASQPLSLRPEACRPAAGGAVHTRGLDFACDIYIWAPLAGTCGVLLLSLVITLYCKRGRK

KLLYIFKQPFMRPVQTTQEEDGCSCRFPEEEEGGCELRVKFSRSADAPAYQQGQNQLYNELNLG

RREEYDVLDKRRGRDPEMGGKPRRKNPQEGLYNELQKDKMAEAYSEIGMKGERRRGKGHDGLYQ

GLSTATKDTYDALHMQALPPR

Exemplary Amino Acid Sequence for Tisagenlecleucel with SARS-COV-2 Spike
Signal Peptide Sequence and Pro_2 Sequence (SEQ ID NO: 78):
MFVFLVLLPLVSSMPLSGGGSGGSGSMPLNTTTEDETAQIPAEAVIGYLDLEGDEDVAVLPFSN

STNINGLLFINTTIASIAAKEEGVSRRLLRRLLRRLLAAEQKLISEEDLDIQMTQTTSSLSASLG

DRVTISCRASQDISKYLNWYQQKPDGTVKLLIYHTSRLHSGVPSRESGSGSGTDYSLTISNLEQ

EDIATYFCQQGNTLPYTFGGGTKLEITGGGGSGGGGSGGGGSEVKLQESGPGLVAPSQSLSVTC

TVSGVSLPDYGVSWIRQPPRKGLEWLGVIWGSETTYYNSALKSRLTIIKDNSKSQVFLKMNSLQ

TDDTAIYYCAKHYYYGGSYAMDYWGQGTSVTVSSAAAFVPVFLPAKPTTTPAPRPPTPAPTIAS

QPLSLRPEACRPAAGGAVHTRGLDFACDIYIWAPLAGTCGVLLLSLVITLYCKRGRKKLLYIFK

QPEMRPVQTTQEEDGCSCRFPEEEEGGCELRVKFSRSADAPAYQQGQNQLYNELNLGRREEYDV

LDKRRGRDPEMGGKPRRKNPQEGLYNELQKDKMAEAYSEIGMKGERRRGKGHDGLYQGLSTATK

DTYDALHMQALPPR

Exemplary Amino Acid Sequence for A3B1 CAR (SEQ ID NO: 79):
MALPVTALLLPLALLLHAARPEQKLISEEDLTGNIVLTQSPASLAVSLGQRATISCRASESVDN

FGNSFMHWYQQKSGQPPRLLIYIASNLESGVPARFSGSGSRTDFTLTIDPVEADDAATYYCHQN

NEDPLTFGAGTKLELKGGGGSGGGGSGGGGSHSQIQLQQSGAELVRPGSSVKISCKASGFAFSS

YWMNWVKQRPGQGLEWIGQIYPGDGDTKYNVKFRGKATLTADESSSTAYIQLTSLTSEDSGVYF

CARKRITAVITTVFDVWGAGTTVTVSSAAAFVPVFLPAKPTTTPAPRPPTPAPTIASQPLSLRP

EACRPAAGGAVHTRGLDFACDIYIWAPLAGTCGVLLLSLVITLYCKRGRKKLLYIFKQPFMRPV

QTTQEEDGCSCRFPEEEEGGCELRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALH

MQALPPR

-continued

EXEMPLARY SEQUENCES

Exemplary Amino Acid Sequence for A3B1 CAR with Prepro Sequence (SEQ ID NO: 80):
MRFPSIFTAVLFAASSALAAPVNTTTEDETAQIPAEAVIGYLDLEGDFDVAVLPFSNSTNNGLL

FINTTIASIAAKEEGVSLDKREAEAAAEQKLISEEDLTGNIVLTQSPASLAVSLGQRATISCRA

SESVDNFGNSFMHWYQQKSGQPPRLLIYIASNLESGVPARFSGSGSRTDFTLTIDPVEADDAAT

YYCHQNNEDPLTFGAGTKLELKGGGSGGGGSGGGGSHSQIQLQQSGAELVRPGSSVKISCKAS

GFAFSSYWMNWVKQRPGQGLEWIGQIYPGDGDTKYNVKFRGKATLTADESSSTAYIQLTSLTSE

DSGVYFCARKRITAVITTVFDVWGAGTTVTVSSAAAFVPVFLPAKPTTTPAPRPPTPAPTIASQ

PLSLRPEACRPAAGGAVHTRGLDFACDIYIWAPLAGTCGVLLLSLVITLYCKRGRKKLLYIFKQ

PFMRPVQTTQEEDGCSCRFPEEEEGGCELRVKFSRSADAPAYQQGQNQLYNELNLGRREEYDVL

DKRRGRDPEMGGKPRRKNPQEGLYNELQKDKMAEAYSEIGMKGERRRGKGHDGLYQGLSTATKD

TYDALHMQALPPR

Exemplary Amino Acid Sequence for A3B1 CAR with Prepro_2 Sequence (SEQ ID NO: 81):
MRFPSIFTAVLFAASSALAMPLSGGGSGGSGSMPLNTTTEDETAQIPAEAVIGYLDLEGDFDVA

VLPFSNSINNGLLFINTTIASIAAKEEGVSRRLLRRLLRRLLAAEQKLISEEDLTGNIVLTQSP

ASLAVSLGQRATISCRASESVDNFGNSFMHWYQQKSGQPPRLLIYIASNLESGVPARFSGSGSR

TDFTLTIDPVEADDAATYYCHQNNEDPLTFGAGTKLELKGGGSGGGGSGGGGSHSQIQLQQSG

AELVRPGSSVKISCKASGFAFSSYWMNWVKQRPGQGLEWIGQIYPGDGDTKYNVKFRGKATLTA

DESSSTAYIQLTSLTSEDSGVYFCARKRITAVITTVFDVWGAGTTVTVSSAAAFVPVFLPAKPT

TTPAPRPPTPAPTIASQPLSLRPEACRPAAGGAVHTRGLDFACDIYIWAPLAGTCGVLLLSLVI

TLYCKRGRKKLLYIFKQPFMRPVQTTQEEDGCSCRFPEEEEGGCELRVKFSRSADAPAYQQGQN

QLYNELNLGRREEYDVLDKRRGRDPEMGGKPRRKNPQEGLYNELQKDKMAEAYSEIGMKGERRR

GKGHDGLYQGLSTATKDTYDALHMQALPPR

Exemplary Axicabtagene Ciloleucel Extracellular and Transmembrane Domains Amino Acid Sequence (SEQ ID NO: 37):
MYRMQLLSCIALSLALVTNSDIQMTQTTSSLSASLGDRVTISCRASQDISKYLNWYQQKPD

GTVKLLIYHTSRLHSGVPSRFSGSGSGTDYSLTISNLEQEDIATYFCQQGNTLPYTFGG

GTKLEITGGGGSGGGGSGGGGSEVKLQESGPGLVAPSQSLSVTCTVSGVSLPDYGVSWI

RQPPRKGLEWLGVIWGSETTYYNSALKSRLTIIKDNSKSQVFLKMNSLQTDDTAIYYCA

KHYYYGGSYAMDYWGQGTSVTVSSGKHLCPSPLFPGPSKPFWVLVVVGGVLACYSLLVTVAF

IIFWV

Exemplary Amino Acid Sequence for Axicabtagene Ciloleucel Extra-
cellular and Transmembrane Domains with Prepro Sequence
(SEQ ID NO: 38):
MRFPSIFTAVLFAASSALAAPVNTTTEDETAQIPAEAVIGYLDLEGDFDVAVLPFSNSTNNGLL

FINTTIASIAAKEEGVSLDKREAEAAADIQMTQTTSSLSASLGDRVTISCRASQDISKYLNW

YQQKPDGTVKLLIYHTSRLHSGVPSRFSGSGSGTDYSLTISNLEQEDIATYFCQQGNTL

PYTFGGGTKLEITGGGGSGGGGSGGGGSEVKLQESGPGLVAPSQSLSVTCTVSGVSLPD

YGVSWIRQPPRKGLEWLGVIWGSETTYYNSALKSRLTIIKDNSKSQVFLKMNSLQTDDT

AIYYCAKHYYYGGSYAMDYWGQGTSVTVSSGKHLCPSPLFPGPSKPFWVLVVVGGVLACYSL

LVTVAFIIFWV

EXEMPLARY SEQUENCES

Exemplary Lisocabtagene Maraleucel Extracellular and Transmembrane
Domains Amino Acid Sequence (SEQ ID NO: 39):
MDMRVPAQLLGLLLLWLRGARCDIQMTQTTSSLSASLGDRVTISCRASQDISKYLNWYQQK

PDGTVKLLIYHTSRLHSGVPSRFSGSGSGTDYSLTISNLEQEDIATYFCQQGNTLPYTF

GGGTKLEITGGGGSGGGGSGGGGSEVKLQESGPGLVAPSQSLSVTCTVSGVSLPDYGVS

WIRQPPRKGLEWLGVIWGSETTYYNSALKSRLTIIKDNSKSQVFLKMNSLQTDDTAIYY

CAKHYYYGGSYAMDYWGQGTSVTVSSESKYGPPCPSCPFWVLVVVGGVLACYSLLVTVAFII

FWV

Exemplary Amino Acid Sequence for Lisocabtagene Maraleucel
Extracellular and Transmembrane Domains with Prepro Sequence
(SEQ ID NO: 40):
MRFPSIFTAVLFAASSALAAPVNTTTEDETAQIPAEAVIGYLDLEGDFDVAVLPFSNSTNNGLL

FINTTIASIAAKEEGVSLDKREAEAAADIQMTQTTSSLSASLGDRVTISCRASQDISKYLNW

YQQKPDGTVKLLIYHTSRLHSGVPSRFSGSGSGTDYSLTISNLEQEDIATYFCQQGNTL

PYTFGGGTKLEITGGGGSGGGGSGGGGSEVKLQESGPGLVAPSQSLSVTCTVSGVSLPD

YGVSWIRQPPRKGLEWLGVIWGSETTYYNSALKSRLTIIKDNSKSQVFLKMNSLQTDDT

AIYYCAKHYYYGGSYAMDYWGQGTSVTVSSESKYGPPCPSCPFWVLVVVGGVLACYSLLVTV

AFIIFWV

Exemplary Amino Acid Sequence for Variant_1 NanoLuciferase Fusion with
Adipokinetic Hormone Signal Peptide Sequence (SEQ ID NO: 41):
MYKLTVFLMFIAFVIIAEAAANITNLCPFGEVFNATRFASVYAWNRKRISNCVADYSVLYN

SASAAAAACYGVSPTKLNDLCFTNVYADSFVIRGDEVRQIAPGQTGKIADYNYKLPDDF

TGCVIAWNSNNLDSKVGGNYNYLYRLFRKSNLKPFERDISTEIYQAGSTPCNGVEGFNC

YFPLQSYGFQPTNGVGYQPYRVVVLSFELLHAPATVCGPSGGGSGGSGSVFTLEDFVGDWR

QTAGYNLDQVLEQGGVSSLFQNLGVSVTPIQRIVLSGENGLKIDIHVIIPYEGLSGDOMGQIEK

IFKVVYPVDDHHFKVILHYGTLVIDGVTPNMIDYFGRPYEGIAVFDGKKITVTGTLWNGNKIID

ERLINPDGSLLFRVTINGVTGWRLCERILA

Exemplary Amino Acid Sequence for Variant_1 NanoLuciferase Fusion with
Arabidopsis Root Growth Factor GLV1 Signal Peptide and Propeptide
Sequence (SEQ ID NO: 42):
MSCSLRSGLVIVFCFILLLLSSNVGCASAARRLRSHKHHHHKVASLDVFNGGERRRALGGVETG

EEVVVMAANITNLCPFGEVFNATRFASVYAWNRKRISNCVADYSVLYNSASAAAAACYGV

SPTKLNDLCFTNVYADSFVIRGDEVRQIAPGQTGKIADYNYKLPDDFTGCVIAWNSNNL

DSKVGGNYNYLYRLFRKSNLKPFERDISTEIYQAGSTPCNGVEGFNCYFPLQSYGFQPT

NGVGYQPYRVVVLSFELLHAPATVCGPSGGGSGGSGSVFTLEDFVGDWRQTAGYNLDQVLEQ

GGVSSLFQNLGVSVTPIQRIVLSGENGLKIDIHVIIPYEGLSGDQMGQIEKIFKVVYPVDDHHF

KVILHYGTLVIDGVTPNMIDYFGRPYEGIAVFDGKKITVTGTLWNGNKIIDERLINPDGSLLFR

VTINGVTGWRLCERILA

Exemplary Amino Acid Sequence for Variant_1 NanoLuciferase Fusion with
PrePro Sequence (SEQ ID NO: 43):
MRFPSIFTAVLFAASSALAAPVNTTTEDETAQIPAEAVIGYLDLEGDFDVAVLPFSNSTNNGLL

FINTTIASIAAKEEGVSLDKREAEAAANITNLCPFGEVFNATRFASVYAWNRKRISNCVADYSV

LYNSASAAAAACYGVSPTKLNDLCFTNVYADSFVIRGDEVRQIAPGQTGKIADYNYKLPDDFTG

CVIAWNSNNLDSKVGGNYNYLYRLFRKSNLKPFERDISTEIYQAGSTPCNGVEGFNCYFPLQSY

| EXEMPLARY SEQUENCES |
| --- |

GFQPTNGVGYQPYRVVVLSFELLHAPATVCGPSGGGSGGSGSVFTLEDFVGDWRQTAGYNLDQV

LEQGGVSSLFQNLGVSVTPIQRIVLSGENGLKIDIHVIIPYEGLSGDQMGQIEKIFKVVYPVDD

HHFKVILHYGTLVIDGVTPNMIDYFGRPYEGIAVFDGKKITVTGTLWNGNKIIDERLINPDGSL

LFRVTINGVTGWRLCERILA

Exemplary Amino Acid Sequence for Arabidopsis Root Growth Factor GLV1
Secretion Peptide Sequence (SEQ ID NO: 99):
MSCSLRSGLVIVFCFILLLLSSNVGCASAARRLRSHKHHHHKVASLDVFNGGERRRALGGVETG

EEVVVM

Exemplary Amino Acid Sequence for Arabidopsis Root Growth Factor GLV2
Secretion Peptide Sequence (SEQ ID NO: 82):
MAIRVSHKSFLVALLLILFISSPTQARSLREVVRNRTLLVVEKSQESRKIRHEGGGSDVDGLMD

M

Exemplary Amino Acid Sequence for Arabidopsis Root Growth Factor GLV3
Secretion Peptide Sequence (SEQ ID NO: 83):
MMRFTIIVIAFLLIIQSLEEEHILVYAHEGGEAGHKSLDYQGDQDSSTLHPKELFDAPRKVRFG

RTTRAEKEQVTAMNNDSWSFKISGEHKQTNILADHDTTKNTFCKKMMIIVNDLTSLPTLEPSTS

TNDMEKLARLLRD

Exemplary Amino Acid Sequence for Arabidopsis Root Growth Factor GLV4
Secretion Peptide Sequence (SEQ ID NO: 84):
MEMKKWSYANLITLALLFLFFIILLLAFQGGSRDDDHQHVHVAIRTKDISMGRKLKSLKPINPT

KKNGFEYPDQGSHDVQEREVYVELR

Exemplary Amino Acid Sequence for Arabidopsis Root Growth Factor GLV5
Secretion Peptide Sequence (SEQ ID NO: 85):
MTNITSSFLCLLILLLFCLSFGYSLHGDKDEVLSVDVGSNAKVMKHLDGDDAMKKAQVRGRSGQ

EFSKETTKMMMKKTTKKETNVEEEDDLVAYTA

Exemplary Amino Acid Sequence for Arabidopsis Root Growth Factor GLV6
Secretion Peptide Sequence (SEQ ID NO: 86):
MKLIRVTLFLCALAILLLVTPTSSLQLKHPYSSPSQGLSKKIVTKMATRKLMIISSEYVMTSTS

HEGSSEQLRVTSSGKSKDEEKKLSEEEEEKKALAKYLSM

Exemplary Amino Acid Sequence for Arabidopsis Root Growth Factor GLV7
Secretion Peptide Sequence (SEQ ID NO: 87):
MTTLSKILCVLIILLLCFSFRYSLHEDGNQQSSRDFVSTAKAIKYGDVMKKMIRGRKLMMASGE

KEEAETKMKRGNRETERNSSKSVEEDGLVAYTA

Exemplary Amino Acid Sequence for Arabidopsis Root Growth Factor GLV8
Secretion Peptide Sequence (SEQ ID NO: 88):
MKKWSYAKLMTSALLLVFLSIILLAFHGGSRGDNHLYDHVAIGTKDILMGRKLKDLKPKTESLK

MINPKKKNGFEYSDQVSSDLSRQEVFVDMMAR

Exemplary Amino Acid Sequence for Arabidopsis Root Growth Factor GLV9
Secretion Peptide Sequence (SEQ ID NO: 89):
MKKTSLKLMTLVLGFCFVIYLLQGPRGGSRNGDLLIARKLISLEPIETKNAARSLKDSISTDLE

EEVDRLMEH

Exemplary Amino Acid Sequence for Arabidopsis Root Growth Factor GLV10
Secretion Peptide Sequence (SEQ ID NO: 90):
MSSIHVASMILLLFLFLHHSDSRHLDNVHITASRFSLVKDQNVVSSSTSKEPVKVSRFVPGPLK

HHHRRPPLLFA

Exemplary Amino Acid Sequence for Arabidopsis Root Growth Factor GLV11
Secretion Peptide Sequence (SEQ ID NO: 91):
MVSIRVICYLLVFSVLQVHAKVSNANFNSQAPQMKNSEGLGASNGTQIAKKHAEDVIENRKTLK

HVNVKVEANEKNGLEIESKEMVKKRKNKKRLTKTESLTA

-continued

EXEMPLARY SEQUENCES

Exemplary Amino Acid Sequence for WT-RBD with Prepro_2 Sequence (SEQ
ID NO: 100):
MRFPSIFTAVLFAASSALAMPLSGGGSGGSGSMPLNTTTEDETAQIPAEAVIGYLDLEGD

FDVAVLPFSNSTNNGLLFINTTIASIAAKEEGVSRRLLRRLLRRLLAANITNLCPFGEVFN

ATRFASVYAWNRKRISNCVADYSVLYNSASFSTFKCYGVSPTKLNDLCFTNVYADSFVI

RGDEVRQIAPGQTGKIADYNYKLPDDFTGCVIAWNSNNLDSKVGGNYNYLYRLFRKSN

LKPFERDISTEIYQAGSTPCNGVEGFNCYFPLQSYGFQPTNGVGYQPYRVVVLSFELLHA

PATVCGP

Exemplary Amino Acid Sequence for SARS-COV-2 Wuhan Strain Receptor
Binding Domain (RBD) fused to *Staphylococcus aureus* binder of IgG
protein subunits III and IV (SbiIII-IV) (SEQ ID NO: 101):
MFVFLVLLPLVSSAANITNLCPFGEVFNATRFASVYAWNRKRISNCVADYSVLYNSASFSTFKC

YGVSPTKLNDLCFTNVYADSFVIRGDEVRQIAPGQTGKIADYNYKLPDDFTGCVIAWNSNNLDS

KVGGNYNYLYRLFRKSNLKPFERDISTEIYQAGSTPCNGVEGFNCYFPLQSYGFQPTNGVGYQP

YRVVVLSFELLHAPATVCGPGGGGSGGGGSGGGGSIENADKAIKDFQDNKAPHDKSAAYEANSK

LPKDLRDKNNRFVEKVSIEKAIVRHDERVKSANDAISKLNEKDSIENRRLAQREVNKAPMDVKE

HLQKQLD

Exemplary Amino Acid Sequence for SARS-COV-2 Wuhan Strain Receptor
Binding Domain (RBD) fused to *Staphylococcus aureus* binder of IgG
protein subunits III and IV (SbiIII-IV) with Prepro Sequence
(SEQ ID NO: 102):
MRFPSIFTAVLFAASSALAAPVNTTTEDETAQIPAEAVIGYLDLEGDFDVAVLPFSNSTNNGLL

FINTTIASIAAKEEGVSLDKREAEANITNLCPFGEVFNATRFASVYAWNRKRISNCVADYSVLY

NSASFSTFKCYGVSPTKLNDLCFTNVYADSFVIRGDEVRQIAPGQTGKIADYNYKLPDDFTGCV

IAWNSNNLDSKVGGNYNYLYRLFRKSNLKPFERDISTEIYQAGSTPCNGVEGFNCYFPLQSYGF

QPTNGVGYQPYRVVVLSFELLHAPATVCGPGGGGSGGGGSGGGGSIENADKAIKDFQDNKAPHD

KSAAYEANSKLPKDLRDKNNRFVEKVSIEKAIVRHDERVKSANDAISKLNEKDSIENRRLAQRE

VNKAPMDVKEHLQKQLD

Exemplary Amino Acid Sequence for SARS-COV-2 Wuhan Strain Receptor
Binding Domain (RBD) fused to *Staphylococcus aureus* binder of IgG
protein subunits III and IV (SbiIII-IV) with Prepro_2 Sequence
(SEQ ID NO: 103):
MRFPSIFTAVLFAASSALAMPLSGGGSGGSGSMPLNTTTEDETAQIPAEAVIGYLDLEGDFDVA

VLPFSNSTNNGLLFINTTIASIAAKEEGVSRRLLRRLLRRLLAANITNLCPFGEVFNATRFASV

YAWNRKRISNCVADYSVLYNSASFSTFKCYGVSPTKLNDLCFTNVYADSFVIRGDEVRQIAPGQ

TGKIADYNYKLPDDFTGCVIAWNSNNLDSKVGGNYNYLYRLFRKSNLKPFERDISTEIYQAGST

PCNGVEGFNCYFPLQSYGFQPTNGVGYQPYRVVVLSFELLHAPATVCGPGGGGSGGGGSGGGGS

IENADKAIKDFQDNKAPHDKSAAYEANSKLPKDLRDKNNRFVEKVSIEKAIVRHDERVKSANDA

ISKLNEKDSIENRRLAQREVNKAPMDVKEHLQKQLD

Exemplary Amino Acid Sequence for SARS-COV-2 Omicron (BA.1) Strain
Receptor Binding Domain (RBD) fused to *Staphylococcus aureus* binder
of IgG protein subunits III and IV (SbiIII-IV)
(SEQ ID NO: 104):
MFVFLVLLPLVSSAANITNLCPFDEVFNATRFASVYAWNRKRISNCVADYSVLYNLAPFFTFKC

YGVSPTKLNDLCFTNVYADSFVIRGDEVRQIAPGQTGNIADYNYKLPDDFTGCVIAWNSNKLDS

KVSGNYNYLYRLFRKSNLKPFERDISTEIYQAGNKPCNGVAGFNCYFPLRSYSFRPTYGVGHQP

-continued

EXEMPLARY SEQUENCES

YRVVVLSFELLHAPATVCGPGGGGSGGGGSGGGGSIENADKAIKDFQDNKAPHDKSAAYEANSK

LPKDLRDKNNRFVEKVSIEKAIVRHDERVKSANDAISKLNEKDSIENRRLAQREVNKAPMDVKE

HLQKQLD

Exemplary Amino Acid Sequence for SARS-COV-2 Omicron (BA.1) Strain
Receptor Binding Domain (RBD) fused to *Staphylococcus aureus* binder
of IgG protein subunits III and IV (SbiIII-IV) with Prepro Sequence
(SEQ ID NO: 105):
MRFPSIFTAVLFAASSALAAPVNTTTEDETAQIPAEAVIGYLDLEGDFDVAVLPFSNSTNNGLL

FINTTIASIAAKEEGVSLDKREAEANITNLCPFDEVFNATRFASVYAWNRKRISNCVADYSVLY

NLAPFFTFKCYGVSPTKLNDLCFTNVYADSFVIRGDEVRQIAPGQTGNIADYNYKLPDDFTGCV

IAWNSNKLDSKVSGNYNYLYRLFRKSNLKPFERDISTEIYQAGNKPCNGVAGFNCYFPLRSYSF

RPTYGVGHQPYRVVVLSFELLHAPATVCGPGGGGSGGGGSGGGGSIENADKAIKDFQDNKAPHD

KSAAYEANSKLPKDLRDKNNRFVEKVSIEKAIVRHDERVKSANDAISKLNEKDSIENRRLAQRE

VNKAPMDVKEHLQKQLD

Engineered Prepro Sequences

Exemplary Prepro Sequence with Furin Cleavage Site ("furin")
(SEQ ID NO: 44):
MRFPSIFTAVLFAASSALAAPVNTTTEDETAQIPAEAVIGYLDLEGDFDVAVLPFSNSTNNGLL

FINTTIASIAAKEEGVSLDRKRKRKRREAEAAA

Exemplary Prepro Sequence with Furin Cleavage Site and Deletion
of an Ste13 Cleavage Site ("Furin_delSTE13") (SEQ ID NO: 45):
MRFPSIFTAVLFAASSALAAPVNTTTEDETAQIPAEAVIGYLDLEGDFDVAVLPFSNSTNNGLL

FINTTIASIAAKEEGVSLDRKRKRKRRAA

Exemplary Prepro Sequence with PCSK4 Cleavage Site ("PCSK4") (SEQ ID
NO: 46):
MRFPSIFTAVLFAASSALAAPVNTTTEDETAQIPAEAVIGYLDLEGDFDVAVLPFSNSTNNGLL

FINTTIASIAAKEEGVSLDKRKREAEAAA

Exemplary Prepro Sequence with PCSK4 Cleavage Site and Deletion
of an Ste13 Cleavage Site ("PCSK4_delSTE13") (SEQ ID NO: 47):
MRFPSIFTAVLFAASSALAAPVNTTTEDETAQIPAEAVIGYLDLEGDFDVAVLPFSNSTNNGLL

FINTTIASIAAKEEGVSLDKRKRAA

Exemplary Prepro Sequence with S1P Cleavage Site and Deletion of
an Ste13 Cleavage Site ("S1P_delSTE13") (SEQ ID NO: 48):
MRFPSIFTAVLFAASSALAAPVNTTTEDETAQIPAEAVIGYLDLEGDFDVAVLPFSNSTNNGLL

FINTTIASIAAKEEGVSRRLLAA

Exemplary Prepro Sequence with PCSK9 Cleavage Site and Deletion
of an Ste13 Cleavage Site ("PCSK9_delSTE13") (SEQ ID NO: 49):
MRFPSIFTAVLFAASSALAAPVNTTTEDETAQIPAEAVIGYLDLEGDFDVAVLPFSNSTNNGLL

FINTTIASIAAKEEGVSLDVFAQSIPAA

Exemplary Prepro Sequence with Deletion of an Ste13 Cleavage Site
("delSTE13") (SEQ ID NO: 50):
MRFPSIFTAVLFAASSALAAPVNTTTEDETAQIPAEAVIGYLDLEGDFDVAVLPFSNSTNNGLL

FINTTIASIAAKEEGVSLDKRAA

Exemplary Prepro Sequence with Surf4 Motif Replacement ("Surf4_motif")
(SEQ ID NO: 51):
MRFPSIFTAVLFAASSALAMPLNTTTEDETAQIPAEAVIGYLDLEGDFDVAVLPFSNSTNNGLL

FINTTIASIAAKEEGVSLDKREAEAAA

EXEMPLARY SEQUENCES

Exemplary Prepro_2 Sequence with Cathepsin C Peptide at the N-term of the Propeptide ("CATHC_1") (SEQ ID NO: 92):
MRFPSIFTAVLFAASSALAMPLSGGGSGGSGSMPLTPANCTYLDLLGTWVFQVGSSGSQRDVNC

SVMGNTTTEDETAQIPAEAVIGYLDLEGDFDVAVLPFSNSTNNGLLFINTTIASIAAKEEGVSR

RLLRRLLRRLL

Exemplary Prepro_2 Sequence with Cathepsin C Peptide at the middle of the Propeptide ("CATHC_2") (SEQ ID NO: 93):
MRFPSIFTAVLFAASSALAMPLSGGGSGGSGSMPLNTTTEDETAQIPAEAVIGYLDLEGD

FDVATPANCTYLDLLGTWVFQVGSSGSQRDVNCSVMGVLPFSNSTNNGLLFINTTIASIA

AKEEGVSRRLLRRLLRRLL

Exemplary Prepro_2 Sequence with Cathepsin C Peptide at the C-term of the Propeptide ("CATHC_3") (SEQ ID NO: 94):
MRFPSIFTAVLFAASSALAMPLSGGGSGGSGSMPLNTTTEDETAQIPAEAVIGYLDLEGD

FDVAVLPFSNSTNNGLLFINTTIASIAAKEEGVSTPANCTYLDLLGTWVFQVGSSGSQRD

VNCSVMGRRLLRRLLRRLL

Exemplary Amino Acid Sequence for Prepro_2 Containing a 3x MYC Tag
(SEQ ID NO: 106):
MRFPSIFTAVLFAASSALAMPLSGGGSGGSGSMPLEQKLISEEDLGGGEQKLIS

EEDLGGGEQKLISEEDLNTTTEDETAQIPAEAVIGYLDLEGDFDVAVLPFSNSTNNGLLFI

NTTIASIAAKEEGVSRRLLRRLLRRLLAA

Exemplary Amino Acid Sequence for Prepro_2 Containing a 3x MYC Tag with Deletion of a 3x S1P Protease Cleavage Site (SEQ ID NO: 107):
MRFPSIFTAVLFAASSALAMPLSGGGSGGSGSMPLEQKLISEEDLGGGEQKLIS

EEDLGGGEQKLISEEDLNTTTEDETAQIPAEAVIGYLDLEGDFDVAVLPFSNSTNNGLLFI

NTTIASIAAKEEGVSAA

Exemplary Amino Acid Sequence for Prepro_2 with Deletion of a 3x S1P Protease Cleavage Site (SEQ ID NO: 108):
MRFPSIFTAVLFAASSALAMPLSGGGSGGSGSMPLNTTTEDETAQIPAEAVIGY

LDLEGDFDVAVLPFSNSTNNGLLFINTTIASIAAKEEGVSAA

Exemplary Amino Acid Sequence for Prepro with Deletion of an Ste13 Cleavage Site and Deletion of a Kex2 Cleavage Site (SEQ ID NO: 109):
MRFPSIFTAVLFAASSALAAPVNTTTEDETAQIPAEAVIGYLDLEGDFDVAVL

PFSNSTNNGLLFINTTIASIAAKEEGVSLDAA

Certain Optimization-Associated Sequences

Furin Cleavage Site (SEQ ID NO: 52):
RKRKRKRR

PCSK4 Cleavage Site (SEQ ID NO: 53):
KRKR

PCSK9 Cleavage Site (SEQ ID NO: 54):
VFAQSIP

S1P Cleavage Site (SEQ ID NO: 55):
RRLL

Ste13 Cleavage Site (SEQ ID NO: 56):
EAEA

Kex2 Cleavage Site (SEQ ID NO: 57):
KR

Surf4 Tripeptide Motif (SEQ ID NO: 58):
MPL

EXEMPLARY SEQUENCES

Cathepsin C Peptide (SEQ ID NO: 95)
TPANCTYLDLLGTWVFQVGSSGSQRDVNCSVMG

Coagulation Factor VII Peptide (SEQ ID NO: 96)
ILEKRNASKPQGR

Sortilin 1 Peptide (SEQ ID NO: 97)
WSGPIGVSWGLR

Brain-Derived Neurotrophic Factor Peptide (SEQ ID NO: 98)
ESVNGPKAGSRGLTSLADTFEHVIEELLDEDQKVRPNEENNKDADLYTSRVMLSSQVPL Primer Sequences NLuc_Nterm_cPCR_F (SEQ ID NO: 59):
CGAGACAGAGAAGACTCTTGCGTTTCTGATAGG NLuc_Nterm_cPCR_R (SEQ ID NO: 60):
CACAATTGCTGATTCGTTTTCGATTCCACGCATATACG NLuc_seq (SEQ ID NO: 61):
GGTCTTACTGACATCCACTTTG NLuc_RBD_F (SEQ ID NO: 62):
TAATACGACTCACTATAGGGGCCGCCACCATGAGATTTCC NLuc_RBD_R (SEQ ID NO: 63):
GATATCCGCGGTAGGAATTCAGGACCACAAACTGTCG NLuc_colony_forward (SEQ ID NO: 64):
CGAGACAGAGAAGACTCTTGCGTTTCTGATAGG NLuc_colony_reverse (SEQ ID NO: 65):
GAGAGCTCGCCTGCAGGAATTGG T7-AGG_fwd (SEQ ID NO: 110):
gaattTAATACGACTCACTATAAGGcttgttcttttgcagaagc 120pA_rev (SEQ ID NO: 111):
TTTTTTTTTTTTTTTTTTTTTTTTTTTTTTTTTTTTTTTTTTTTTTTTTTTTTTTT TTTTTTTTTTTTTTTTTTTTTTTTTTTTTTTTTTTTTTTTTTTTTTTTTTTagaatgtga agaaactttcttttattag

REFERENCES

Each of the references included below are incorporated herein by reference in its entirety.

Amant, F. et a., "A serological assay to detect SARS-CoV-2 seroconversion in humans," Nature Medicine, 26:1033-1036, 2020.

Buntz, B., "50 of 2020's best-selling pharmaceuticals," Drug Discovery & Development, www.drugdiscovery-trends.com/50-of-2020s-best-selling-pharmaceuticals/, 2021.

Castella, M., et al., "Development of a Novel Anti-CD19 Chimeric Antigen Receptor: A Paradigm for an Affordable CAR T Cell Production at Academic Institutions," Molecular Therapy Methods & Clinical Development, 12:134-144, 2019.

Chen, Z. et al., "Sortilin Controls Intracellular Sorting of Brain-Derived Neurotrophic Factor to the Regulated Secretory Pathway," The Journal of Neuroscience, 25(26):6156-6166, 2005.

Feizi, A., et al., "Human protein secretory pathway genes are expressed in a tissue-specific pattern to match processing demands of the secretome," npj Systems Biology and Applications, 3:22, 2017.

Fitzgerald, I., et al., "Secretion of a foreign protein from budding yeasts is enhanced by cotranslational translocation and by suppression of vacuolar targeting," Microbial Cell Factories, 13(125), 2014.

Garten, W., Characterization of Proprotein Convertases and Their Involvement in Virus Propagation," Activation of Viruses by Host Proteases, Springer International Publishing:205-248, 2018.

Haryadi, R., et al., "Optimization of Heavy Chain and Light Chain Signal Peptides for High Level Expression of Therapeutic Antibodies in CHO Cells," PLoS ONE, 10(2):e0116878, 2015.

Naider, F., et al., "The alpha-factor mating pheromone of *Saccharomyces cerevisiae*: a model for studying the interaction of peptide hormones and G protein-coupled receptors," Peptides, 5(9):1441-63, 2004.

Nichols, W. et al., "Mutations in the ER-Golgi Intermediate Compartment Protein ERGIC-53 Cause Combined Deficiency of Coagulation Factors V and VIII," Cell, 93(1):61-70, 1998.

Oka, C., et al., "Human Lysozyme Secretion Increased by Alpha-factor Pro-sequence in *Pichia pastoris*," Bioscience, Biotechnology, and Biochemistry, 63(11):1977-1983, 1999.

Otte, S., et al., "Sorting signals can direct receptor-mediated export of soluble proteins into COPII vesicles," Nature Cell Biology, 6, 1189-1194, 2004.

Petersen, C. et al., "Propeptide cleavage conditions sortilin/neurotensin receptor-3 for ligand binding," The EMBO Journal, 18:595-604, 1999.

Rafiq, S. et al., "Engineering strategies to overcome the current roadblocks in CAR T cell therapy," Nature Reviews Clinical Oncology, 17:147-167, 2020.

Shu, M., et al., "A novel anti-HER2 antibody GB235 reverses Trastuzumab resistance in HER2-expressing tumor cells in vitro and in vivo," Scientific Reports, 10:2986, 2020.

Yin, Y., et al., "Surf4 (Erv29p) binds amino-terminal tripeptide motifs of soluble cargo proteins with different affinities, enabling prioritization of their exit from the endoplasmic reticulum," PLoS Bio, 16(8): e2005140, 2018.

EQUIVALENTS

Those skilled in the art will recognize, or be able to ascertain using no more than routine experimentation, many equivalents to the specific embodiments of the invention described herein. It is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Further, it should also be understood that any embodiment or aspect of the invention can be explicitly excluded from the claims, regardless of whether the specific exclusion is recited in the specification. The scope of the present invention is not intended to be limited to the above Description, but rather is as set forth in the claims that follow.

What is claimed is:

1. A polyribonucleotide encoding an engineered polypeptide, wherein the engineered polypeptide comprises:
   (i) a payload polypeptide, and
   (ii) an engineered α-factor prepro sequence or a fragment thereof,
   wherein the engineered α-factor prepro sequence or a fragment thereof is operably linked to the payload polypeptide,
   wherein the engineered α-factor prepro sequence does not include:
   (a) an Ste13 cleavage site comprising the sequence EAEA, and
   (b) a Kex2 cleavage site comprising the sequence KR,
   and wherein the Kex2 cleavage site of KR is replaced in the engineered α-factor prepro sequence with a sequence encoding an S1P cleavage site comprising the sequence of SEQ ID NO: 55.

2. The polyribonucleotide of claim 1, wherein the polyribonucleotide comprises one or more N4-acetylcytidine nucleosides.

3. The polyribonucleotide of claim 1, wherein the polyribonucleotide comprises one or more 5-hydroxymethyluridine nucleosides.

4. The polyribonucleotide of claim 1, wherein the payload polypeptide comprises a therapeutic polypeptide.

5. The polyribonucleotide of claim 1, wherein the payload polypeptide comprises one or more antigens.

6. The polyribonucleotide of claim 5, wherein the one or more antigens are or comprise viral antigens.

7. The polyribonucleotide of claim 6, wherein the one or more viral antigens are or comprise one or more SARS-CoV-2 antigens.

8. The polyribonucleotide of claim 6, wherein the one or more viral antigens are or comprise one or more influenza antigens.

9. The polyribonucleotide of claim 1, wherein the payload polypeptide comprises:
   (a) an antibody or a fragment thereof,
   (b) an extracellular receptor and an immunoglobin constant region,
   (c) a receptor agonist and an immunoglobin constant region, or
   (d) a receptor antagonist and an immunoglobin constant region.

10. The polyribonucleotide of claim 1, wherein the engineered α-factor prepro sequence or a fragment thereof is present on the N-terminus of the engineered polypeptide.

11. The polyribonucleotide of claim 1, wherein the engineered α-factor prepro sequence or a fragment thereof is present on the C-terminus of the engineered polypeptide.

12. The polyribonucleotide of claim 1, wherein the engineered α-factor prepro sequence comprises a tripeptide motif having Surf4 binding affinity.

13. The polyribonucleotide of claim 12, wherein the tripeptide motif is MPL.

14. The polyribonucleotide of claim 1, wherein the engineered α-factor prepro sequence comprises:
   (a) a CATHC peptide sequence or a fragment thereof,
   (b) a CFVII peptide sequence or a fragment thereof,
   (c) a Sortilin 1 peptide sequence or a fragment thereof,
   (d) a BDNF peptide sequence or a fragment thereof, or
   (e) any combination of (a)-(d).

15. The polyribonucleotide of claim 14, wherein the CATHC peptide has a sequence comprising the sequence of SEQ ID NO: 95.

16. The polyribonucleotide of claim 14, wherein the CFVII peptide has a sequence comprising the sequence of SEQ ID NO: 96.

17. The polyribonucleotide of claim 14, wherein the Sortilin-1 peptide has a sequence comprising the sequence of SEQ ID NO: 97.

18. The polyribonucleotide of claim 14, wherein the BDNF peptide has a sequence comprising the sequence of SEQ ID NO: 98.

19. The polyribonucleotide of claim 1, wherein the engineered polypeptide is secreted out of: (i) a cell, (ii) a tissue, or (iii) a cell and tissue of a mammalian subject, at a greater level than the secretion of a comparable polypeptide comprising the same payload polypeptide as the engineered polypeptide and a signal peptide that is not an engineered α-factor prepro sequence.

20. The polyribonucleotide of claim 1, wherein the engineered α-factor prepro sequence has a sequence comprising the sequence of SEQ ID NO: 48, SEQ ID NO: 70, SEQ ID NO: 92, SEQ ID NO: 93, or SEQ ID NO: 94.

21. The polyribonucleotide of claim 1, wherein the Kex2 cleavage site of KR is replaced in the engineered α-factor prepro sequence with a sequence encoding three S1P cleavage sites, wherein the S1P site comprises the sequence of SEQ ID NO:55.

* * * * *